US008001017B1

(12) United States Patent
Franco

(10) Patent No.: US 8,001,017 B1
(45) Date of Patent: Aug. 16, 2011

(54) SUPPLY-CHAIN MANAGEMENT SYSTEM

(76) Inventor: Hector Franco, Sunnyvale, CA (US)

( * ) Notice: Subject to any disclaimer, the term of this patent is extended or adjusted under 35 U.S.C. 154(b) by 1141 days.

(21) Appl. No.: 11/799,436

(22) Filed: May 1, 2007

Related U.S. Application Data

(63) Continuation-in-part of application No. 09/817,535, filed on Mar. 26, 2001, now Pat. No. 7,257,552.

(60) Provisional application No. 60/225,393, filed on Aug. 15, 2000, provisional application No. 60/192,291, filed on Mar. 27, 2000.

(51) Int. Cl.
  *G06Q 10/00* (2006.01)
(52) U.S. Cl. ............... 705/28; 705/26.1; 705/27.1
(58) Field of Classification Search .......... 705/28, 705/26, 27
  See application file for complete search history.

(56) References Cited

U.S. PATENT DOCUMENTS

| | | | | | |
|---|---|---|---|---|---|
| 5,158,155 | A | * | 10/1992 | Domain et al. | 186/53 |
| 5,595,264 | A | * | 1/1997 | Trotta, Jr. | 186/56 |
| 6,324,522 | B2 | * | 11/2001 | Peterson et al. | 705/28 |
| 6,336,100 | B1 | * | 1/2002 | Yamada | 705/26.8 |
| 6,725,204 | B1 | * | 4/2004 | Gusley | 705/26 |
| 7,272,571 | B2 | * | 9/2007 | Tuttrup et al. | 705/22 |
| 2001/0027471 | A1 | * | 10/2001 | Paulose et al. | 709/203 |
| 2004/0236635 | A1 | * | 11/2004 | Publicover | 705/26 |

OTHER PUBLICATIONS

Netship: Markowicz, Bernard: "Decentralizing the online market," Traffic World, Nov. 29, 1999, v260i9pg23, Proquest #47192564, 2pgs.*

* cited by examiner

*Primary Examiner* — Rober M. Pond

(57) ABSTRACT

An Internet-based computer-assisted supply-chain management system (SCMS) replaces the archaic commerce systems presently in use. It coordinates just-in-time distribution of items purchased by consumers from a plurality of merchants whereby the inventory in the distribution pipeline is reduced to inventory in transport. It uses regional distributions centers and neighborhood order aggregation facilities for an efficient transfer of items to consumers. Consumers can pick up aggregated orders at an order aggregation facility or have them delivered at a residence. The SCMS phases out conventional checkout registers in favor of web browsers with automatic transaction execution. Retailers can operate with little or no inventory. Window shops facilitate promotion of items and help consumers make selections and decisions with respect to purchases they may be contemplating. The SCMS provides real-time consumption monitoring and forecasts, significantly reduces supply-chain costs and retail prices, promotes economic growth, and minimizes undesirable cyclic economic fluctuations.

1 Claim, 28 Drawing Sheets

PREDICTIVE ORDERING METHOD

1200

IDENTIFYING A PLURALITY OF CONSUMERS USING THE SUPPLY-CHAIN MANAGEMENT SUB-SYSTEM FOR SHOPPING
1201

IDENTIFYING AN ITEM SUBJECT TO A PREDICTIVE PRICE DISCOUNT
1202

IDENTIFYING A PLURALITY OF MERCHANTS PROVIDING THE ITEM SUBJECT TO A PREDICTIVE PRICE DISCOUNT
1203

IDENTIFYING A PREDICTIVE DISCOUNT SCHEDULE OF PREDICTIVE PRICE DISCOUNT VERSUS PREDICTIVE ORDER DELAY APPLICABLE TO THE ITEM
1204

INFORMING EACH OF THE IDENTIFIED MERCHANTS OF THE PREDICTIVE DISCOUNT SCHEDULE APPLICABLE TO THE ITEM
1205

INFORMING EACH OF THE IDENTIFIED CONSUMERS OF THE PREDICTIVE DISCOUNT SCHEDULE APPLICABLE TO THE ITEM
1206

GENERATING CONSUMPTION FORECASTS FOR THE ITEM
1207

INFORMING IN REAL-TIME EACH IDENTIFIED MERCHANT OF THE CONSUMPTION FORECASTS GENERATED FOR THE ITEM
1208

*FIG. 12*

CONSUMPTION CRUISE CONTROL PROCESS

1700

IDENTIFYING AN ITEM TO WHICH THE ALGORITHMIC CLOSED LOOP CONTROL PROCESS IS APPLIED
1701

IDENTIFYING A TIME UNIT TO EXPRESS A TIME VARIABLE
1702

IDENTIFYING A LOOK BACK INTERVAL
1703

IDENTIFYING A LOOK FORWARD INTERVAL
1704

IDENTIFYING A TIME WINDOW
1705

IDENTIFYING A CONTROL INTERVAL
1706

IDENTIFYING A CURRENT CONTROL INTERVAL
1707

METHOD FOR THE OPERATION OF THE SUPPLY-CHAIN MANAGEMENT SUB-SYSTEM

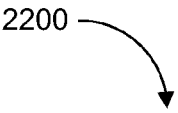
2200

IDENTIFYING A PLURALITY OF MERCHANTS PARTICIPATING IN THE SUPPLY-CHAIN MANAGEMENT SUB-SYSTEM
2201

IDENTIFYING A PLURALITY OF DIFFERENT ITEMS, WHEREBY EACH DIFFERENT ITEM IS PROVIDED BY AT LEAST ONE OF THE IDENTIFIED MERCHANTS
2202

FOR EACH IDENTIFIED DIFFERENT ITEM, STORING ITEM DATA CHARACTERIZING THE ITEM
2203

FOR EACH IDENTIFIED MERCHANT, COLLECTING AND STORING IN REAL-TIME INVENTORY DATA
2204

FOR EACH IDENTIFIED MERCHANT, COLLECTING AND STORING IN REAL-TIME BOOKED ORDER DATA FOR EACH PREDICTIVE AND NON-PREDICTIVE PURCHASE ORDER BOOKED BY THE MERCHANT
2205

*Fig. 22A*

SUPPLY-CHAIN MANAGEMENT SYSTEM

RELATED APPLICATIONS

This application is a continuation-in-part of U.S. application Ser. No. 09/817,535, filed on Mar. 26, 2001, now U.S. Pat. No. 7,257,552, wherein U.S. application Ser. No. 09/817,535 claims the benefit of U.S. Provisional Application No. 60/192,291, filed on Mar. 27, 2000, and of U.S. Provisional Application No. 60/225,393, filed on Aug. 15, 2000, all of which applications were incorporated therein by reference. This application is related to but does NOT claim priority to U.S. application Ser. No. 11/799,168 filed on May 1, 2007, which bears the same title, specification, and drawings as the present application.

FIELD OF THE INVENTION

This invention relates generally to a new age Internet-based supply-chain management system configured to support just-in-time distribution of items to consumers, reduce inventory levels, reduce transportation costs, collect consumption data in real-time, predict future consumption, distribute consumption forecasts to merchants, facilitate promotion and advertising, facilitate the transfer of items to consumers, reduce overall supply-chain costs, and save consumers time and money.

BACKGROUND OF THE INVENTION

The conventional distribution of items to consumers is, and always has been, a most inefficient process that results in retail prices one order of magnitude higher than the manufacturing costs, wastes a considerable portion of available energy resources, wastes a significant amount of consumers' time, and limits the conveniences that can be offered to consumers.

SUMMARY OF THE INVENTION

The present invention addresses the problems previously outlined by integrating in a new age Internet-based supply-chain management system concepts that support an efficient system for distributing items to consumers.

One aspect of the invention relates to an order aggregation facility which is a commercial establishment configured to receive, temporarily store, physically aggregate, and transfer to a consumer batches of items purchased by the consumer from different merchants.

One aspect of the invention relates to an order aggregation management sub-system that manages activities associated with transfers of items from a plurality of manufacturers and producers to a network of order aggregation facilities around the country.

One aspect of the invention relates to computer programs for managing and coordinating transportation operations for a plurality of carriers that support just-in-time distribution of items to consumers.

One aspect of the invention relates to an integrated inventory sharing sub-system configured to help merchants reduce required operating inventories, balance inventories, reduce inventory costs, and fulfill consumer orders in the case of inventory shortages.

One aspect of the invention relates to a predictive ordering consumption forecasting sub-system, also referred to herein as "predictive ordering sub-system" whereby consumers are given a predictive price discount in exchange for ordering items at an order date and accepting delivery at a later delivery date.

One aspect of the invention relates to the generation of accurate consumption forecasts derived from the predictive ordering sub-system.

One aspect of the invention relates to a consumption cruise control sub-system that reduces undesirable fluctuations in item consumption.

One aspect of the invention relates to a consumer preference code sub-system that facilitates online shopping of non-uniform generic items and ensures that consumers get the items that match their preferences.

One aspect of the invention relates to a window shop management sub-system which coordinates the operation of a plurality of window shops configured to provide merchants with promotional and display facilities and services that help consumers make selections and decisions with respect to items they may be interested in acquiring.

One aspect of the invention relates to a decentralized exhibition system that offers merchants a network of collaborating window shops where merchants can promote and display their items to consumers, make new item introductions, and market test new items.

One aspect of the invention relates to a supply-chain management sub-system that manages and coordinates the operations of the supply-chain management system.

Deployment of business models based on the above concepts can encourage consumers to shop online and can produce numerous benefits. Among these benefits, the most important are significant reductions in item distribution costs as well as the time, effort, and energy consumers spend shopping.

All participants in the supply-chain management system, such as manufacturers, producers, wholesalers, distributors, retailers, online retailers, storefronts, service providers, and consumers can derive large benefits from this invention. Manufacturers and producers can obtain accurate real-time data upon which to base manufacturing and production plans. Using a just-in-time business model, wholesalers, distributors, and retailers can operate efficiently, with minimal inventories, item costs, shipping costs, and shipping times. Retailers can ensure that no sales are lost due to lack of inventory and can better serve their customers with broader item selections. At the end of the distribution chain, consumers can shop comfortably from home, buy items at more competitive prices, and receive their purchases more quickly with little or no need to drive for shopping.

The present invention takes advantage of recent advances in computer and Internet technology to provide the foundation necessary for electronic commerce to become one of the most significant factors in improving productivity an enhancing economic prosperity during this century. Further aspects of this invention will become apparent in the Detailed Description and by reference to the attached drawings. The Detailed Description contains the following Sections:

I. Overview
  A. Shopping models
  B. Inventory models
  C. Transfer models
  D. Promotional models
  E. Retail models
  F. Consumption monitoring and forecasting models
II. Major components of the supply-chain management system
  A. The Order Aggregation Management Sub-system
  B. The Integrated Inventory Sharing Sub-System C. The Predictive Ordering Consumption Forecasting Sub-System
D. The Consumer Preference Code Sub-System
E. The Window Shop Management Sub-System
F. The Supply-Chain Management Sub-System III. Operation of the supply-chain management system
A. Operation of the order aggregation management sub-system
B. Operation of the integrated inventory sharing sub-system
C. Operation of the predictive ordering consumption forecasting sub-system
D. Operation of the consumer preference code sub-system
E. Operation of the window shop management sub-system
F. Operation of the supply-chain management sub-system IV. Conclusion

BRIEF DESCRIPTION OF THE DRAWINGS

FIG. 12 illustrates a preferred predictive ordering method for using the predictive ordering sub-system.

FIGS. 22A-B illustrate a preferred method for the operation of the supply-chain management sub-system.

DETAILED DESCRIPTION OF THE INVENTION

Figure 1:
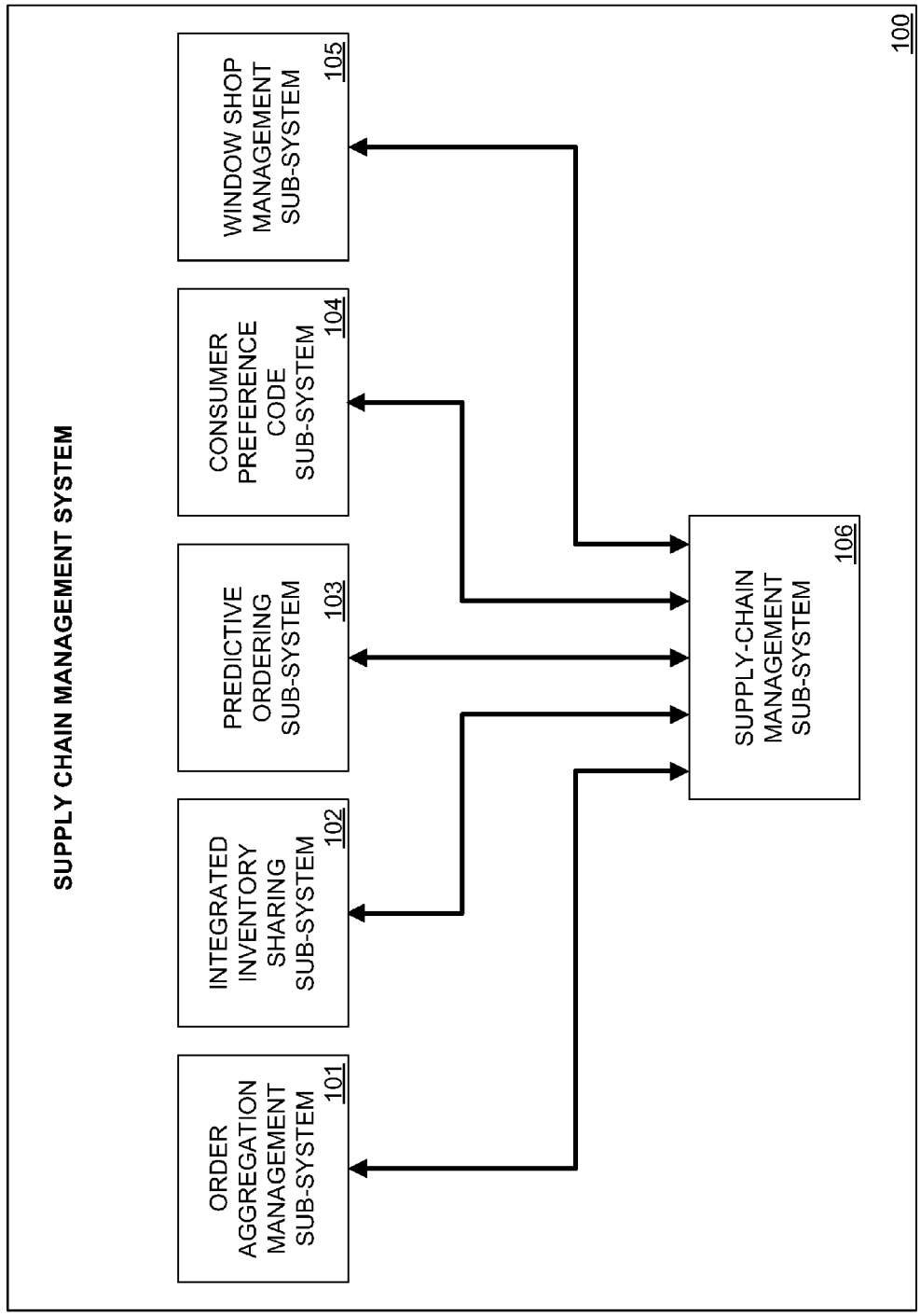
FIG. 1 illustrates a block diagram of a preferred embodiment of the supply-chain management system.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices and methods to those described herein. In other instances, well-known methods and devices have not been described in detail so as not to unnecessarily obscure aspects of the present invention.

Definitions

For the purposes of the invention, the following stated definitions shall be construed as applying to the specification and to the Claims:

Definition: an item is a product or a service a consumer can purchase.

Definition: a merchant is any business entity that sells items or services. A merchant can be, for example, a manufacturer, a producer, a wholesaler, a distributor, a retailer, an online retailer, a storefront, and a service provider.

Definition: a purchase order is a documented transaction between a consumer and a merchant, whereby the consumer agrees to purchase from the merchant one or more items or services and the merchant agrees to provide to the consumer each of the one or more items purchased by the consumer at an identified place and time.

I. Overview

The invention describes a new age Internet-based supply-chain management system to replace the archaic commerce systems that have been in use in use for many years. The operation of the supply-chain management system involves new operating models that affect all the participants in the supply-chain from the manufacturers and producers that provide the supply to the consumers that create the demand for the supply. The invention provides flexibility for a transition phase during which the participants in the supply-chain management system adjust to the new operating models. During the transition phase, the supply-chain management system can still provide significant benefits to early participants even before full deployment of the supply-chain management system is completed. Considering that the younger generation is rapidly embracing the benefits of a computer-based way of life, the transition phase is not expected to encounter major difficulties. The new operating models are classified in categories and each category is described separately to provide a clear overview of the substance of the invention.

A. Shopping Models

In a preferred embodiment of the invention, consumer shopping is performed online via web browsers that access shopping platforms configured to support online transactions between consumers and merchants participating in the supply-chain management system. A consumer can use a home computer to shop online, can use computer terminals made available to consumers in retail establishments to shop online, and can use the services of a sales person in a retail establishment to book, via a web browser, purchase orders for the items the consumer whishes to purchase. The important issue is to make the transition out of the conventional checkout registers and progress to the online systems proposed in the invention. The transition involves extending online shopping to include local retailers where consumers do most of their shopping, whereby retailers replace their conventional checkout registers by shopping browsers.

Predictive ordering is another shopping model provided by the supply-chain management system that will have a significant impact on productivity and on stable economic growth. Manufacturers and producers of items could achieve large productivity gains if they could have accurate forecasts of consumption. Information on future consumption exists today buried in the minds of consumers. However, this precious information is wasted every day because it is not collected. Predictive ordering replaces the conventional discount coupons and promotional discounts by a system whereby consumers are given significant price discounts for ordering items in advance of delivery. Preferably, the price discounts vary with the time span between the order date and the delivery date and are based upon a cost savings realized primarily by manufacturers and producers and secondarily by other participants of the supply-chain as a result of the advanced knowledge of the purchases. Since consumers in the US are very sensitive to price discounts, it is expected that an increasing fraction of the consumers will take advantage of predictive ordering. The resulting predictive ordering data will provide a very large sample of the expected consumption which can be combined with historical data from non-predictive purchases to derive accurate projections of future consumption. To help the consumer, a predictive ordering sub-system can provide a shopping list generation program that automatically generates a suggested shopping list for the consumer based upon the consumer's shopping history. The list can be automatically restarted after each online shopping session and presented to the consumer for review and edit. After the consumer edits and approves the shopping list, another program can automatically do the shopping with no further action required by the consumer.

Consumer preference codes provide another shopping model that allows consumers to shop online for non-uniform items such as fresh produce, halibut, and New York steak with confidence that the items they receive will meet their expectations. In a preferred embodiment of a consumer preference code sub-system, each class of such non-uniform items, represented by a generic name that is insufficient to characterize the specific consumer preferences, is divided in sub-classes. Each sub-class is representative of a different consumer preference and is characterized by a set of quantifiable characteristics, whereby each characteristic is given a range of discrete values. This sub-classification results in a table that provides for each particular sub-class the value of each characteristic for the particular sub-class. Once the table is established, each sub-class can be designated by the generic name followed by the value of each of the quantifiable characteristics used to define the sub-class. For convenience, the system can be configured for the consumer to provide an optional personalized name the consumer can use as shorthand to order a non-uniform generic item of the sub-class the consumer prefers.

B. Inventory Models

Inventory is a counter productive and costly legacy inherited from the days when society did not benefit from mechanized transportation, computer systems, and telecommunications. The daily costs of holding an item in inventory in a warehouse or on a shelf in a retail store represent an important part of the retail price of the item, which is passed on to consumers. Except for items that may require aging such as wines and spirits, most items don't get better while in inventory and some like perishables actually get much worse. For example, in a supermarket the spoilage of produce is typically 30%.

In a preferred embodiment of the invention, inventory is significantly reduced if not eliminated at every link of the supply-chain. The supply-chain management system relies upon a just-in-time distribution system whereby the inventory in the supply-chain is practically reduced to the items that are physically being transported from a point of origin to the consumer.

Integrated inventory sharing is an inventory model that helps merchants reduce required operating inventories, balance inventories, reduce inventory costs, and fulfill consumer orders in the case of an inventory shortage. According to this model, a plurality of merchants participating in the integrated inventory sharing sub-system share inventories to create a virtual inventory that is available to each merchant. Preferably a database is used to maintain in real-time inventory sharing data and a server is used to support the operation of an integrated inventory sharing sub-system. On a regional basis, a regional virtual inventory pool can be maintained, whereby a participating merchant in the region will be able to fulfill orders requiring immediate delivery irrespective of the inventory status held by the merchant.

In addition to reducing inventory costs, the integrated inventory sharing sub-system gives each merchant the opportunity to sell to its clientele a broad selection of items available in the virtual inventory that no merchant would have sufficient shelf space to inventory. To illustrate, consider the following example of men's slacks:

Number of possible waist sizes=23
Number of possible inseam sizes=5
Number of color selections=4
Number of possible styles=20
Number of possible brands=100

The product of these values equates to 920,000 possible variations of men's slacks a consumer could purchase. Assuming that a retailer would inventory 5 items for each variation to satisfy random demand, the total average inventory for the retailer would equate to 4,600,000 pairs of slacks. This number emphasizes two fundamental absurdities in connection with the value of inventory and the space occupied by inventory. At an average of $30 per pair, the value of inventory would represent $138,000,000 or several orders of magnitude the potential annual sales of slacks realizable by the retailer. To store the 4,600,000 pairs of slacks it would require 1,500,000 cubic feet or a cube with an edge of approximately 114 feet.

These numbers clearly show why retailers can only afford to inventory a very limited selection of each type of item they sell. Over the years retailers have learned which items experience the largest volume of sales in their location and they limit their retail to those items. Because of fluctuations in consumption, items a consumer purchases regularly may suddenly disappear from the shelves and be replaced by another item that has recently increased in sales volume. This effect, which could be called the shelf space syndrome, is very frustrating for consumers and costs the industry a significant loss of revenue due to missed opportunities. By contrast, with the deployment of the supply-chain management system any consumer will be able to obtain any item at any time from any location in the country with a few simple clicks.

C. Transfer Models

Transfer models relate to the transfer of items from manufacturers and producers to the consumers who purchase the items. The most crucial transfer model of this invention is order aggregation. In a preferred embodiment of this model, each consumer purchases items from different local and out of town merchants using the online shopping models described above. All these items originally come from shipping facilities of manufacturers and producers that provide the items. The items originating from a given shipping facility can be combined in one or more shipments that are destined to consumers in a given regional area. In the regional area, a regional distribution center that services the regional area can receive the shipments. From the regional distribution center the items are then transferred to various order aggregation facilities that service neighborhoods within the regional area. These transfers can be executed in accordance with just-in-time schedules managed by an order aggregation management sub-system responsible for coordinating the operation of carrier services participating in the supply-chain management system.

In a preferred embodiment of this model, the order aggregation facility is a commercial establishment equipped with facilities, which include the following:

(a) Temporary storage environments at room, cold, and frozen temperature for items purchased by consumers from any number of merchants.
(b) A control center housing computer systems configured to communicate with a supply-chain management sub-system to coordinate the operations of the order aggregation facility.
(c) An order aggregation area configured to perform the physical aggregation of items purchased by consumers from different merchants.
(d) Truck loading and unloading docks.
(e) Consumer vehicle stations for consumers to pick up physically aggregated items, deliver returns, and send parcels.
(f) A consumer service area configured to facilitate interaction between consumers and order aggregation facility personnel.

From a functional perspective, the order aggregation facility is preferably configured to perform functions, which include the following:

(a) Communicate with the supply-chain management sub-system to receive data and instructions, coordinate activities, and provide reports.
(b) Receive shipments of items delivered by carriers.
(c) Temporarily store each of the items delivered by carriers in a proper environment.
(d) Physically execute aggregation of the items delivered by carriers in accordance with aggregation instructions.
(e) Transfer to a consumer a batch of physically aggregated items when the consumer elects to pick up the batch of physically aggregated items at the order aggregation facility.
(f) Send via a carrier service a batch of physically aggregated items to an address designated by the consumer when the consumer elects to have the batch of physically aggregated items delivered.

To save the consumer time and driving expense, the consumer can provide aggregation instructions whereby the items purchased by the consumer from various merchants are transferred just-in-time to an order aggregation facility to be physically aggregated in one or more batches before being transferred to the consumer. After aggregation, each batch of physically aggregated items can be transferred from the order aggregation facility to the consumer, preferably at a date and time selected by the consumer.

The consumer has two options to receive each batch of physically aggregated items at the selected date and time. One is to pick up the batch of physically aggregated items at the order aggregation facility. Another is to have the batch of physically aggregated items delivered to an address designated by the consumer. Preferably, if the consumer elects to pick up the batch of physically aggregated items, the consumer selects the order aggregation facility else the order aggregation management sub-system makes the selection.

For example, a consumer purchases online a large TV, a large microwave oven, various food items, a shirt, and two books from different stores. The consumer may elect to pick up the small items on a Wednesday at 5:40 PM at an order aggregation facility that is on the way home from work, and have the large items delivered at 6:15 PM when the consumer is sure to be home. To comply with the consumer's instructions, all the items purchased by the consumer would be scheduled to arrive at the selected order aggregation facility around 5:00 PM. Alternatively, the consumer could decide to have the large items delivered at a residence address on Saturday at 10:00 AM. However, because the supply-chain management system operates just-in-time, the large items would be scheduled to arrive at a designated order aggregation facility at approximately 9:00 AM Saturday instead of 5:00 PM Wednesday.

Based on this model, the inventory time for each item purchased by a consumer is limited to the time elapsed since the item left the shipping facility until the consumer received the item plus the inventory time experienced by the manufacturer or producer of the item.

In accordance with the shopping models described above, the inventory time experienced by the manufacturers and producers can become very short due to the accurate consumption forecasts the supply-chain management system can provide to the manufacturers and producers, whereby items are shipped as soon as they emerge from manufacturing.

D. Promotional Models

In a preferred embodiment, the promotion and introduction of new items will take place in window shops that provide merchants and consumers promotional facilities and services that help merchants inform the public of their offerings and help consumers make selections and decisions with respect to items they may be interested in acquiring.

From the consumer's perspective there are two distinct shopping activities. The first relates to purchasing an item the consumer has purchased previously or with which the consumer is familiar, whereby the purchase can be performed by a few clicks of the mouse. The second relates to purchasing an item the consumer has never purchased or an item the consumer is not familiar with, whereby the purchase is typically preceded by an evaluation, comparison, and selection process.

The window shops address the second of these shopping activities as illustrated in the following example of a consumer interested in buying a new HDTV to replace the old TV the family has used in the living room for 12 years. On a web browser, the consumer logs on to a web site that lists all the window shops participating in the supply-chain management system and searches for local window shops specializing in home entertainment and HDTV. The web site preferably displays a window shop locator with maps showing the locations of the various window shops that specialize in HDTV. The consumer selects a convenient location and drives the family to the selected window shop where they can make an educated decision on which HDTV they wish to purchase. The window shops do not have to carry inventory. Instead have space for displaying a broad selection of brands and models of items. They can provide infomercial displays, video presentations describing the features and benefits of the various brands and models, literature the consumers may want to take home for further review and evaluation, and trained technicians to assist consumers. Preferably, the technicians are qualified to answer consumer questions, explain item features, give demonstrations, provide technical support and provide consumer training. In addition the window shops can have web browsers configured to support a plurality of online shopping related activities for the use of consumers that visit the window shop. More specifically a consumer who reaches a decision to purchase an item evaluated at the window shop can use one of the web browsers at the window shop to make the purchase. At the same time the consumer can also purchase other items not related to the window shop because window shops preferably participate in the integrated inventory sharing sub-system and also operate as inventoryless retailers.

In a preferred embodiment of this model, the window shop provides merchants promotional facilities and services that merchants can obtain under contractual agreements for specified periods of time. The revenue model of the window shop is preferably based upon two sources. The first relates to service contracts with merchants to promote their products. The second relates to purchased orders placed by consumers that visit the window shop.

Another function the window shop has a unique opportunity to perform is the collection of information on consumers' interests and purchase plans, which is of significant importance to manufacturers and producers. During consumer visits to window shops, the window shop personnel have a unique opportunity to establish a friendly rapport with consumers and a good justification to obtain from consumers extremely valuable information, which can include the following:

(a) An identification of each item a consumer may be interested in acquiring.
(b) An identification of a date when a consumer may be interested in buying each identified item.
(c) Contact information a consumer may be willing to provide.
(d) An identification of referrals a consumer may provide.

The collected information on consumers' interests and purchase plans can be compiled and summarized in accordance with a standard format, whereby it can be efficiently communicated to the manufacturers and producers that provide the items for which the information is collected.

Another preferred embodiment of the promotion model consists of a decentralized exhibition system that offers merchants a network of collaborating window shops where merchants can promote and display their items to consumers, make new item introductions, and market test new items. The decentralized exhibition system includes a database for maintaining data on each window shop in the network of window shops and a web server that merchants can access to negotiate contracts for promotional services.

The decentralized exhibition system offers manufacturers and producers an excellent alternative to replace the conventional exhibitions halls. This alternative offers the following benefits:

1. The capability to reach a nationwide audience of consumers.
2. Year-round operation providing continuous exposure of items to consumers.
3. Consumers can see the exhibitions at their convenience.
4. Window shops can be located in areas of high consumer traffic to increase exposure of items to consumers.
5. Use can be targeted by geographic area.

The decentralized exhibition system is particularly suited for introducing and market testing new items. For example, a manufacturer can contract for window shop promotional services from October through December in New York, Denver, and Los Angeles, to market test a new item before committing to high volume production.

E. Retail Models

In a preferred embodiment, retailers will operate with minimum or no inventory to achieve significant cost savings in the operation of their business while providing their clientele improved item selection and service. Retailers can use the integrated inventory sharing sub-system to access inventory and can also rely on the continuous flow of items through the distribution pipeline to timely fulfill purchase orders from consumers.

Because of the very accurate consumption forecasts derived from the predictive ordering shopping model described previously in Section A, manufactures and producers can plan just-in-time shipments to a multitude of regional distribution centers in accordance with anticipated consumption. These shipments will include the following two categories:

items pre-sold to consumers through the predictive ordering sub-system, and
items expected to be sold based upon relatively accurate consumption forecasts.

To accommodate the residual margin of error in the consumption forecasts, the retailers in each regional area can maintain a small virtual inventory in a regional integrated inventory sharing sub-system to ensure that orders from consumers can be promptly fulfilled. With this arrangement, the equivalent amount of shared inventory per retailer is equal to the small virtual inventory divided by the number of retailers which should equate to an insignificant value.

The regional virtual inventory model offers a retailer the capability to fulfill purchase orders requiring immediate delivery irrespective of the item ordered, the time the order is placed, the location of the consumer, and the inventory held by the merchant.

If an order requires immediate delivery of a specific item, the virtual inventory model can identify a location having inventory of the item, which is closest to the consumer needing the item. Once the location having inventory of the item is identified, the retailer can book the order and the consumer has several alternatives to receive the item, including:

(1) Pick up the item at the identified location.
(2) Have the item sent to an order aggregation facility proximate the consumer, where the consumer can pick up the item.
(3) Have the item delivered to an address specified by the consumer.

This model addresses the issue of immediate delivery of online orders and gives consumers the assurance of being able to instantly get any item at any time anywhere in the country.

On an average basis, it is expected that a consumer can buy an item online, drive to a designated place to pick up the item purchased and drive back home in much less time than under the conventional system, which involves driving to a store, finding the item in the store shelves, going through the checkout register and driving back home. This comparison assumes that under the conventional system the consumer is able to find the item at the first store the consumer visits, which often is not the case and the consumer ends up by having to try several stores before finding the needed item. The worst case under the conventional system happens when the item is not available anywhere in the region, which forces the consumer to order the item from an out of town merchant and wait a few days for delivery of the item.

The retail model also involves a potential reallocation of space in a retail establishment. Because of the inventory reduction, an appreciable amount of space may become available in a retail establishment. Depending upon the circumstances, the retailer can reallocate the available space to operate a shopping kiosk with shopping web browsers, a window shop, or an order aggregation facility, all of which would attract additional consumers to the retail establishment. For example, in a rural area a retailer may decide to operate a shopping kiosk and an order aggregation facility to serve the residents of the rural area. In another example, a large box retailer in a downtown area may decide to operate various window shops, each specializing in a different type of item. In still another example, a small retail establishment in a metropolitan area may decide to operate a shopping kiosk with comfortable sitting and a coffee bar where patrons can enjoy a web shopping spree in a pleasant atmosphere.

F. Consumption Monitoring and Forecasting Models

Consumption monitoring and forecasting models are essential for improving the productivity of manufactures and producers. The online shopping data collected in real-time by the supply-chain management system can be compiled to provide each manufacturer or producer minute by minute consumption data for each of the items the manufacturer or producer provides. The consumption data can be analyzed to establish potential correlations with factors that can affect consumption, such as weather conditions, season of the year, state of the economy, interest rates, etc. The consumption data can be further analyzed to establish a correlation between consumption associated with predictive ordering and consumption not associated with predictive ordering. These correlations provide the basis for generating accurate consumption forecasts for the benefit of manufacturers and producers.

Another important correlation associated with real-time consumption data is consumption sensitivity to price. This can only be done with real-time consumption data, whereby a manufacturer or producer can implement a price change and get immediate feedback of the effect of the price change on consumption. Once this correlation is established, manufacturers and producers will have the tools necessary to set prices that best fit their objectives. For example the price point can be set to satisfy one of a variety of different criteria. Examples of such criteria are optimization of revenue, profits, sales volume, sales volume subject to given profit constraints, etc.

II. Major Components of the Supply-Chain Management System

FIG. 1 illustrates a block diagram of a preferred embodiment of the supply-chain management system 100, which includes the following six components:
A. An order aggregation management sub-system 101.
B. An integrated inventory sharing sub-system 102.
C. A predictive ordering sub-system 103.
D. A consumer preference code sub-system 104.
E. A window shop management sub-system 105.
F. A supply-chain management sub-system 106.

The first five components are integrated together through supply-chain management sub-system 106 as illustrated in FIG. 1 by interconnecting lines terminated by arrows between the components. Components 101-106 can be considered as sub-systems of the supply-chain management system 100 and an implementation may include these sub-systems as an integral part of the supply-chain management system 100. For the purpose of this description, the components 101-106 will be assumed to interact with as opposed to being part of the supply-chain management system 100 to better illustrate the functional aspects of each of the components.

In the sections that follow, each of the above components will be described in further detail and further the description will explain the interdependencies that may exist between the various components.

For ease of transaction tracking, preferably there are unique names for the various participants and for the various transactions executed by the participants in the supply-chain management system 100 that allow the users to unambiguously look up and correlate information. For participant names, technologies for effecting the uniqueness and currency of such names are well understood by those skilled in the art, and it is assumed that the supply-chain management system 100 enforces a unique naming scheme on all participants. For transaction identification, each participant can label particular transactions with its own identification scheme, and the supply-chain management system 100 can, for the convenience of all participants, provide a correlation service, impose its own identification scheme, or both. These identifications need to be communicated, preferably automatically, as orders are processed. This description assumes that such a technique for the unambiguous identification of participants and transactions has been employed, and that transaction identifications are propagated through the system as transactions are processed.

A. The Order Aggregation Management Sub-System

The order aggregation management sub-system 101 provides the management and coordination functions that support the concept of order aggregation. This concept provides an efficient and cost effective web-based system for managing the transfer of items from merchants to consumers.

Figure 2:
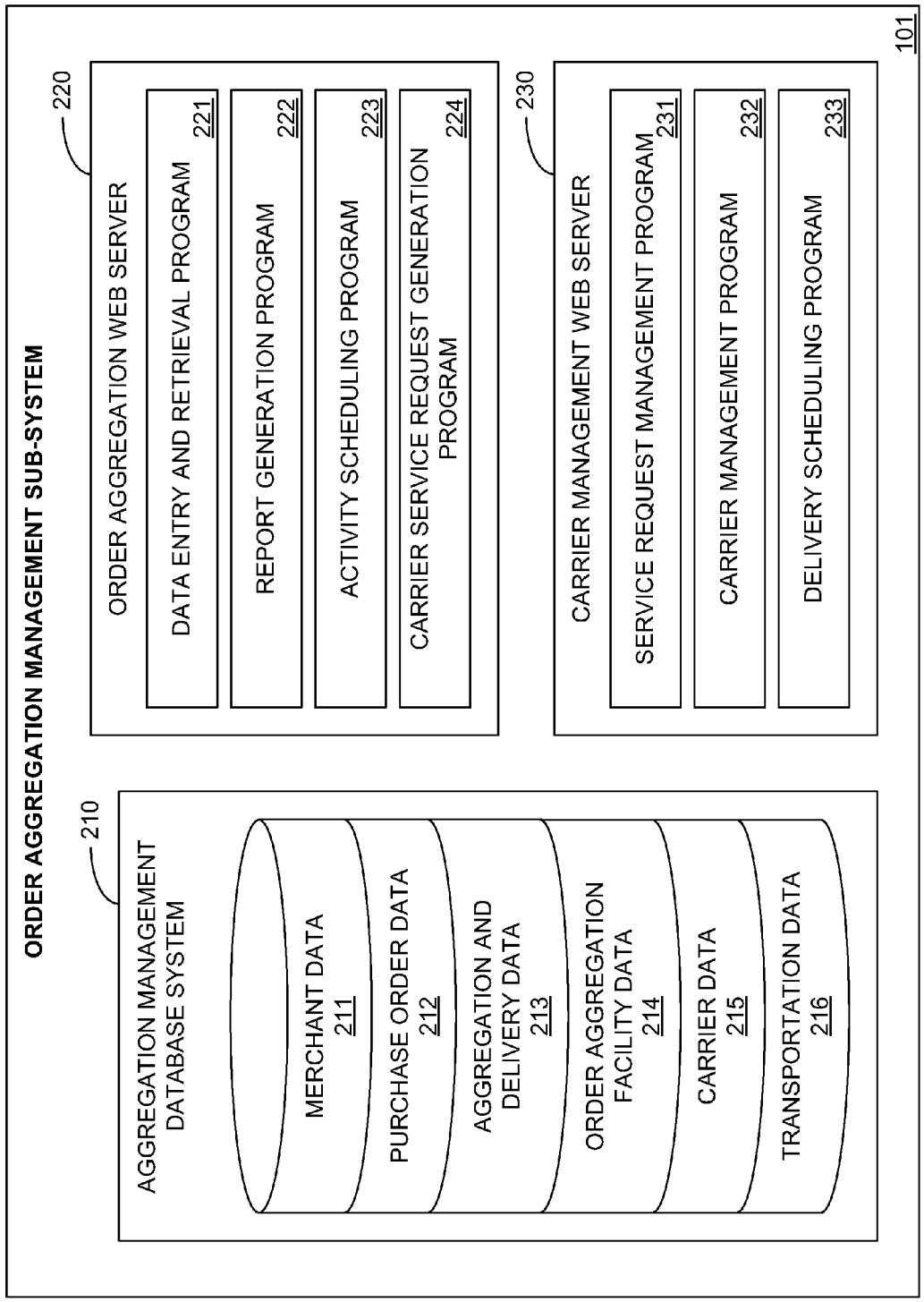
FIG. 2 illustrates a block diagram of a preferred embodiment of the order aggregation management sub-system.

FIG. 2 shows a block diagram of a preferred embodiment of the order aggregation management sub-system 101. The diagram includes an aggregation management database system 210, an order aggregation web server 220, and a carrier management web server 230.

The order aggregation database system 210 is preferably organized by the type of participant or transaction in the supply-chain management system 100, in the following separate sections:

1. Merchant data 211 for each merchant participating in the supply-chain management system 100, which can include:
   (a) The identification of the merchant.
   (b) The contact information for the merchant.
   (c) The identification of shipping facilities from which the merchant ships items purchased by consumers.
   (d) The identification of a physical address of each of the shipping facilities.
2. Purchase order data 212 for each consumer. When a consumer places a purchase order with a merchant, a purchase order record is preferably created in the aggregation management database system 210, wherein for each purchase order record the purchase order data for the consumer preferably includes the following:
  (a) An identification of the consumer.
  (b) An identification of the merchant.
  (c) An identification of the purchase order.
  (d) A time stamp identifying a booking date and time of the purchase order.
  (e) An identification of each of the items in the purchase order.
  (f) A quantity of each of the items in the purchase order.
  (g) A price of each of the items listed in the purchase order.
3. Aggregation and delivery data 213 for each purchase order placed by consumer. Preferably, after the order is booked, the consumer is given the opportunity to provide aggregation instructions for the items purchased. The consumer can provide the aggregation instructions after completing the purchase order or after placing other purchase orders with other merchants, which may take several days. The aggregation instructions can be updated to include other purchases made by the consumer after providing the aggregation instructions. Preferably when the consumer books a new purchase order, the order aggregation management sub-system 101, informs the consumer of any previous pending orders placed by the consumer and not yet completed with aggregation instructions. This gives the consumer the opportunity to edit the aggregation instructions to include a new purchase order in the aggregation instructions. The aggregation and delivery data preferably includes the following:
  (a) Consumer aggregation instructions for items designated for physical aggregation in one or more purchase orders placed by the consumer, wherein the consumer aggregation instructions include combining the items designated for physical aggregation listed in one or more purchase orders in one or more batches, whereby the items in each batch are physically aggregated together before being transferred to the consumer.
  (b) An identification of a date and time for the transfer of each batch of physically aggregated items to the consumer.
  (c) An identification of an order aggregation facility to which the items in each batch are to be sent to be physically aggregated.
  (d) An identification of pick up and delivery information for each batch of physically aggregated items, indicating that the consumer will pick up the batch of physically aggregated items at the identified order aggregation facility or that the batch of physically aggregated items will be delivered to an address designated by the consumer.
4. Order aggregation facility data 214 for each order aggregation facility participating in the supply-chain management system 100. The order aggregation facility data for each order aggregation facility, preferably includes:
  (a) The identification of the order aggregation facility.
  (b) The contact information for the order aggregation facility.
  (c) The physical address of the order aggregation facility.
  (d) Schedules of shipments to be received by the order aggregation facility, which can be compiled from the merchant data, the purchase order data, and the aggregation and delivery data.
  (e) A list of items included in each of the shipments, which can be compiled from the merchant data, the purchase order data, and the aggregation and delivery data.
  (f) The identification of each consumer scheduled to receive a physically aggregated batch of items from the order aggregation facility, which can be extracted from the aggregation and delivery data.
  (g) Aggregation facility instructions, which can be compiled from the merchant data, the purchase order data, and the aggregation and delivery data, and include instructions for temporarily storing the items scheduled to be received by the order aggregation facility, instructions for aggregating the items scheduled to be received by the order aggregation facility; and instructions for transferring batches of physically aggregated items to consumers.
  (h) Aggregation facility schedules compliant with the identified dates and times for transferring batches of physically aggregated items to consumers, which can be compiled from the aggregation and delivery data, and include schedules for performing physical aggregations of items into batches and schedules for transferring batches of physically aggregated items to consumers.
5. Carrier data 215 for each of the carriers that provide carrier services managed by the order aggregation management sub-system, which can include:
  (a) The identification of the carrier.
  (b) The contact information for the carrier.
  (c) An identification of the transportation resources used by the carrier.
  (d) An identification of the geographic areas and routes serviced by the carrier.
6. Transportation data 216 consisting of carrier service requests generated by the order aggregation management sub-system in compliance with the aggregation and delivery data, which preferably include:
  (a) An identification of a point of origin.
  (b) An identification of a point of destination.
  (c) A listing of items to be carried.
  (d) A transportation schedule.

The order aggregation web server 220 is preferably configured to access the aggregation management database system 210 and to execute application programs to coordinate the various tasks associated with transfers of items from merchants to consumers. These application programs can include the following:
  1. A data entry and retrieval program 221 to enter and maintain in real-time the aggregation management data in the aggregation management database system and respond to queries related to the aggregation management data.
  2. A report generation program 222 for generating reports with data and instructions for each order aggregation facility participating in the operation of the order aggregation management sub-system. This data can be extracted from the merchant data, the purchase order data, and the aggregation and delivery data.
  3. An activity scheduling program 223 for scheduling activities for each order aggregation facility, including the activities of receiving, temporarily storing, physical aggregating, and transferring to consumers items shipped to the order aggregation facility.
  4. A carrier service request generation program 224 configured to schedule shipments of items designated for physical aggregation. The program can use the aggregation and delivery data to generate carrier service requests for each of the items purchased by consumers to be transported from a point of origin to the identified order aggregation facility in accordance with a just-in-time schedule compliant with the aggregation and delivery data.

The carrier management web server 230 is preferably configured to access the aggregation management database system 210 and to execute application programs to coordinate tasks associated with the transportation operations of the plurality of carriers, based at least on the data in the aggregation management database system. These application programs can include the following:

1. A service request management program 231 configured to combine carrier service requests with the same point of origin, the same point of destination, and the same transportation schedule to optimize the utilization of the transportation resources used by the carriers.
2. A carrier management program 232 configured to coordinate in real-time the operation of the plurality of carriers that provide carrier services to support the operation of the supply-chain management system 100. Preferably, the carrier coordination program 232 uses the transportation data stored in the aggregation management database system to provide coordination information that can be used by carrier services to efficiently comply with carrier service requests to be fulfilled.
3. A delivery scheduling program 233 for scheduling carrier services to deliver batches of physically aggregated items to consumers. For each delivery, the delivery scheduling program 233 can schedule a time for a delivery service to pick up a batch of physically aggregated items for delivery to an address designated by the consumer, at a designated date and time. Preferably the program should be able to combine multiple deliveries and pickups at consumer residences and order aggregation facilities to optimize equipment utilization.

B. The Integrated Inventory Sharing Sub-System

The integrated inventory sharing sub-system 102 helps participating merchants reduce required operating inventories, balance inventories, reduce inventory costs, and fulfill consumer orders in the case of an inventory shortage. The system provides a Internet-based computing foundation for participating merchants to share inventories. Each participating merchant provides an inventory list of sharable items the merchant is willing to make available to the other merchants participating in the inventory sharing sub-system. The composite of the inventory lists of sharable items provided by each of the merchants represents a virtual inventory that is available to each of the participating merchants. Preferably, a merchant with an empty list of sharable items can be a participant in the integrated inventory sharing sub-system and rely entirely on the virtual inventory to run a retail business. Assuming participation from most merchants, the integrated inventory sharing sub-system creates an open market for the inventory in the distribution pipeline, which allows the inventory to be available, in real-time, wherever the demand exists. For example, the integrated inventory sharing sub-system may be used to locate an item in close proximity to the place where the item is needed.

Figure 3:
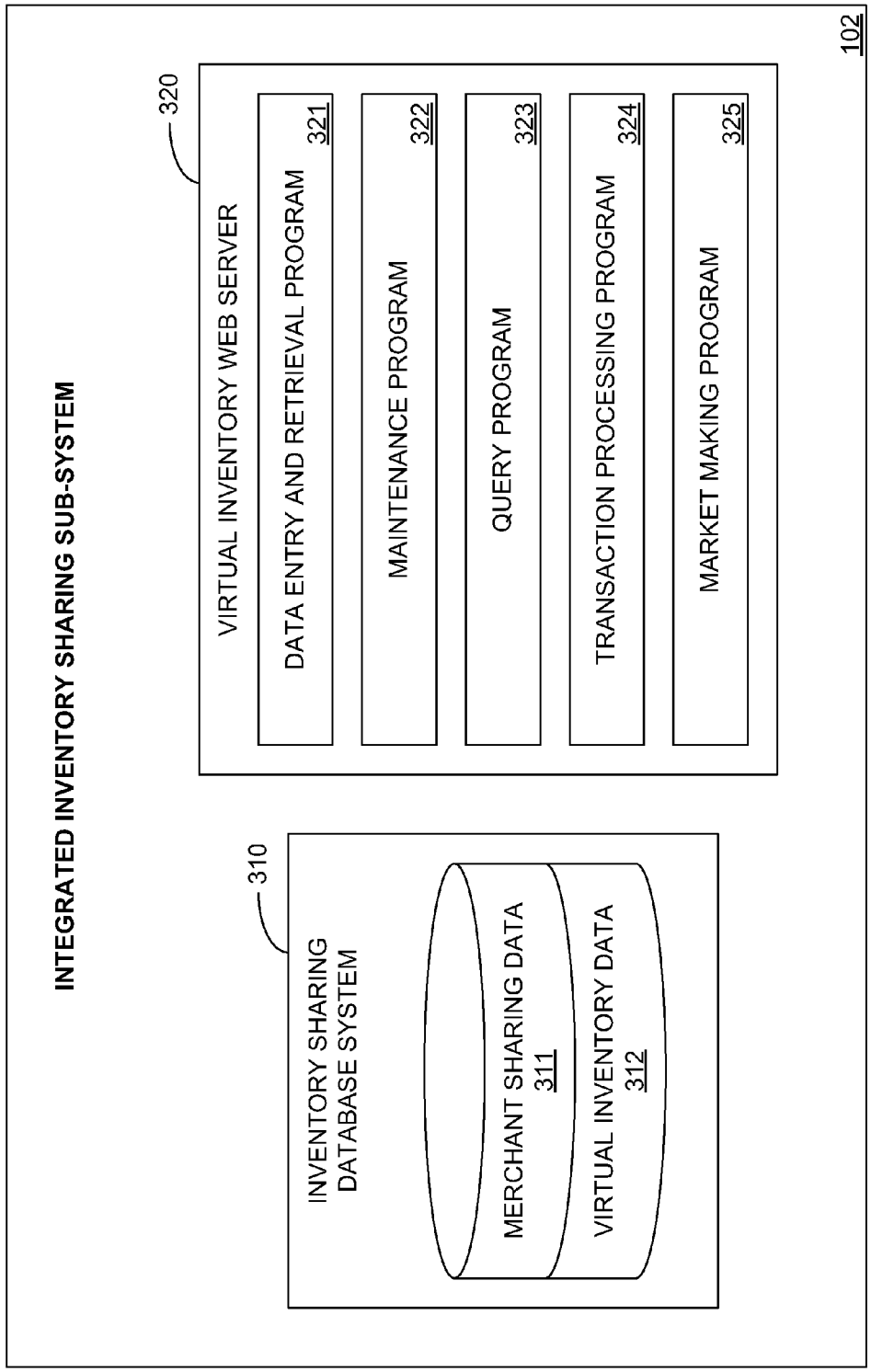
FIG. 3 illustrates a block diagram of a preferred embodiment of the integrated inventory sharing sub-system.

FIG. 3 shows a block diagram of a preferred embodiment of the integrated inventory sharing sub-system 102. The Internet-based computing foundation of the integrated inventory sharing sub-system 102 preferably includes an inventory sharing database system 310 configured to store inventory sharing data and a virtual inventory web server 320 configured to access the inventory sharing data database system 310 and to execute application programs to operate the integrated inventory sharing sub-system 102.

The inventory sharing database system 310 is preferably configured to include the following information:

1. Merchant sharing data 311 for each participating merchant including merchants that do not hold inventory. Preferably, the merchant sharing data includes the following:
   (a) An identification of the merchant.
   (b) An identification of sharable inventory data consisting of:
      (1) An identification of sharable items, wherein a sharable item is an item the merchant is willing to make available to the other merchants.
      (2) A quantity associated with each sharable item.
      (3) A physical location of each sharable item.
   (c) Bid and ask prices and quantities for each of the items the merchant may acquire from other merchants or provide to other merchants.
2. Virtual inventory data 312 obtained by computing a composite of the sharable inventory data of all the merchants participating in the integrated inventory sharing sub-system.

The virtual inventory web server 320 is preferably configured to access the inventory sharing database system 310 and to execute application programs to operate the integrated inventory sharing sub-system 102. These programs preferably include:

1. A data entry and retrieval program 321 configured to enter and maintain the inventory sharing data in real-time in the inventory sharing database system and respond to queries related to the inventory sharing data.
2. A maintenance program 322 configured update the virtual inventory data in real-time upon a change of the sharable inventory data of a merchant. Such program needs to be able detect any changes in the sharable inventory data of each merchant participating in the integrated inventory sharing sub-system. Upon detecting a change, the program needs to update the computation of the virtual inventory.
3. A query program 323 configured to respond to queries related to the virtual inventory in real-time. Merchants can use this program to access the virtual inventory when contemplating transactions related to the virtual inventory. For example a merchant with insufficient inventory to complete the fulfillment of a purchase order, may query the virtual inventory to identify a merchant having the items needed. In another example a merchant with surplus inventory of a particular item may post a competitive price on the surplus item to encourage other merchants to use the surplus or to trigger a transaction to transfer the surplus inventory to another merchant able to use the surplus inventory.
4. A transaction processing program 324 configured to execute transactions between merchants, whereby each merchant can use the transaction processing program to negotiate and perform an inventory transaction with another merchant based at least on the virtual inventory data. Preferably the transaction processing program supports inventory transactions between merchants whereby one merchant can acquire inventory from another merchant and pay the other merchant for the acquired inventory.
5. A market making program 325 configured to match bid prices and quantities provided by each merchant with ask prices and quantities provided by each other merchant, based at least on the merchant sharing data. This program can facilitate the process by which a merchant can identify other merchants with which to execute a particular inventory transaction.

C. The Predictive Ordering Consumption Forecasting Sub-System

The predictive ordering Consumption Forecasting sub-system 103 constitutes the implementation of the predictive ordering shopping model described in section I.A. In a preferred embodiment of the predictive ordering sub-system 103, a consumer is given a predictive price discount in exchange for placing a predictive purchase order for an item with a merchant at an order date and accepting delivery at a later delivery date. For the purposes of this description, a predictive order delay (POD) is a time span between the predictive purchase order date and the delivery date. The predictive price discount depends upon the POD and is based upon a cost savings realized by the supply-chain as a result of the advanced knowledge of the predictive purchase order. Preferably, predictive purchase orders are propagated in real-time up the supply-chain to the source manufacturers and producers of the items ordered through the predictive ordering sub-system 103. Historical information on predictive purchase orders can be compared with historical information on non-predictive purchase orders for identical periods of time to establish a correlation factor between predictive and non-predictive purchase orders. The correlation factor can be applied to predictive purchase orders to derive accurate projections of future consumption. Accurate consumption forecasts can provide a powerful tool for the supply-chain to achieve significant productivity improvements. Typically, the major productivity improvements are experienced by source manufacturers, producers, and service providers. The achievable productivity improvements will depend upon how far in the future the forecasts can provide reliable information which depends upon the predictive order delay (POD) and the manufacturing or production cycle associated with each item. For example, for an item with a manufacturing cycle of one week a predictive purchase order for delivery two weeks later may represent very valuable information. Each manufacturer and producer should be able to compute the cost savings attributable to accurate consumption forecasts and determine the portion of such cost savings that can be passed on to consumers in the form of predictive price discounts. The effect of the predictive order delay (POD) upon the cost savings can be computed to provide the basis for predictive discount schedules of predictive price discount versus predictive order delay.

Figure 4:
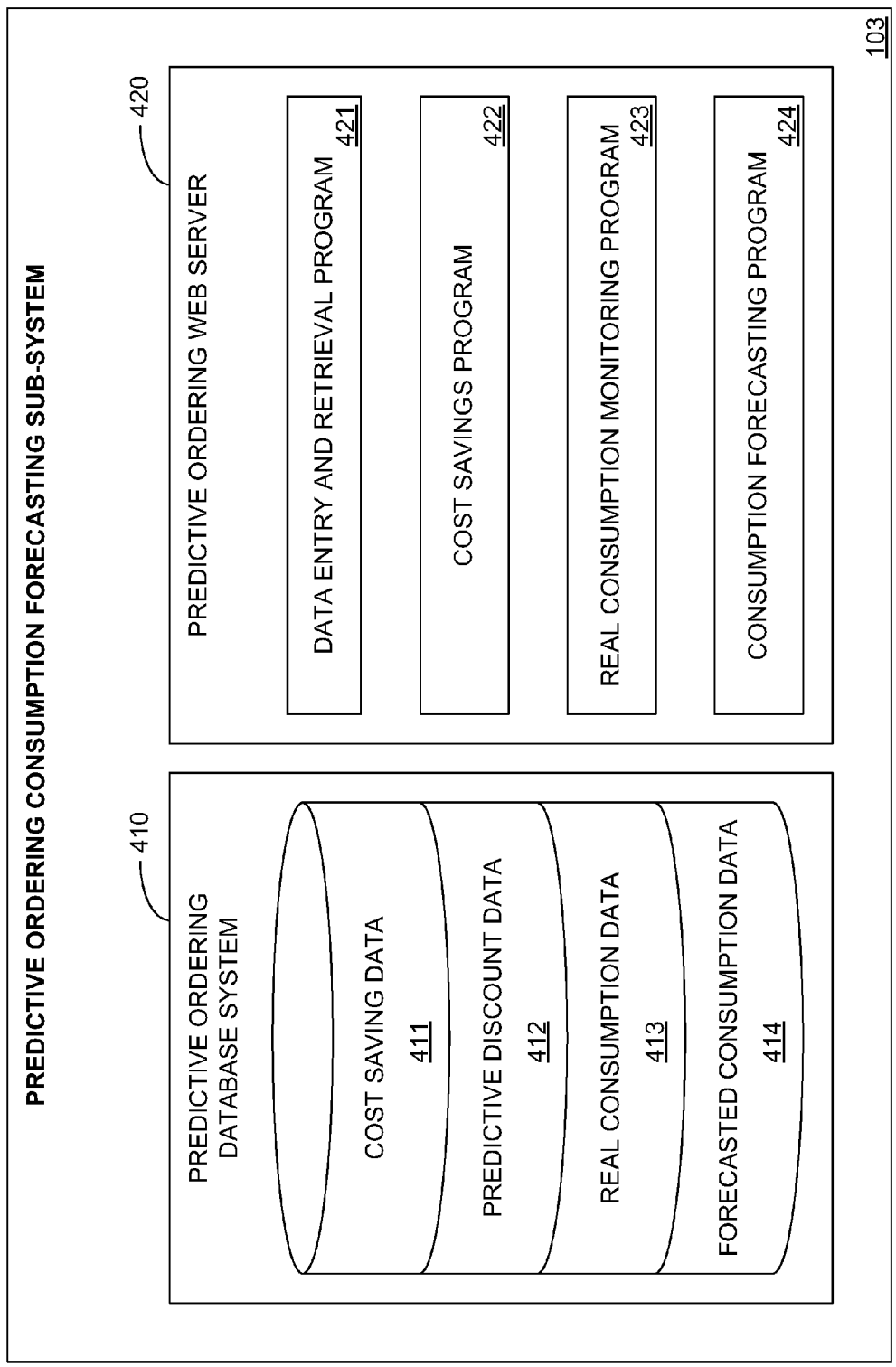
FIG. 4 illustrates a block diagram of a preferred embodiment of the predictive ordering consumption forecasting sub-system.

FIG. 4 shows a block diagram of a preferred embodiment of the predictive ordering sub-system 103. Preferably, the predictive ordering sub-system 103 includes a predictive ordering database system 410 and a predictive ordering web server 420 configured to access the predictive ordering database system 410 and to execute application programs to operate the predictive ordering sub-system 103.

The predictive ordering data database system 410 is preferably organized in the following sections:

Cost saving data 411 for each of the items subject to the predictive price discount, which can include:
1. An identification of the item.
2. A matrix of estimated cost savings versus predictive order delay and predictive order volume.

Predictive discount data 412 for each of the merchants participating in the predictive ordering sub-system 103, which can include:
1. An identification of the merchant.
2. An identification of the items supplied by the merchant subject to the predictive price discount.
3. An identification of a predictive discount schedule for each of the items subject to the predictive price discount, wherein the predictive discount schedule identifies the predictive price discount versus the predictive order delay. In a preferred embodiment, the price discount, expressed as a percentage of the regular price listed by the merchant, is uniform across all merchants. Because the list price may vary from merchant to merchant, the absolute value of the discount is proportional to the list price. Different embodiments may apply other discount rules. For example an embodiment may allow each participating merchant to determine its own predictive discount schedule.

Real consumption data 413 for each of the items subject to the predictive price discount, which can include:
1. An identification of the item.
2. The actual consumption of the item compiled from delivered purchase orders for the item. Preferably, the consumption data is configured to provide reports based on a variety of criteria such as by time period, geographic region, retailer booking the order, etc.

Forecasted consumption data 414 for each of the items subject to the predictive ordering sub-system 103, which can include:
1. An identification of the item.
2. The forecasted consumption of the item based upon predictive purchase orders booked, analyzed real consumption data, and historical correlations between predictive and non-predictive purchase orders booked. Preferably, the forecasted consumption data is configured to provide reports based on a variety of criteria such as by time period, geographic region, retailer booking the order, etc.

The predictive ordering web server 420 is preferably configured to access the predictive ordering data database system 410 and to execute application programs to support the operation of the predictive ordering sub-system 103. These programs preferably include:
1. A data entry and retrieval program 421 configured to enter and maintain predictive ordering data in the predictive ordering database sub-system 410 and respond to queries related to predictive ordering data.
2. A cost savings program 422 configured to estimate, for each of the items subject to the predictive price discount, a cost savings realized by the supply-chain versus the predictive order delay. This program preferably receives as input certain parameters that identify and quantify the impact of the advanced knowledge of the purchase or order on the cost savings.
3. A real consumption monitoring program 423 configured to analyze real consumption data.
4. A consumption forecasting program 424 configured to generate consumption forecasts based upon predictive purchase orders booked, analyzed real consumption data, and identified correlation factors between predictive and non-predictive purchase orders booked.

D. The Consumer Preference Code Sub-System

The consumer preference code sub-system 104 constitutes one implementation of the consumer preference codes shopping model described in section I.A. The consumer preference code sub-system 104 provides a systematic solution for the problem of identifying items of non-uniform type that meet the preferences of a consumer. The consumer preference code sub-system 104 identifies for each class of non-uniform generic items known by consumers by a generic name, a plurality of sub-classes wherein the items in each sub-class are representative of a different consumer preference. Using the consumer preference code sub-system 104, a consumer can place an order online for an item of non-uniform type with confidence that the item ordered will conform to the preferences of the consumer.

Figure 5:
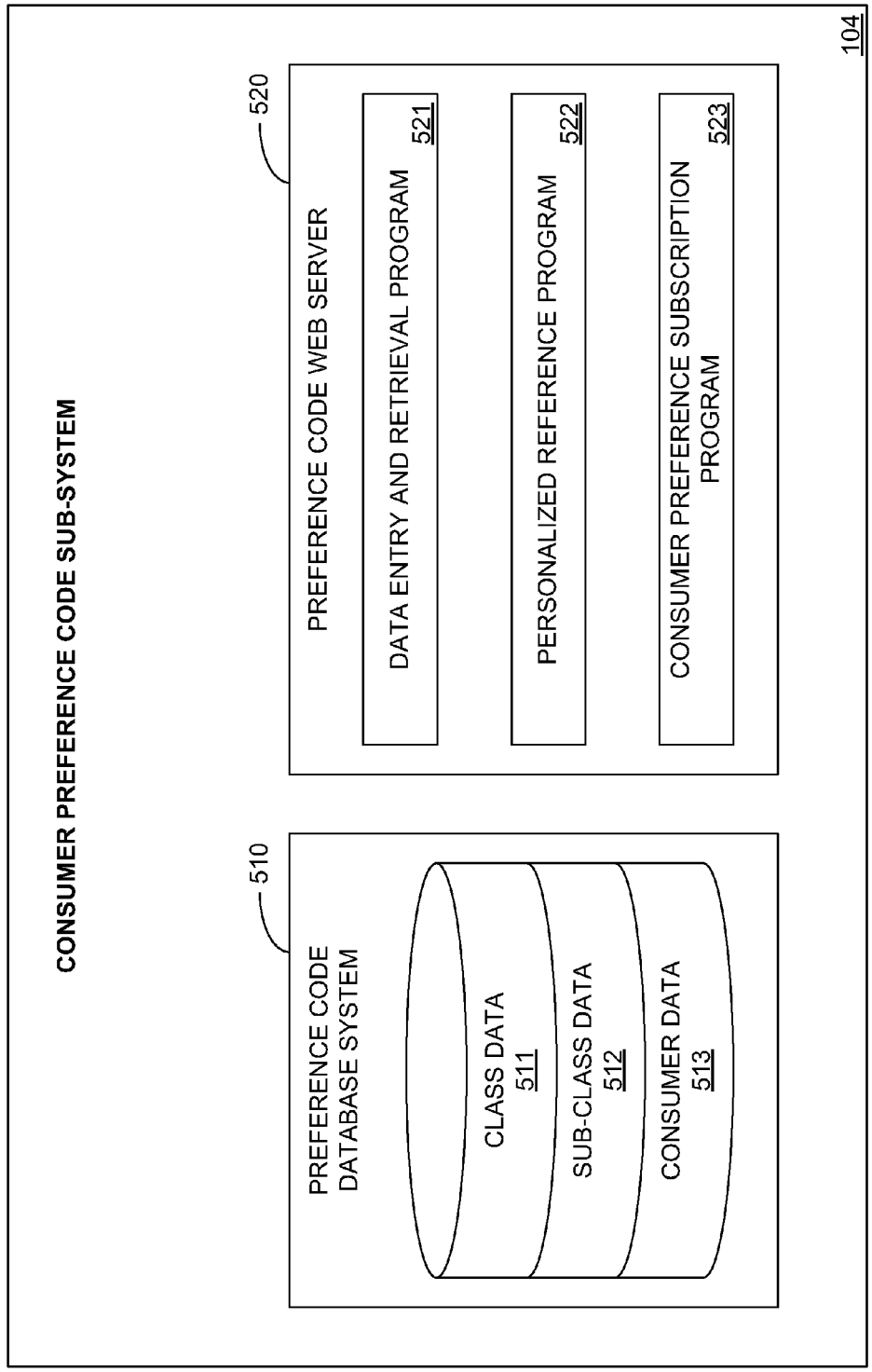
FIG. 5 illustrates a block diagram of a preferred embodiment of the consumer preference code sub-system.

FIG. 5 shows a block diagram of a preferred embodiment of the consumer preference code sub-system 104. Preferably, the consumer preference code sub-system 104 includes a preference code database system 510 configured to store preference code data and a preference code web server 520 configured to access the preference code database system 510 and to execute application programs to operate the consumer preference code sub-system 104.

The preference code database system 510 is preferably configured to store preference code data for each class of non-uniform generic items of a plurality of different classes of non-uniform generic items identified by a generic name. The preference code data can be organized in the following three categories:

1. Class data 511, wherein the class data 511 can include an identification of the class of non-uniform generic items and an association of the class of non-uniform generic items with the generic name.
2. Sub-class data 512 for each class of non-uniform generic items, wherein each sub-class represents a different consumer preference. For each class, the sub-class data 512 preferably includes:
   (a) An identification of each characteristic of a set of quantifiable characteristics used to define the sub-class. Preferably, the identification of each quantifiable characteristic is represented by at least one word describing the quantifiable characteristic.
   (b) An identification of a range of values for each characteristic of the set of identified quantifiable characteristics, wherein each of the values in the range represents a measure of the quantifiable characteristic.
   (c) An identification of the sub-class. The identification of the sub-class can include the generic name of the items in the class and an assigned value for each of the quantifiable characteristics used to define the sub-class.
3. Consumer data 513 for each consumer of a plurality of consumers that subscribe to the consumer preference code sub-system. For each consumer, the consumer data 513 for each consumer preference preferably includes:
   (a) An identification of the consumer.
   (b) An identification of a class of non-uniform generic items
   (c) An identification of a sub-class identified by the consumer as representing a preference of the consumer.
   (d) An identification of an optional personalized reference supplied by the consumer for the sub-class identified by the consumer as representing a preference of the consumer. The personalized reference can be used as shorthand to designate the sub-class and should be associated with the class of non-uniform generic items from which the sub-class is derived, the sub-class, and the consumer.

The preference code web server 520 is preferably configured to access the preference code database system 510 and to execute application programs to operate the consumer preference code sub-system 104. These programs preferably include:

1. A data entry and retrieval program 521 configured to enter and maintain the preference code data in the preference code database system 510 and respond to queries related to the preference code data.
2. A personalized reference program 522 configured to receive as input the identification of a consumer and the identification of a generic name associated with a class of non-uniform generic items. Based on the input the program returns each of the optional personalized references supplied by the consumer for the class of non-uniform generic items associated with the generic name. When a consumer shops online for a generic item, once the generic item is selected by the consumer the personalized reference program can automatically display the personal references the consumer created. Then the consumer can just click on the desired personalized reference to complete the selection.
3. A consumer preference subscription program 523 configured to display on a browser web pages for a consumer to subscribe to the consumer preference code sub-system. Preferably, the program will include the following components:
   (a) A component for the consumer to register as a user of the consumer preference code sub-system.
   (b) A component for the consumer to select a class of non-uniform generic items.
   (c) A component for the consumer to select a sub-class of generic items from the class of non-uniform generic items.
   (d) A component for the consumer to register a preference for the selected sub-class.
   (e) A component for the consumer to provide an optional personalized reference the consumer may wish use to refer to the sub-class of generic items.

E. The Window Shop Management Sub-System

With the deployment of the supply-chain management system 100, the conventional retail stores that operate as very costly warehouses with shelves full of merchandise will tend to disappear because they operate under a most inefficient business model. However, these inefficient retail stores have fulfilled an important social need commonly known as "window shopping" that will remain and should not be avoided. With the supply-chain management system 100, the window shop provides a new model to fulfill the "window shopping" social need. This new model addresses the "window shopping" need with a direct approach that focuses on the basic reason that drives consumers to window shop. That basic reason is driven by consumers needing to justify to themselves their own buying impulses. The window shop is especially configured to provide consumers all the justification they need to eventually make that buying decision and feel very good about it.

The window shop management sub-system 105 constitutes one implementation of the promotion and introduction models described earlier in section I.D. The window shop management sub-system 105 manages and coordinates the operation of a plurality of window shops, wherein a window shop is a commercial establishment configured to provide display space and facilities where merchants can display, promote, present, and launch their items. Preferably, each window shop is staffed with personnel qualified to explain item features, give demonstrations, answer consumer inquiries, provide technical support, provide consumer training, and assist consumers with selection of items and order placement. In the window shop consumers can make informed selections and decisions with respect to items they may be interested in acquiring.

Preferably, the window shop management sub-system 105 also performs the function of compiling and summarizing information on consumers' interests and purchase plans collected by window shop personnel during consumer visits to window shops as indicated in Section I.D. The compiled and summarized information is preferably communicated by the window shop management sub-system to the manufacturers and producers that provide the items for which the information is collected.

The window shop management sub-system 105 also coordinates and operates the decentralized exhibition system as a general promotional and advertising service offered to manufacturers and service providers to promote and advertise their items. The decentralized exhibition system gives manufacturers and service providers the opportunity to appeal to the consumer's desire for novelty, performance, quality, and pride of ownership without exerting undesirable pressure tactics that consumers often resent. The decentralized exhibition system can become an effective and compelling alternative to the conventional promotional and advertising models often based on misleading information, brute force, and shot gun tactics to attract consumers.

Figure 6:
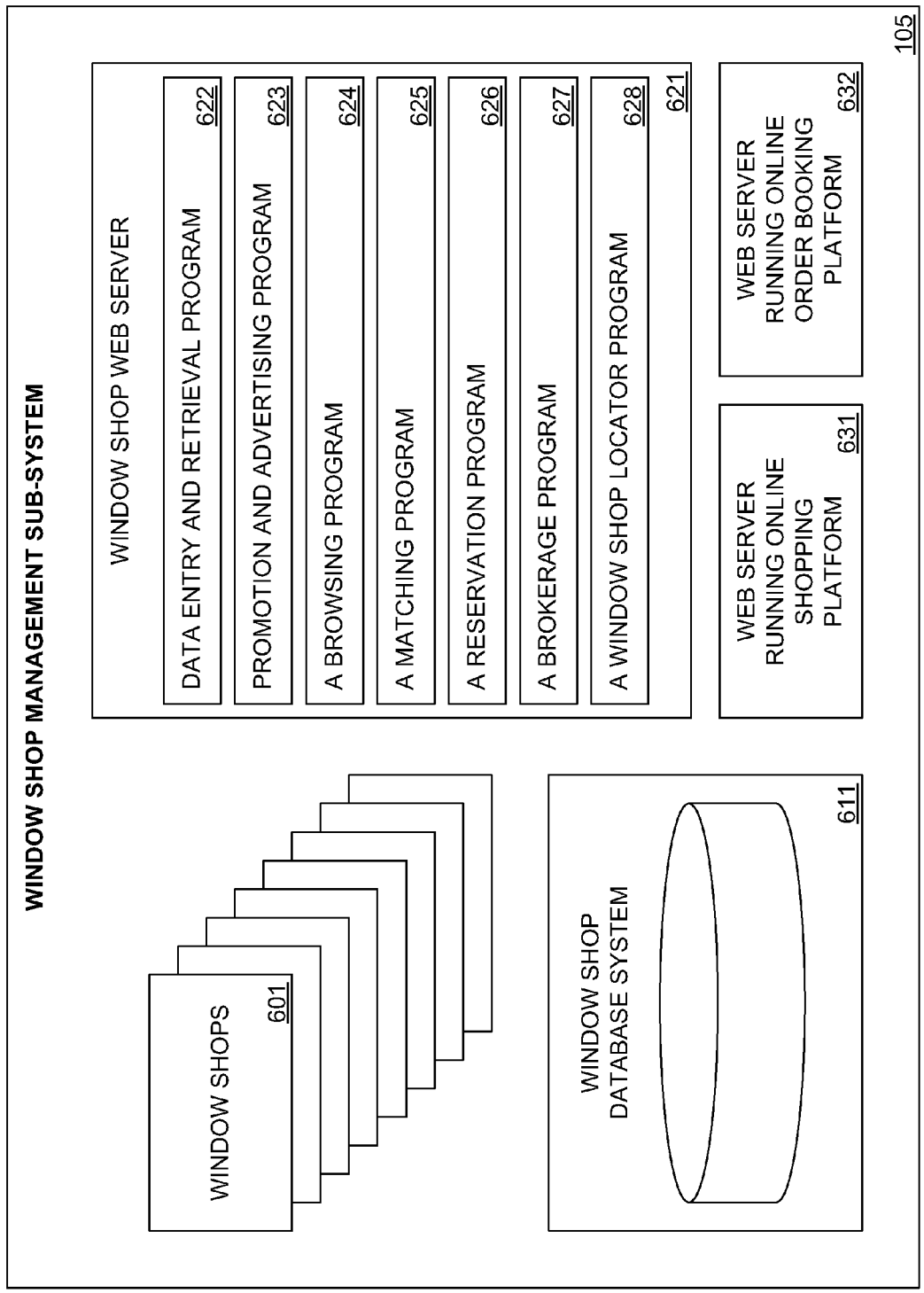
FIG. 6 illustrates a block diagram of a preferred embodiment of the window shop management sub-system.

FIG. 6 shows a block diagram of a preferred embodiment of the window shop management sub-system 105 that manages a plurality of window shops 601 and manages a decentralized exhibition system not shown in the figure. Preferably, the window shop management sub-system 105 includes a window shop database system 611 configured to store window shop data for each of the participating window shops and a window shop web server 621 configured to access the window shop database system 611 and to execute application programs to coordinate tasks associated with the operation of the plurality of window shops 601 and the decentralized exhibition system. In addition, the window shop management sub-system 105 can also use a web server running an online shopping platform 631 and an online order booking platform 632, both of which can be provided by the supply-chain management sub-system 106.

The window shop database system 611 is preferably configured to store window shop data, wherein the window shop data for each window shop of a plurality of window shops supervised by the window shop management sub-system preferably includes the following:
 1. An identification of the window shop.
 2. An identification of contact information for the window shop.
 3. An identification of the physical location and address of the window shop.
 4. A description of facilities and services provided by the window shop.
 5. An identification of days and hours of operation for the services offered by the window shop.
 6. An identification of each item promoted by the window shop on the behalf of merchants that book the services of the window shop. Preferably the identification of each item is maintained in real-time, whereby the window shop web server can respond to a query inquiring which window shops promote a given item.
 7. An identification of terms, conditions, and fees applicable to the facilities and services provided by the window shop to merchants.
 8. An availability record identifying the availability of facilities and services provided by the window shop versus calendar time. Using the availability record, the window shop can respond to availability inquiries for the facilities and services provided by the window shop.

Preferably, window shops maintain historical records of services and facilities provided to merchants. These records can provide very valuable information for the study and analysis of the relative effectiveness of the window shop model as a promotion and advertising tool.

The window shop web server 621 is preferably configured to access the window shop database system 611 and to execute application programs to coordinate tasks associated with the operation of each window shop and the decentralized exhibition system. These application programs can include the following:
 1. A data entry and retrieval program 622, configured to enter and maintain the window shop data in the window shop database system 611 and respond to queries related to each of window shops.
 2. A web-based promotion and advertising program 623, configured to promote and advertise to merchants the facilities and services a window shop provides for the benefit of merchants.
 3. A browsing program 624, configured to provide browsing web pages to view and browse window shop data.
 4. A matching program 625 configured to match a given set of merchant requirements for window shop facilities and services with each window shop configured to fulfill the given set of merchant requirements.
 5. A window shop reservation program 626, configured to reserve window shop facilities and services during a given period of time in one or more geographic locations. The reservation program can be used in connection with the decentralized exhibition system for market testing of new items, new item launches, focus groups, etc.
 6. A window shop brokerage program 627, configured to execute booking transactions between merchants and window shops for facilities and services provided by window shops.
 7. A window shop locator program 628, configured to locate window shops based on given criteria, wherein the given criteria include the identification of item represented by a window shop and a distance from a specified location to the window shop.

The web server running the online shopping platform 631 is preferably configured to support consumer online shopping and interface with the supply-chain management sub-system 106. The window shops are preferably equipped with browsers for the use of consumers who wish to access the online shopping platform while visiting the window shop. For the convenience of window shops wishing to offer online shopping to consumers, the supply-chain management sub-system 106 can be configured to provide these web servers that display web pages for supporting a plurality of online shopping related activities.

The web server running the online order booking platform 632 is preferably configured to support order booking and processing services for booking and processing purchase orders placed by consumers. The online order booking platform 632 can be accessed by the window shop personnel and is preferably configured to interface with the supply-chain management sub-system 106. For the convenience of merchants, the supply-chain management sub-system 106 can be configured to provide web servers that offer order booking services for each of the window shops wishing to use the services.

From a functional perspective a window shop serves two distinct functions in one facility. A first function provides window shop services for manufacturers, producers, service providers, and consumers. A second function operates in the capacity of a retailer that sells items to consumers. This dual function creates a favorable synergy with the potential of making a window shop a very successful business model.

F. The Supply-Chain Management Sub-System

Figure 7:
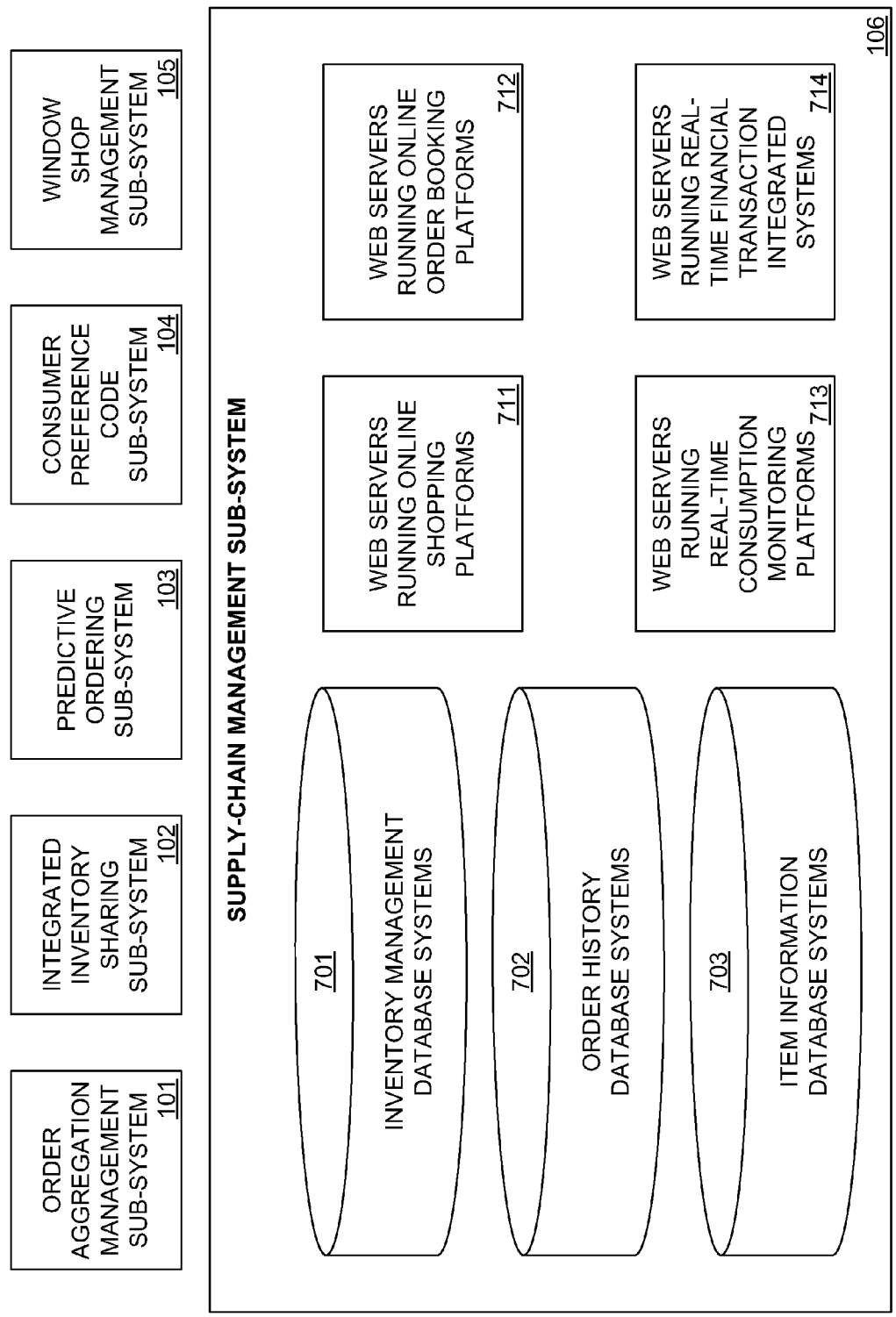
FIG. 7 illustrates a block diagram of a preferred embodiment of the supply-chain management sub-system.

FIG. 7 shows a block diagram illustrating a preferred embodiment of the supply-chain management sub-system 106. As previously shown in FIG. 1, to support the just-in-time operation of the supply-chain management system 100, the supply-chain management sub-system 106 can be configured to integrate and provide coordination for the operation of the following sub-system components shown separately in FIG. 7 and previously described in Sections II.A-E:

(A) The order aggregation management sub-system 101, to facilitate a rapid transfer of items from merchants to consumers and reduce transportation costs in the supply-chain.

(B) The integrated inventory sharing sub-system 102, to help reduce inventories held by merchants.

(C) The predictive ordering sub-system 103, to provide accurate forecasting of future consumption.

(D) The consumer preference code sub-system 104, to facilitate online shopping of non-uniform generic items.

(E) The window shop management sub-system 105, to manage window shops where consumers can fulfill their window shopping needs and where manufacturers and producers can promote or launch new items.

In addition, the supply-chain management sub-system 100 can perform the following functions:

(a) Track inventory levels in the supply-chain and reduce inventory levels in the supply-chain.

(b) Collect consumption data in real-time and distribute consumption data in real-time to manufactures and producers to improve manufacturing and production efficiency.

(c) Integrate and coordinate the operation of a set of Internet-based transaction platforms and tools that facilitate online shopping, predict and stabilize consumption, reduce overall supply-chain costs, and promote economic growth.

To emphasize the multiplicity of functional aspects of this invention this description addresses a configuration where the five sub-system components (A) through (E) listed above operate as sub-systems of the supply-chain management system 100. More specifically, FIGS. 2-6 include separate references to various boxes representing database systems and various boxes representing data, whereby some of the database systems and data represented in the different figures may physically be the same. For example, FIG. 2 shows merchant data 211 and FIG. 3 shows merchant sharing data 311 because theoretically the set of merchants that participate in the order aggregation management sub-system 101 may not be the same as the set of merchants that participate in the integrated inventory sharing sub-system 102. For these reasons FIG. 7 also includes the sub-system blocks 101 through 105, which are the other sub-components of the supply-chain management system 100. However, an implementation may choose to integrate these sub-components into a complex supply-chain management system that includes all the functions related to blocks 101 through 106. In another example, FIGS. 6 and 7 refer to web servers running online shopping platforms and web servers running online order booking platforms to emphasize the differences in the functional aspects of order placement and order booking. However, an implementation may choose to combine these two functions in one server, which is the conventional approach for online shopping.

FIG. 7 also depicts the following basic components of the supply-chain management sub-system 106:

1. Inventory management database systems 701 which can be configured to store merchant inventory data in real-time for each merchant participating in the supply-chain management system as transactions that affect inventories take place.

2. Order history database systems 702 preferably configured to store booked order data for each purchase order booked by each merchant participating in the supply-chain management system.

3. Item information database systems 703 preferably configured to store item data for each item provided by at least one merchant of the plurality of merchants participating in the supply-chain management system, wherein the item data characterizes the item.

4. Web servers running online shopping platforms 711 which can be configured to provide web pages for supporting a plurality of online shopping activities that facilitate online shopping by consumers from merchants in accordance with the requirements of the supply-chain management system 100.

5. Web servers running online order booking platforms 712 which can be configured to provide merchants with online order booking services compliant with the requirements of the supply-chain management system 100.

6. Web servers running real-time consumption monitoring platforms 713 which can be configured to execute programs to compile consumption monitoring data in real-time for each item provided by the merchants participating in the supply-chain management system based at least on purchase orders booked and to provide consumption data and consumption forecasts.

7. Web servers running real-time financial transaction integrated systems 714 which can be configured to execute financial transactions among entities participating in the supply-chain management system 100 to reduce execution times and costs associated with the financial transactions.

For merchants that already use modern computer-based systems configured to manage and update inventories in real-time, support online shopping, support online order booking, and execute financial transactions online, the supply-chain management sub-system 106 can provide integration tools to integrate such modern computer-based systems into the supply-chain management sub-system 106.

The inventory management database systems 701, are preferably configured to store inventory data for each merchant, which can include:

(a) An identification of the merchant.

(b) An identification of each different item of the items held in inventory by the merchant.

(c) An inventory quantity associated with each different item of the items held in inventory by the merchant.

(d) An available quantity associated with each different item of the items held in inventory by the merchant. The available quantity represents the quantity of the item that is available for sale to consumers and corresponds to the quantity in inventory minus a quantity that may have been placed on reservation for pending transactions.

(e) A reserved quantity associated with each different item of the items held in inventory by the merchant. The reserved quantity represents the quantity of the item that is placed on temporary reservation in response to requests for quotations from consumers. When a consumer submits to the merchant a request for a quotation for a given quantity of an item, that quantity of the item is temporality removed from the available quantity and added to the reserved quantity to give the consumer the opportunity to complete an order for the purchase of the item from the merchant with assurance that the order can be fulfilled.

(f) A historical record of items received, manufactured, or produced by each merchant. For each different item received, manufactured, or produced by a merchant, the historical record preferably includes the date and quantity associated with the receipt, manufacture, or production of the item.

The order history database systems 702, preferably store order data for each order booked, which includes:

(a) Purchase order data 212 initially stored in the aggregation management database system 210.

(b) Aggregation and delivery data 213 initially stored in the aggregation management database system 210.

(c) Data collected in connection with the order from the booking step to the delivery step.

It should be understood that the configuration of the order history database systems 702 described above is merely illustrative of the functional aspects of the supply-chain management sub-system 106 and that an implementation may choose a configuration based upon efficiency and/or other considerations.

The item information database systems 703, are preferably used to store descriptive information for the items provided by the merchants participating in the supply-chain management system 100 and provides the foundation for the creation of a universal catalog of items (products and services) described later in this section.

The general purpose web servers running online shopping platforms 711 are preferably configured to provide web pages for supporting a plurality of consumer online shopping activities normally performed by consumers such as:

(a) Item selection among the items provided by the merchants that subscribe to the supply-chain management system 100.

(b) Obtaining pricing and availability information.

(c) Order placement.

(d) Entry of delivery information the consumer may specify.

(e) Entry of order aggregation instructions when the consumer whishes to receive, from an order aggregation facility, described previously in Section I.C, at least one of the items ordered from different merchants.

(f) Order entry.

(g) Payment execution.

In a preferred embodiment, the supply-chain management sub-system 106 provides user friendly shopping platforms to encourage consumers to convert to the comfort of online shopping. The rapid growth of online shopping in recent years shows concrete evidence of the acceptance of online shopping by consumers. However, in its present form, online shopping still suffers from a number of disadvantages and inconveniences well know to consumers, which include shipping charges, shipping time, delivery problems, inability to ascertain if the items ordered online meet the consumer's expectations, inability to obtain a desired item on short notice, etc. These disadvantages and inconveniences are eliminated by the supply-chain management system 100, thereby opening the door for online shopping to become the prevailing model by which consumers shop.

A consumer can setup a personal account in the supply-chain management sub-system 106, whereby online shopping becomes a very simple process. The consumer logs-in a personal account, clicks on the desired items and quantities, clicks on a default pick up and delivery information or enters a different one, and completes the shopping by clicking on an approval button. There is no need to enter payment information because the payment can be set to an automatic mode. There is no need to enter pick up and delivery information if the consumer has already entered one in connection with other previous purchases. Preferably the online shopping platforms can be accessed from the consumer's home computer or from browsers expected to be available is most commercial establishments.

The general purpose web servers running online order booking platforms 712 are preferably configured to provide order booking services for merchants that participate in the supply-chain management system 100. To support the real-time operation of the supply-chain management system 100, the order booking platforms 712 preferably communicate in real-time with the online shopping platforms and the inventory management database systems 701 to update inventories as purchase orders are booked. The order booking data can be directed to the order aggregation management sub-system 101 for further processing and subsequently the order information can be stored in the order history database systems 702.

The order booking platforms 712 are intended for the use of merchants that do not have modern computer-based systems to book orders online in real-time. For the merchants that already use such modern computer-based systems, the supply-chain management sub-system 106 can provide integration tools to integrate such modern computer-based systems into the supply-chain management sub-system 106.

In a preferred embodiment of the order booking platforms 712, the order booking services include:

(a) A request for quotation component configured to receive from a consumer a request for quotation in the form of a list of one or more items and an identified quantity for each of the items on the list.

(b) A quotation component configured to respond to the request for quotation by providing to the consumer, for each item on the list, a quotation taking into consideration the identified quantity of the item and further indicating for each item on the list the quantity available in inventory when the identified quantity exceeds the quantity available in inventory. The quotation component can be configured to support predictive ordering.

(c) A reservation component, including the steps of placing a quantity of each item on the list on temporary reservation on the behalf of the consumer and providing the consumer a confirmation of the temporary reservation indicating the quantity of each item on the list placed on temporary reservation on the behalf of the consumer. For the purposes of this step, the quantity placed on temporary reservation can be the lesser of the requested quantity and the quantity available in inventory.

(d) A booking component configured to receive from a consumer a purchase order in the form of a list of one or more items and an identified quantity for each of the items on the list.

(e) An order processing component configured to perform order processing tasks for each of the items listed in the purchase order. Preferably the order processing tasks include:

1. Updating the inventory held by the merchant by subtracting the identified quantity associated with the item from the quantity of the item held inventory by the merchant.

2. Terminating a temporary reservation that may have been placed on the quantity of the item in connection with the request for quotation related to the purchase order.

3. Designating the identified quantity of the item as sold to the consumer.
4. Planning the generation of inventory to fulfill predictive purchase orders booked for future delivery.

(f) A component for receipt of delivery information the consumer may wish specify.

(g) A component for receipt of order aggregation instructions when the consumer whishes to receive, from an order aggregation facility, at least one item ordered from a merchant.

(h) A component for receipt of payment.

The web servers running online shopping platforms for consumers to shop and the web servers running online order booking platforms for merchants to book orders from consumers have been described separately for the purpose of distinguishing the two distinct functions performed by these servers. The first serves the consumer whereas the second serves the merchant. However an implementation may choose to combine the two functions in one server since the two functions are deeply interrelated.

The web servers running real-time consumption monitoring platforms 713 are preferably configured to execute programs to collect and compile consumption monitoring data in real-time and generate consumption forecasts for each of a plurality of items provided by the merchants participating in the supply-chain management system based at least on purchase orders received by each of the merchants from consumers. Preferably, consumption monitoring data for each item includes the following components:

(a) For each merchant, a merchant specific consumption rate over each of an identified set of time segments. For each of the time segments the merchant specific consumption rate over the time segment represents the total quantity of the item booked by the merchant during the time segment.

(b) A global consumption rate over each of an identified set of time segments. For each of the time segments the global consumption rate over the time segment represents the summation of the merchant specific consumption rates of each merchant during the time segment.

(c) For each merchant, a merchant specific predictive consumption rate over each of an identified set of future time segments. For each of the future time segments, the merchant specific predictive consumption rate over the future time segment represents the total quantity of the item, booked by the merchant using the predictive ordering sub-system 103 that is scheduled for delivery during the future time segment.

(d) A global predictive consumption rate over each of an identified set of future time segments. For each of the identified set of future time segments the global predictive consumption rate over the future time segment represents the summation of the merchant specific predictive consumption rates of each merchant over the future time segment.

The above consumption rates can be used to generate accurate consumption forecasts for each of a plurality of items provided by the merchants participating in the supply-chain management system. These consumption rates can be used by merchants and in particular by manufacturers and producers to improve productivity.

The web servers running real-time financial transaction integrated systems 714 are preferably configured to facilitate financial transactions among the entities participating in the supply-chain management system 100 to reduce execution times and costs associated with the financial transactions.

For example, when a merchant acquires inventory from another merchant based on the integrated inventory sharing sub-system 102, the financial transaction integrated system 714 can execute an automatic financial transaction to pay for the acquired inventory as previously mentioned in Section II.B. Once the inventory is legally transferred to the merchant acquiring the inventory, the financial transaction integrated system 714 can automatically transfer from an identified bank account of the merchant acquiring the inventory to an identified bank account of the merchant providing the inventory an identified amount representing the payment for the inventory transferred.

In another example, a consumer can register an automatic method of payment with the supply-chain management sub-system whereby each purchase made by the consumer is automatically charged to a payment system designated by the consumer.

The financial transaction integrated systems 714 can be used by merchants that do not have modern computer-based systems configured to execute financial transactions in real-time. For the merchants that already use such modern computer-based systems, the supply-chain management sub-system 106 can provide integration tools to integrate such modern computer-based systems into the supply-chain management sub-system 106.

For financial transactions between merchants, the financial transaction integrated systems 714 can include the following components:

(a) A financial transaction database system configured to store and maintain financial transaction data related to financial transactions among the plurality of merchants. For each merchant, the financial transaction data can include:
1. An identification of a bank account established by the merchant with a banking institution, wherein the bank account can be used to execute automatic financial transactions between the merchant and other merchants.
2. Terms and conditions imposed by the merchant for execution of automatic financial transactions between the merchant and other merchants.

(b) An automated financial transaction execution system that automatically associates each financial transaction among merchants with the merchants participating in the transaction and automatically executes transfers of funds between the identified bank accounts of the merchants associated with the financial transaction in accordance with terms and conditions imposed by the merchants participating in the financial transaction.

For financial transactions between merchants and consumers, conventional electronic financial transaction systems can be used. These systems are well understood by those skilled in the art and will not be further described.

The supply-chain management sub-system can also provide several important by-products that facilitate the interactions between al the participants in the supply-chain management system 100. These by-products include the following:

(1) A universal directory of merchants that participate in the supply-chain management system. This directory can be derived from merchant data stored in the database systems that support the supply-chain management system. Although FIG. 2 refers to merchant data 211 and FIG. 3 refers to merchant data 311 to emphasize the distinct functionalities of these two sub-systems, a preferred embodiment could use a single database to store merchant data and avoid duplications. The universal directory can be configured with a search utility that provides flexibility for a variety of search criteria such as by merchant name, by merchant location, by type of item (product or service) provided by the merchant, etc.

(2) A universal directory of original manufacturers, producers, and service providers. This directory would represent a subset of the universal directory of merchants since al the entries would also be merchants. In this case the search criteria can also include search by specific item (product or service).

(3) A universal directory of retailers. This directory would also represent a subset of the universal directory of merchants and the search criteria can also include search by region, by type of items retailed, etc.

(4) A universal catalog of items (products or services) listing each of the different items provided by the merchants participating in the supply-chain management system. This catalog can be configured with a search utility that provides flexibility for a variety of search criteria such as by brand, by original manufacturer, producer, or service provider, by item type, by item name, by the UPC code of the item etc.

The universal directories and the universal catalog of items can become powerful tools to facilitate and improve the activities of all participants in the supply-chain from original manufacturers and producers of the items to the consumers that consume the items.

III. Operation of the Supply-Chain Management System

Section II described six basic sub-system components that are integrated to support the operation of the supply-chain management system 100. This section further introduces seven physical elements that are an integral part of the operation of the supply-chain management system and describes the methods of operation of the supply-chain management system in connection with the six basic sub-system components and the seven physical elements, in a preferred embodiment of the invention.

Figure 8:
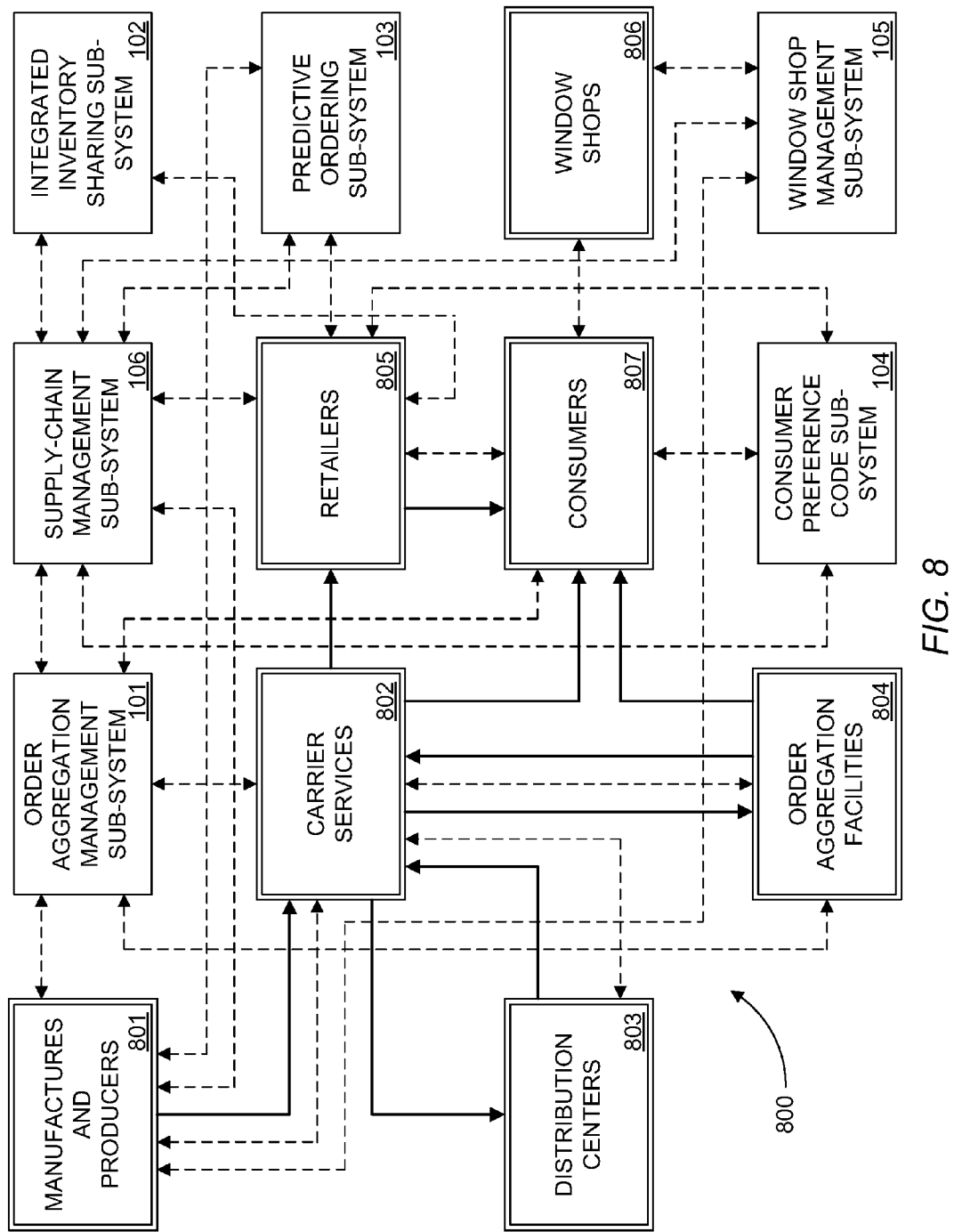
FIG. 8 illustrates a block diagram depicting the six basic sub-system components and seven physical elements that are an integral part of the operation of the supply-chain management system.

FIG. 8 illustrates a block diagram 800 depicting the six basic sub-system components of the supply-chain management system, shown in FIG. 1, the seven physical elements that are an integral part of the supply-chain with a double border, and important inter-operative links between the sub-system components and the seven physical elements. The seven physical elements depicted in FIG. 8 are:

A. Manufacturers and producers 801, representing the starting point of the supply-chain.

B. Carrier Services 802, which physically move items along the supply-chain.

C. Distribution centers 803, which provide intermediate transfer points along the supply-chain to improve transportation efficiency.

D. Order aggregation facilities 804, which provide the final transfer point from where aggregated orders are cost effectively transferred to consumers.

E. Retailers 805, which provide the functions of offering items to consumers and booking purchase orders from consumers.

F. Window shops 806, which provide a novel approach for manufactures and producers to promote and display items and for consumers to window shop and make educated decisions with respect to items they may be interested in acquiring.

G. Consumers 807, representing the end point of the supply-chain.

In FIG. 8, the solid links terminated by arrows on one end represent the directional flow of items through the supply-chain and the broken links terminated by arrows at both ends represent information flow between the various sub-systems and the various physical components of the supply-chain. In this figure intersecting links should be interpreted as not connected.

In the diagram of FIG. 8, the retailers 805 represent merchants that sell items directly to consumers 807. Accordingly, manufacturers and producers 801, and window shops 806 that sell directly to consumers are also retailers. For the purpose of this diagram the entities associated with these two blocks should be interpreted as playing dual roles. For example there is a DELL manufacturer of computers and there is a DELL retailer of computers. For the purposes of FIG. 8, the DELL manufacturer of computers is functionally located in block 801 whereas the DELL retailer of computers is functionally located in block 805. Likewise, a window shop should be interpreted according to the meaning of block 806, which represents a place where consumers can get information about specific items, and also as a retailer, according to the meaning of block 805. For example, a hypothetical "Western Appliance Window Shop" needs to be interpreted in connection with FIG. 8 as being included in both block 806 for the window shop functions and block 805 for the retail functions.

The diagram of FIG. 8 assumes that there are no stocking distributors in the supply-chain since one of the purposes of the invention is the elimination on unnecessary inventory in the supply-chain. It is anticipated that during the first few years of operation of the supply-chain management system 100 there will be some stocking distributors left. However, they will tend to gradually disappear because economic pressures created by the more efficient supply-chain management system.

For simplicity, FIG. 8 does not address service providers and the services consumers receive from service providers, because services typically do not involve the physical delivery of physical objects to consumers. However, because retailers and window shops can and may participate in offering or providing services to consumers, FIG. 8 assumes that services are abstract items that do not require physical delivery and service providers are part of manufacturers and producers 801.

From a logistic perspective, the operation of supply-chain management system 100 depicted in FIG. 8 can be divided into a procurement function, a supply function, a promotion and advertising function, and a data collection function.

The procurement function starts at the consumers 807 and ends at the manufacturers and producers 801 that can supply the items the consumers procure. In FIG. 8, the elements involved in the procurement function include:

1. The consumers 807 who procure items.
2. The retailers 805 who book purchase orders from consumers for items the consumers procure.
3. The supply-chain management sub-system 106 that coordinates the propagation of purchase order data in real-time to the manufacturers and producers 801.
4. The predictive ordering sub-system 103 that gives consumers the opportunity to plan and execute their procurement in advance of supply in exchange for significant price discounts.
5. The consumer preference code sub-system 104 that facilitates online procurement of non-uniform items by consumers.
6. The window shops 806 where preferably consumers can obtain information about items they are not familiar with but want to procure.

7. The manufacturers and producers 801 who can provide the items the consumers 807 want to procure.

The supply function starts at the manufacturers and producers 801 and ends at the consumers 807. When combined with procurement function it closes the procurement-supply loop. In FIG. 8, the elements involved in the supply function include:

1. The manufacturers and producers 801 who provide the items ordered by the consumers 807.
2. The integrated inventory sharing sub-system 102 that coordinates the efficient use of regional virtual inventory to fill orders placed by consumers for immediate delivery.
3. The order aggregation management sub-system 101 that gives consumers the opportunity to specify the date and time, the location, and the method of receipt of the items provided by the manufacturers and producers 801.
4. The carrier services 802 who physically transport items from manufacturers and producers 801 to order aggregation facilities 804 and make deliveries to consumers.
5. The order aggregation facilities 804 who aggregate orders and transfer aggregated orders to consumers 807.
6. The consumers 807 who receive from the order aggregation facilities 804 items provided by the manufacturers and producers 801.

The promotion and advertising function relies upon the new promotion models described in Section I.D, whereby windows shops and the window shop management sub-system provide a compelling and effective alternative to develop consumer awareness of all the items available to consumers in a global market as opposed to a local market. The promotion and advertising function offers considerable benefits to all the entities participating in the supply-chain management system 100, some of which are:

1. Manufacturers, producers, and service providers can take direct advantage of the "window shopping" social need and a "seeing is believing" strategy to make consumers aware of their offerings by using the facilities and services provided by window shops.
2. Manufacturers, producers, and service providers can benefit from the promotional skills of window shop personnel during consumer visits to window shops.
3. Consumers can benefit from a universal catalog of items (products and services), described later in this section, to get a global perspective of all the items (products and services) available in the market place.
4. Consumers can benefit from window shops and their staff to make informed selections and decisions with respect to items they may interested in acquiring.

The data collection function permeates through the entire procurement-supply loop and identifies data collection points throughout the entire supply-chain management system 100 such that the collected data can be used to monitor, control, and manage the operation of the procurement-supply loop to ensure that the supply-chain management system 100 functions at optimum performance. The data collection function is highly computerized, and offers considerable benefits to all the entities participating in the supply-chain management system 100, some of which are:

1. Collects data that support the just-in-time operation of the supply-chain management system.
2. Collects non-predictive purchase order data and predictive purchase order data that support real-time consumption monitoring and accurate consumption forecasts.
3. Collects accurate regional and global consumption data in real-time that helps manufacturers and producers manage their pipeline distribution and bring items jut-in-time to the precise locations where the items will be consumed.
4. Collects personal consumption data to help consumers plan their future purchases.
5. Collects preference code data that enables consumers to shop online for non-uniform generic items.
6. Collects data on consumers' interests, purchase plans, and comments obtained by window shop personnel during consumer visits, which can be of important value to manufacturers and producers.
7. Collects data on the physical locations of inventory that promotes the efficient use and pre-positioning of existing inventory.

In connection with the operation of the supply-chain management system 100 the procurement function involves various steps, next described in further detail.

A first step associated with the procurement function starts with consumers 807 placing purchase orders with a plurality of different retailers 805, as shown by the link between these two blocks. In a preferred embodiment of the invention, the purchase orders booked by the retailers 805 are propagated in real-time to the supply-chain management sub-system 106 and from the supply-chain management sub-system to the source manufacturers and producers 801 of the items ordered.

A second step associated with the procurement function addresses predictive purchase orders received by the retailers 805. The predictive purchase order information can be communicated in real-time to the predictive ordering sub-system 103 for data compilation and analysis, the results of which can then be propagated in real-time by the predictive ordering sub-system to manufacturers and producers 801. The data generated by the predictive ordering sub-system can also be transmitted through an information link to the supply-chain management sub-system 106, and further propagated to the integrated inventory sharing sub-system 102 as described later in connection with the supply function.

A third step associated with the procurement function addresses online shopping of non-uniform items. In connection with this step, FIG. 8 depicts the consumer preference code sub-system 104 with an information link to consumers 807. Via this link consumers can access the preference code web server 520, depicted in FIG. 5, to register their preferences. In a preferred embodiment, the consumer preference code sub-system 104 is integrated into the supply-chain management sub-system 106 via a communication link between these two sub-systems, as shown in FIG. 8. The consumer preference code sub-system 104 can also have a direct link to the retailers 805. With this configuration each retailer 805 can easily access the preference code information of a specific consumer, when needed to book an order from the consumer for a non-uniform item requiring a preference code.

A fourth step associated with the procurement function addresses information about items. In connection with this step, FIG. 8 depicts the window shops 806 with an information link to consumers 807 to indicate that consumers can get information about items in which they have an interest. Preferably, the window shops 806 have an information link to the window shop management sub-system 105, which coordinates the operation of the window shops and the decentralized exhibition system, described earlier in Section I.D and in Section II.F. The supply-chain management sub-system 106 can have an information link to the window shop management sub-system 105 to facilitate coordination and exchange of data. The window shop management sub-system 105 can also have an information link to manufacturers and producers

801 through which manufacturers and producers can negotiate for the use of window shop facilities and services.

A fifth and last step associated with the procurement function terminates the procurement function with a confirmation by the manufacturers and producers 801 that the orders placed by consumers can be fulfilled by the supply provided by the manufacturers and producers.

In connection with the operation of the supply-chain management system 100 the supply function also involves various steps, next described in further detail.

A first step associated with the supply function takes place at the manufacturers and producers 801 where the items to fill demand by consumers all over the country start their journey along the supply-chain. Preferably, for each of the items provided by each of the manufacturers and producers a three dimensional planning map of quantity to meet demand versus geographic location and date/time is generated from accurate consumption forecasts provided by the supply-chain management sub-system 106. Based on this map, manufacturers and producers can plan bulk shipments to regional distribution centers 803 around the country just-in-time to fill orders to be aggregated by the order aggregation facilities 804 serviced by each of the regional distribution centers 803 and other purchases made by consumers from local retailers.

A second step associated with the supply function relates to the integrated inventory sharing sub-system 102, which addresses the residual discrepancies between forecasted demand and actual demand. The supply-chain management system 100 is configured to accurately forecast demand versus calendar time and geographic location. Based on the forecasted demand, the supply-chain management system attempts to move items along the supply-chain pipeline to closely match the forecasted demand but still needs to maintain a minimum amount of regional inventory to accommodate minor fluctuations in local consumption within the margin of error of consumption forecasts. Based upon the margin of error, the integrated inventory sharing sub-system 102 can establish regional levels of virtual inventory for the operation of the integrated inventory sharing sub-system 102 on a regional basis, as described in Section II.E. From this perspective, the integrated inventory sharing sub-system 102 operates as a local virtual inventory provider to address the situations where a consumer has an immediate unanticipated need for a given item. To coordinate the use of this small local virtual inventory buffer, the supply-chain management sub-system 106 can use a communication link to the integrated inventory sharing sub-system 102.

A third step associated with the supply function relates to the order aggregation management sub-system 101, which addresses the efficient and cost effective transfer of items to consumers. The order aggregation management sub-system is the key coordinating element for the supply function. In connection with the placement of purchase orders, preferably consumers provide order aggregation instructions either concurrently with or subsequently to the placement of each purchase order. For many consumers, order placement will tend to occur in cycles whereby the transfers of aggregated orders to each consumer may occur at regular intervals. For the purposes of illustration consider the case of a consumer that develops a pattern of scheduling receipt of aggregated orders on Fridays for the orders placed during a cycle extending from Saturday through Friday. After the end of a particular cycle, assume the consumer makes the first purchase on Sunday and leaves the date and time for receiving the order open. On Wednesday, the consumer makes additional purchases and has sufficient visibility to schedule a pick up at a nearby order aggregation facility at 4:40 PM on Friday, on the way home from a dental appointment. The consumer decides to have the items ordered on Sunday and Wednesday aggregated for the Friday pick up. On Thursday the consumer makes various additional purchases from different retailers and the order aggregation management sub-system suggests to the consumer that the new orders be aggregated with the previously scheduled orders. The consumer agrees and on Friday at 4:40 PM all the items ordered by the consumer Sunday through Thursday are ready for pick up at the order aggregation facility 804 selected by the consumer.

Preferably, the order aggregation management sub-system 101 has an information link to the supply-chain management sub-system 106 to receive in real-time purchase order information as orders are booked. In most cases information related to order aggregation instructions, date and time for the receipt of aggregated orders, and pick up or delivery options is collected when an order is booked. In other cases the consumers 807 provide this information to the order aggregation management sub-system 101 through a direct link after the order is booked, as illustrated in the example above. After all the required purchase order data and aggregation and delivery data is collected, the order aggregation management sub-system 101 communicates through a link to the manufacturers and producers 801 shipping instructions for the items sold. Through a link to the carrier services 802 the order aggregation management sub-system 101 communicates transportation schedules to the carrier services for the transportation of the items to be shipped just-in-time from the source manufacturers and producers 801 to the order aggregation facilities 804 designated to receive the shipments. Through a link to the order aggregation facilities 804, the order aggregation management sub-system 101 provides to the order aggregation facilities order aggregation instructions. Based on these instructions, each order aggregation facility physical aggregates the items received in batches of physically aggregated orders and transfers the physically aggregated batches to the consumers scheduled to receive aggregated orders.

A fourth step associated with the supply function relates to the carrier services 802 that provide just-in-time transportation services for the items purchased by consumers. These items are transported from manufacturers and producers 801 to the local order aggregation facilities 804 in the various regions of the country in compliance with the schedules for aggregation and delivery of aggregated orders to consumers. This step is preferably performed by the carrier services 802 in conjunction with the distribution centers 803 and is described in further detail below with reference to FIG. 9. In a preferred embodiment, the distribution centers 803 are managed by the carrier services 802 and may be operated independently or integrated as part of the carrier services in accordance with models presently used by carriers such as UPS or FEDEX. Preferably, the order aggregation management sub-system 101 uses a communication link to the carrier services 802 to provide the carrier services with transportation instructions for moving the items purchased by consumers along the supply-chain. To facilitate the coordination of just-in-time transportation, the carrier services 802 can use communication links to the manufacturers and producers 801, distribution centers 803, and order aggregation facilities 804.

A fifth and last step associated with the supply function occurs at each of the order aggregation facilities 804, where each aggregated order is transferred to the respective consumer 807. This step is executed by either having the consumer pick up the aggregated order at the selected order aggregation facility 804 or by having the carrier services 802 pick up the aggregated order at the order aggregation facility 804 and deliver it to an address designated by the consumer 807.

At the regional level the carrier services for transportation from regional distribution centers to order aggregation facilities and from order aggregation facilities to consumer residences could be advantageously integrated with commercial carriers that make local deliveries such as UPS and FEDEX. Further, the commercial carriers could provide the local carrier services for the supply-chain management system. Parcel deliveries to consumers normally made by commercial carriers could be delivered not to consumer residences, but instead to order aggregation facilities to be aggregated with consumer orders already scheduled for aggregation. In addition parcels consumers need to ship could be processed through order aggregation facilities. For example a consumer picking up an aggregated order at an order aggregation facility could also drop off at the order aggregation facility a parcel to be shipped. Likewise, a carrier service delivering an aggregated order to a consumer residence, could also pick up a parcel the consumer wishes to ship. Such integration could provide a favorable synergy by significantly reducing the total miles driven by commercial carriers in connection with local deliveries and miles driven by consumers in connection with shopping and shipping parcels. Such reductions in miles driven can translate in significant reductions in costs, pollution, time wasted, and use of energy.

Figure 9:
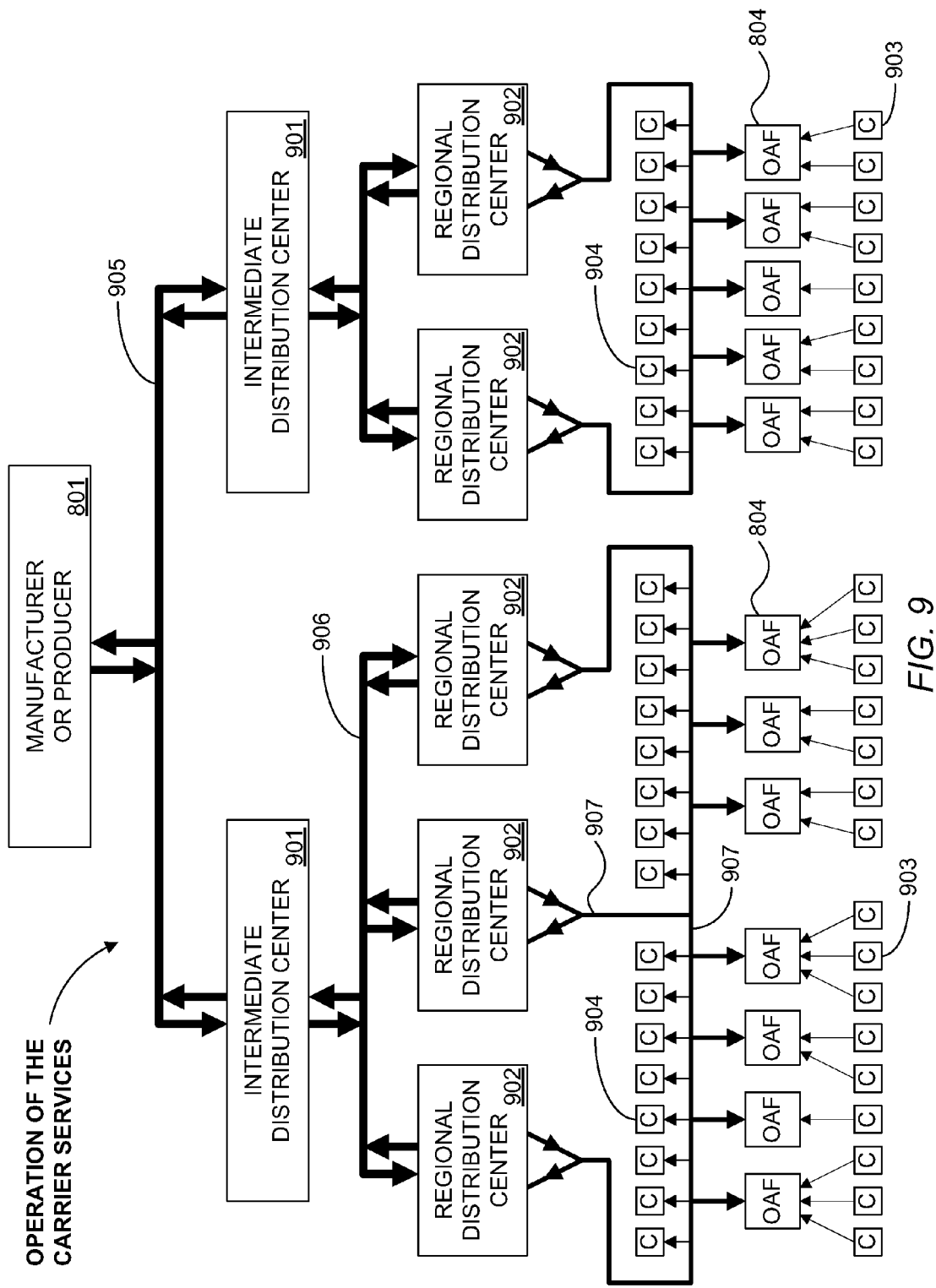
FIG. 9 provides a diagrammatical representation of the operation of the carrier services.

With respect to the operation of the carrier services 802 in conjunction with the distribution centers 803, FIG. 9 provides a diagrammatical representation that illustrates further details about the operation of the carrier services 802 and distribution centers 803 to perform the just-in-time transportation of items from each manufacturer or producer 801 to the consumers 807. The distribution centers 803 of FIG. 8 are separated in FIG. 9 into intermediate distribution centers 901 and regional distribution centers 902. This configuration can be used to provide flexibility, optimize the operation of the carrier services, and minimize transportation costs. Also the consumers 807 of FIG. 8 are separated in FIG. 9 into consumers that elect to pick up aggregated orders 903 and consumers that elect to have aggregated orders delivered 904.

Typically items will be transported from the manufacturers and producers to intermediate distribution centers, from intermediate distribution centers to regional distribution centers and finally from regional distribution centers to specified order aggregation facilities serviced by the regional distribution centers.

The logistics and configuration of intermediate and regional distribution centers and the operation of carrier services to minimize transportation costs in large volume operations are well understood by those skilled in the art and will not be further described.

As shown in FIG. 9, the carrier services typically follow a primary set of long distance routes 905 to carry truck loads of items from the manufacturers and producers 801 to intermediate distribution centers 901. For manufacturers or producers that ship small loads insufficient to fill a truck, concentration centers can be used, not shown in FIG. 9, to combine multiple shipments of small loads into full truck loads to improve the utilization of transportation equipment.

From the intermediate distribution centers 901, the carrier services typically follow a secondary set of routes 906 to carry truck loads of items to regional distribution centers 902 that service regional population centers.

From the regional distribution centers 902, regional carrier services follow regional routes 907 to transport the items purchased by consumers to a variety of order aggregation facilities dispersed within the population centers. In a preferred configuration, the regional distribution centers are located on the outskirts of the population centers, a strategy that offers two advantages. First, the use of space costs much less on the outskirts of population centers and second the truck loading factor for the regional transportation can significantly increase. To illustrate consider the following example:

Assume that regional distribution center "A" expedites items sent to the region by manufacturers "X" and "Y". A local transportation truck departs from distribution center "A" with a full load of these items and drops various loads at a sequence of order aggregation facilities (OAF) 804 along a given route 907 to meet the aggregation instructions at those order aggregation facilities. Along the way it picks up aggregated orders from order aggregation facilities 804 and delivers them to the residences of local consumers 904 close to given route. While delivering aggregated orders it can also pick up consumer returns and execute transfers from one order aggregation facility to another also along the given route. Eventually it reaches regional distribution center "B", that expedites items sent to the region by manufacturers "Z" and "W", at the opposite end of the population center. At distribution center "B", the truck picks up a full load of these different items and the process between "A" and "B" is then repeated between "B" and "C", etc.

This model allows the trucks to travel between different types of distribution centers 902 to make a coordinated distribution of items to order aggregation facilities 804 in compliance with preset schedules to deliver the items to consumers. Along the routes the trucks also make residential deliveries and transfer orders between order aggregation facilities to accommodate last minute changes in pick up instructions requested by consumers. Based upon this model, the local carrier services can operate their trucks at an average loading factor well in excess of 50%. If the local parcel deliveries are integrated within the supply-chain management system as discussed previously, then the average loading factor can be significantly higher.

In contrast, local distribution systems operating in accordance with traditional models typically operate below 50% loading capacity as illustrated in the following example. Assume ideal circumstances whereby a UPS truck leaves a UPS depot with a full load of parcels to make deliveries to a plurality of places along a given route. Assume further the ideal circumstances whereby the truck follows a circular route with evenly spaced deliveries. Under these ideal assumptions the truck starts full and arrives empty indicating that the average load during the route equates to 50%. Under typical non-ideal circumstances the outcome is much worse. First the route is not circular but instead goes to an end destination for the last delivery and then the truck turns around and makes a trip back completely empty and second the truck does not depart with a full load because of uncontrollable fluctuations in daily volume. The result is a typical loading factor well below 50%.

This introductory section has provided a panoramic overview of the operation of the supply-chain management system 100 to facilitate the detailed description of the operation of the six sub-system components integrated into the supply-chain management system 100, which were introduced earlier in Section II. Sections III.A through III.F, below, describe the operation of each of those sub-system components.

A. Operation of the Order Aggregation Management Sub-System

Figure 10A:
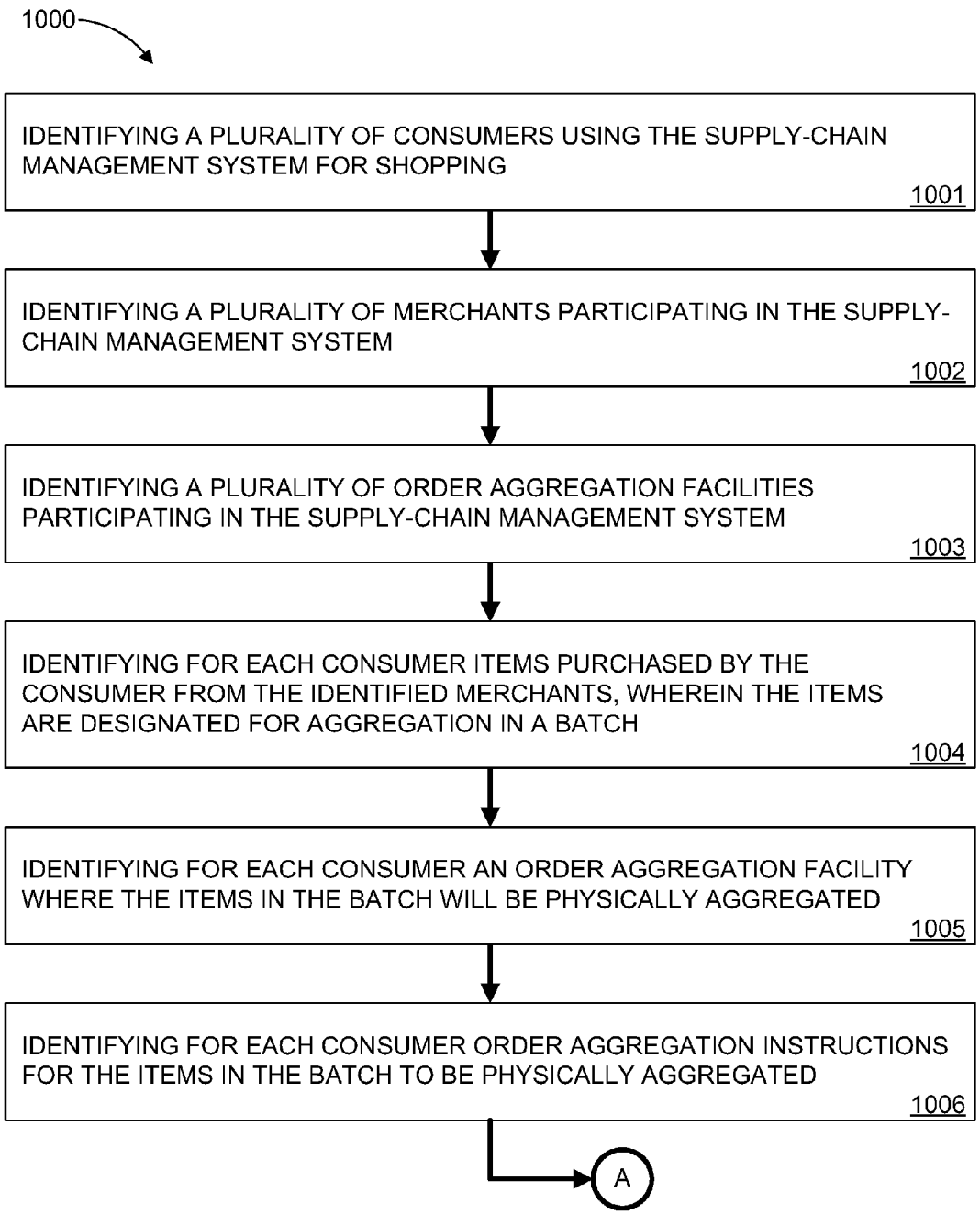
FIGS. 10A-C illustrate an order aggregation method preferably performed by the order aggregation management sub-system.
Figure 10B:
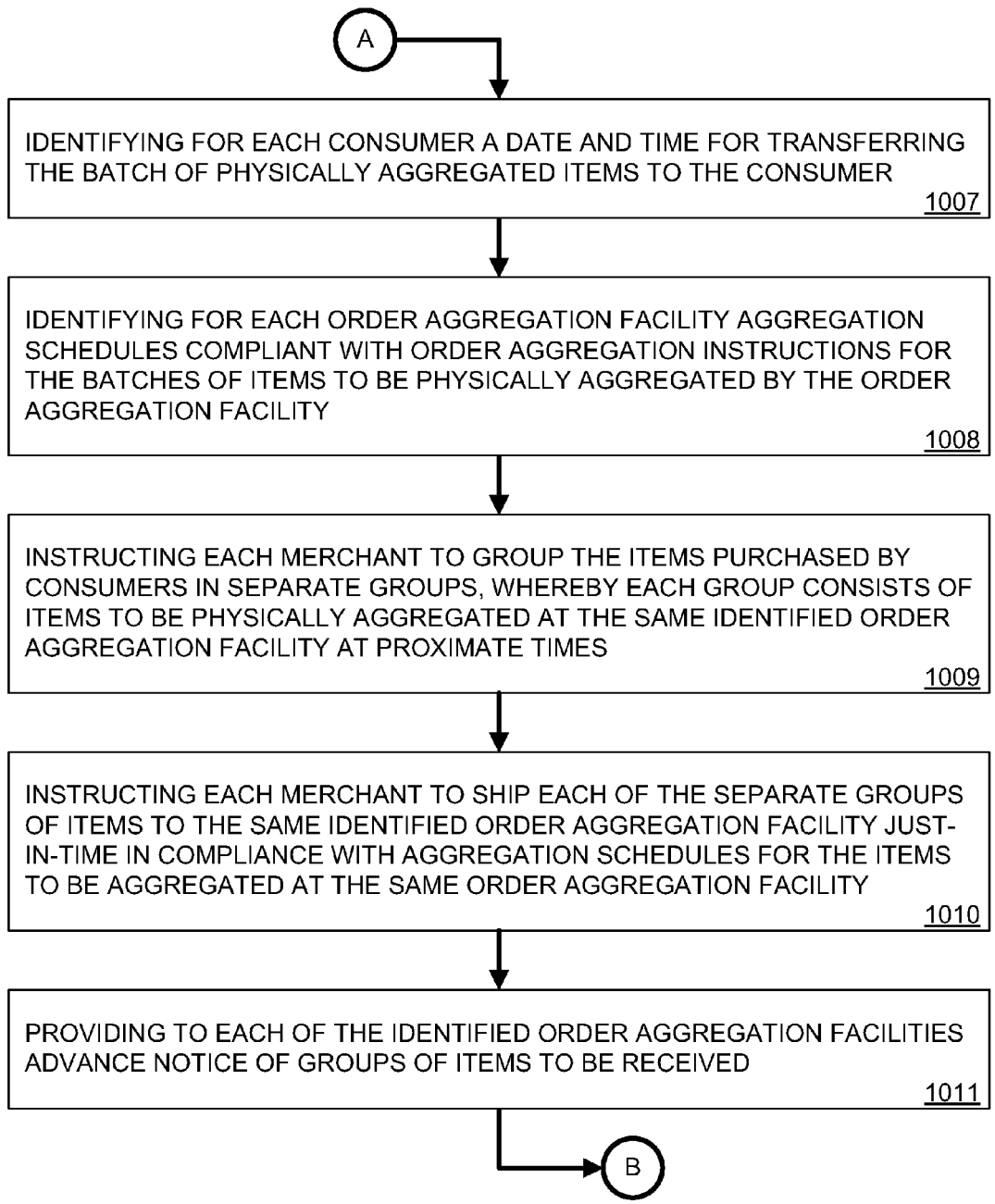
Figure 10C:
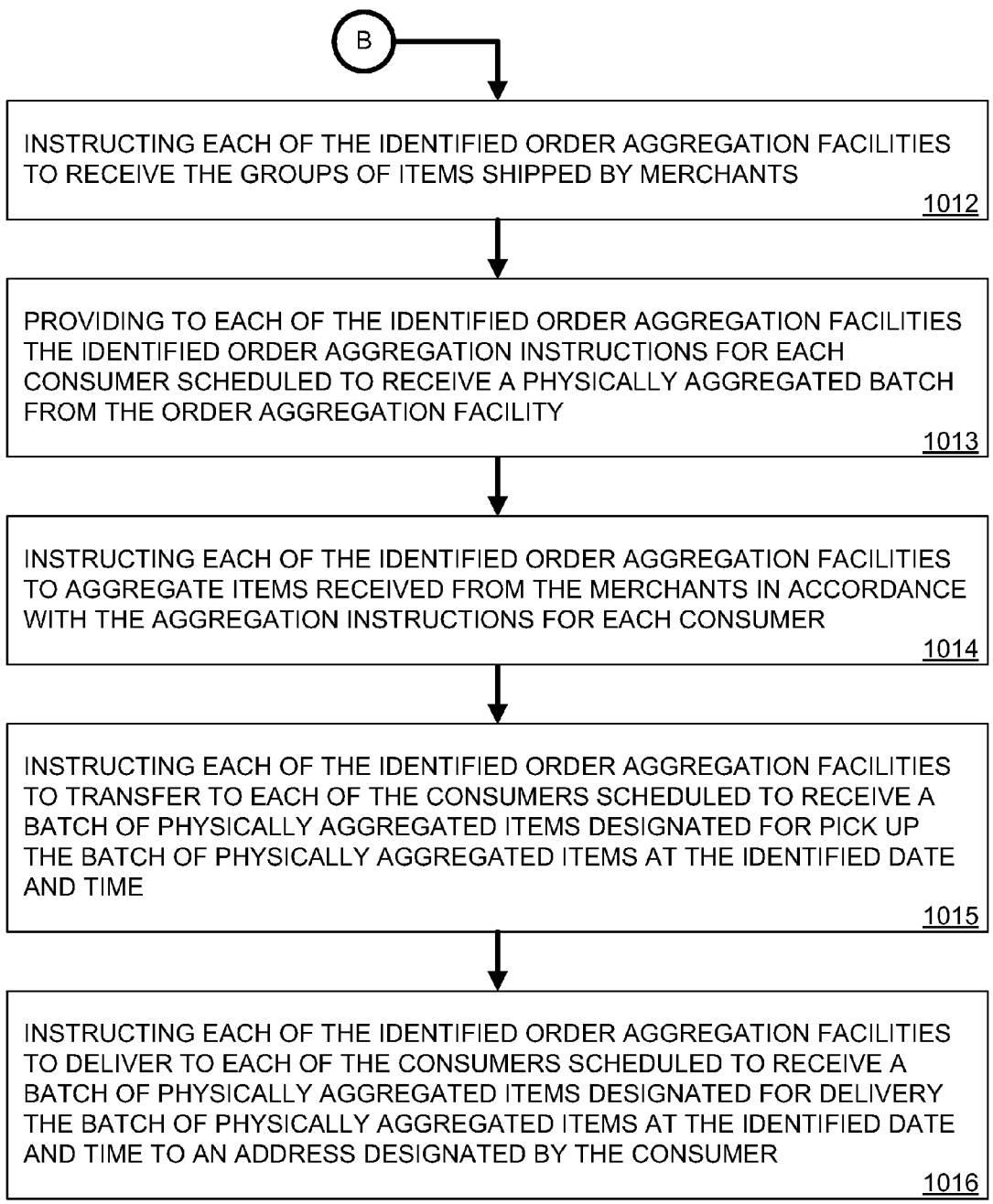

The order aggregation management sub-system 101 was described in Section II.A as a key sub-system component of the supply-chain management system 100. This section describes, with reference to FIGS. 10A-C an order aggregation method 1000 preferably performed by the order aggregation management sub-system.

At step 1001, identifying a plurality of consumers using the supply-chain management system 100 for shopping. Preferably consumers register as users of the supply-chain management system by visiting a secure registration web site to setup a user profile. For users to derive maximum benefits from the supply-chain management system the user profile is preferably configured to receive user information that includes the following:

1. Personal login identification (required).
2. Password (required).
3. User name (optional). Having the user's name facilitates communication with the user.
4. Default address (optional). Registering a default address saves the user the time to enter a delivery address for home deliveries.
5. Default phone number (optional). Registering a default phone number allows the supply-chain management system to provide the user any applicable notifications and respond to user's inquiries.
6. Default email address (optional). Registering a default email address facilitates communications with the user.
7. Default order aggregation facility for user to pick up aggregated orders (optional). Registering a default order aggregation facility saves the user the time to enter an order aggregation facility if the user has a preferred order aggregation facility.
8. Default payment method and information (optional). Registering a default method of payment saves the user the time for entering payment information for each purchase order.

At step 1002, identifying a plurality of merchants participating in the supply-chain management system 100. To participate in the supply-chain management system each merchant needs to provide the merchant data 211 described in Section II.A.

At step 1003, identifying a plurality of order aggregation facilities participating in the supply-chain management system.

At step 1004, identifying for each of the identified consumers items purchased by the consumer from the identified merchants, wherein the items are designated for aggregation in a batch. As described in Section II.A, when a consumer places a purchase order with a merchant, the items on the purchase order are identified. Further, if the consumer wishes that at least some of the items in one or more purchase orders placed by the consumer be physically aggregated in a batch for delivery to the consumer, such items are designated for physical aggregation in a batch. The default can designate all items purchased by the consumer for physical aggregation unless the consumer specifies another alternative. For example, a consumer may designate that large appliances are not to be aggregated with other items.

At step 1005, identifying for each of the identified consumers an order aggregation facility where the items in the batch will be physically aggregated.

At step 1006, identifying for each of the identified consumers order aggregation instructions for the items in the batch to be physically aggregated.

At step 1007, identifying for each of the identified consumers a date and time for transferring the batch of physically aggregated items to the consumer. Preferably, the order aggregation facility receives shipments of items to be physically aggregated within one or two hours of the identified time for transfer. For example, consecutive time windows of one hour can be established and the items to be transferred to consumers during a given time window can be scheduled to arrive at the order aggregation facility during the second time window before the given time window i.e. at least one hour before the hour during which the items are transferred to the consumer.

At step 1008, identifying for each of the identified order aggregation facilities aggregation schedules compliant with order aggregation instructions for the batches of items to be physically aggregated by the order aggregation facility.

At step 1009, instructing each of the identified merchants to group the items purchased by consumers in separate groups, whereby each group consists of items to be physically aggregated at a same identified order aggregation facility at proximate times.

At step 1010, instructing each of the identified merchants to ship each of the separate groups of items to the same identified order aggregation facility just-in-time in compliance with aggregation schedules for the items to be aggregated at the same order aggregation facility.

Steps 1009 and 1010 are intended to reduce transportation costs as illustrated in the following example. A large producer of dairy items services a number of regional areas in the eastern part of the US from a central facility. Every 4 hours, the producer of dairy items computes for each item a shipping matrix of quantities required to fill consumer purchase orders versus order aggregation facility and time window, wherein the time window is expressed in one hour increments. Based on the shipping matrix, the producer of dairy items schedules bulk shipments of each item to regional distribution centers that service the various regional areas to cover deliveries for a 4 hour period. From the regional distribution centers, distribution routes and schedules can be computed each hour to deliver the required quantity of each item to each order aggregation facility in compliance with the pre-defined order aggregation schedules for each consumer. For simplicity, this example addresses the simple case of one producer. However, in the general case of multiple manufacturers and producers operating from the same city or geographic location, bulk shipments from different manufacturers and producers may be combined to improve transportation efficiency. In addition, intermediate distribution centers may be required to optimize transportation logistics, as discussed earlier in this section. The general problem of optimizing transportation of items from a plurality of sources to a plurality of destinations is well understood by those skilled in the art and in particular by commercial carriers and need not be further illustrated.

At step 1011, providing each of the identified order aggregation facilities advance notice of groups of items to be received. Preferably, the order aggregation management sub-system 101 provides each order aggregation facility a detailed schedule of items to be expected and, for verification purposes, the carrier services can also inform each order aggregation facility of the anticipated deliveries. Should there be any discrepancies, the order aggregation management sub-system 101 can be timely informed and take the appropriate corrective action.

At step 1012, instructing each of the identified order aggregation facilities to receive the groups of items shipped by merchants.

At step 1013, providing to each of the identified order aggregation facilities the identified order aggregation instructions for each consumer scheduled to receive a physically aggregated batch from the order aggregation facility.

At step 1014, instructing each of the identified order aggregation facilities to aggregate the items received from the merchants in accordance with the provided aggregation instructions for each consumer.

In connection with steps 1010-1012, the order aggregation facility preferably receives the items to fill consumer aggregated orders in bulk and executes the aggregation by performing the pick and pack for each consumer based upon the aggregated list of all the items purchased by the consumer from multiple merchants.

At step 1015, instructing each of the identified order aggregation facilities to transfer to each of the consumers scheduled to receive a batch of physically aggregated items designated for pick up, the batch of physically aggregated items at the identified date and time.

At step 1016, instructing each of the identified order aggregation facilities to deliver to each of the consumers scheduled to receive a batch of physically aggregated items designated for delivery, the batch of physically aggregated items at the identified date and time to an address designated by the consumer.

Steps 1015 and 1016 relate to the two choices offered to the consumer to receive a physically aggregated order. According to the first choice, the consumer can pick up the aggregated order at an order aggregation facility of the consumer's choice at a date and time selected by the consumer. According to the second choice, the consumer can have the physically aggregated order delivered to an address designated by the consumer at a date and time selected by the consumer. In the second case the order aggregation management sub-system 101 preferably determines the order aggregation facility from where the delivery will be made and the carrier services 802 will execute the delivery as part of their routine operations.

The order aggregation method just described ensures just-in-time transportation of items from the point of origin to the consumer's door step, eliminates the cost of inventorying items at retailers facilities, fully expands the item selections available to consumers to a level that could not be met by shelf space in retail stores, and ensures the fastest availability to consumers.

B. Operation of the Integrated Inventory Sharing Sub-System

Figure 11:
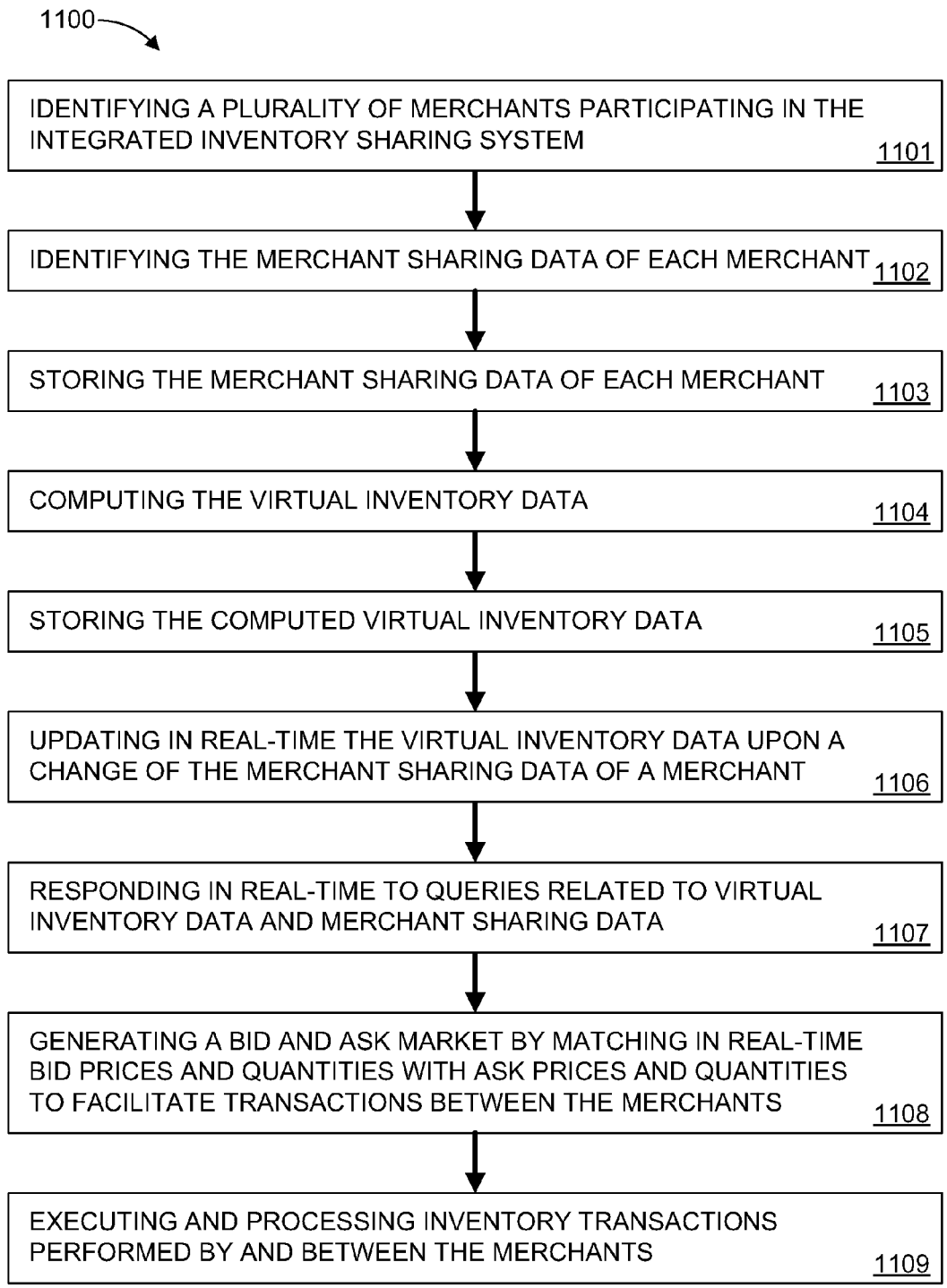
FIG. 11 illustrates an integrated inventory sharing method preferably performed by the integrated inventory sharing sub-system.

The integrated inventory sharing sub-system 102 was described in Section II.B as a key sub-system component of the supply-chain management system 100. This section describes, with reference to FIG. 11 an integrated inventory sharing method 1100 preferably performed by the integrated inventory sharing sub-system.

At step 1101, identifying a plurality of merchants participating in the integrated inventory sharing sub-system. Promotion and advertising can be used to invite merchants to participate in the integrated inventory sharing sub-system and merchants can register to participate via the virtual inventory web server 320 described in Section II.B.

At step 1102, identifying the merchant sharing data of each merchant.

At step 1103, storing the merchant sharing data of each merchant in the inventory sharing database system 310. A forms interface can be provided to help each merchant initially identify its merchant data. Once the merchant data is identified and verified, the data entry and retrieval program 321 can be used to upload the merchant data in the inventory sharing data database system 310.

At step 1104, computing the virtual inventory data 312 based at least on the merchant sharing data of each merchant.

At step 1105 storing the computed virtual inventory data in the inventory sharing database system 310. Preferably, when the integrated inventory sharing sub-system 102 is first installed, the virtual inventory data for the initial participating merchants is computed and stored. Thereafter, the virtual inventory can be maintained through real-time updates.

At step 1106, updating in real-time the virtual inventory data in the inventory sharing database system 310 upon a change of the merchant sharing data of a merchant. Examples of a change of the merchant sharing data of a merchant include:

1. Receipt of new inventory.
2. Sale of an item in inventory to a consumer or another merchant.
3. Return of an item in inventory to the original manufacturer or producer.
4. Accidental loss of an item.
5. Placing an item on temporary reservation in connection with a consumer request for quote.
6. A change in bid and ask prices and quantities posted by the merchant.
7. A new merchant that joins the integrated inventory sharing sub-system.

At step 1107, responding in real-time to queries related to virtual inventory data and merchant sharing data submitted to the inventory sharing data database system 310.

At step 1108, generating a bid and ask market to facilitate transactions among the identified merchants by matching in real-time for each merchant of the identified merchants bid prices and quantities provided by the merchant for an item to ask prices and quantities provided by each other merchant of the identified merchants for the item. Preferably, the bid and ask market is generated by the market making program 325 described in Section II.B.

At step 1109, executing and processing inventory transactions performed by and between the merchants. Preferably, inventory transactions among merchants are executed by the transaction processing program 324 described in Section II.B.

To illustrate consider the following case: merchant "A" is about to run out of "Samuel Adams Cream Stout" beer and through the market making program identifies several merchants holding surplus inventory whereby the lowest ask price is $21.75. Merchant "A" places a bid for 6 cases at $21.75 per case on the market making program 325 with a preference to obtain the beer from the closest merchant within a 10 mile radius. The market making program 325 automatically identifies among the merchants posting a $21.75 ask price a merchant "B", located 5 miles from merchant "A", and executes and processes the transaction. In the inventory sharing data database system 310 the 6 cases of beer are automatically transferred from the inventory of merchant "B" to the inventory of merchant "A". The transaction processing program 234 automatically credits $130.50 ($21.75×6) to the account of merchant "B" and debits the account of merchant "A" $130.50 plus $0.97 for transport charges. The transaction processing program 234 also notifies the carrier services to pick up the 6 cases of beer from merchant "B" and deliver them to merchant "A". Because the carrier services have extensive operations in the area, the transport of the beer should be completed within one hour at minimum cost.

A better alternative is to let the beer remain at merchant "B". Merchant "A" continues to sell the newly acquired "Samuel Adams Cream Stout", which eventually needs to be transported to one or more order aggregation facilities to fulfill purchase orders from consumers. The order aggregation management sub-system 101 has real-time information about the physical location of all existing inventory of "Samuel Adams Cream Stout" in the region and can utilize the inventory as needed to minimize transportation costs. In this regard, each merchant holding virtual inventory operates as a mini distribution center from which the order aggregation management sub-system 101 can pull inventory to supply order aggregation facilities.

A general operating rule for the most efficient operation of the supply-chain management system is to supply the needs of each order aggregation facility from the pipeline inventory geographically located closest to the order aggregation facility provided it does not violate any committed schedules.

C. Operation of the Predictive Ordering Consumption Forecasting Sub-System

The predictive ordering sub-system 103 was described in Section II.C as a key sub-system component of the supply-chain management system 100. This section describes, with reference to FIGS. 12-17 methods for the operation of the predictive ordering sub-system for each item subject to a predictive price discount.

FIG. 12 describes a preferred predictive ordering method 1200 for using the predictive ordering sub-system 103.

At step 1201, identifying a plurality of consumers using the supply-chain management system for shopping.

At step 1202, identifying an item subject to a predictive price discount.

At step 1203, identifying a plurality of merchants providing the item subject to a predictive price discount.

At step 1204, identifying a predictive discount schedule of predictive price discount versus predictive order delay (POD) applicable to the item. Preferably, the predictive discount schedule for each item is generated by the manufacturer, producer, or service provider that provides the item, based upon the estimated primary cost savings realized by the manufacturer, producer, or service provider and secondary costs savings realized by other participants in the supply-chain.

At step 1205, informing each of the identified merchants of the predictive discount schedule applicable to the item. Although merchants are free to set their retail prices independently, the predictive discount schedules are preferably applied globally on a percentage basis by all participating merchants to support optimum performance of the predictive ordering sub-system 103. For example, if merchant "A" retails item "I" for $64.99 and merchant "B" retails the same item "I" for $69.99 a predictive price discount of 20% for a predictive order delay (POD) of 15 days would be equally applied to the retail prices $64.99 and $69.99 independently of the merchant.

At step 1206, informing the identified consumers of the predictive discount schedule applicable to the item. For consumers to take advantage of predictive price discounts it is important that consumers be timely informed of such discounts. This is what happens within the traditional distribution systems when promotional fliers are used to inform consumers of promotional discounts. The traditional promotional fliers use a counter productive process involving the costs of printing and distributing the fliers, the time wasted by consumers to read the fliers to find very few items of interest, the time and mileage costs expended by consumers to purchase the few items during the promotional period, and subsequently the cost of disposing of the incremental garbage generated by the fliers. With the supply-chain management system 100 the traditional counter productive promotional fliers can be completely eliminated by the use of the shopping list generation programs and automatic shopping programs introduced in Section I.A in connection with shopping models. The shopping list generation program and the automatic shopping programs can be configured to receive alerts of favorable predictive price discounts. The shopping list generation program can suggest to the consumer stocking up on a specific item and automatically estimate the quantity to be ordered to minimize the annual consumer expense based upon the capability of the shopping program to automatically shop for the lowest available price. These programs can offer consumers significant savings of time and costs.

At step 1207, generating consumption forecasts for the item, wherein the consumption forecasts for the item are based at least upon predictive purchase orders booked for the item by the identified merchants, analyzed real consumption data for the item, and historical correlations between predictive and non-predictive purchase orders booked for the item.

At step 1208, informing in real-time each of the identified merchants of consumption forecasts generated for the item. Typically, the merchants providing the item start with the source manufacturer, producer, or service provider of the item and end with the retailers that book purchase orders from consumers for the item. There may also be intermediate merchants such as wholesalers and distributors, although these intermediate merchants may gradually be replaced by a model whereby manufacturers and producers own and control the pipeline inventory.

To derive maximum benefits from the predictive ordering sub-system, manufacturers, producers and service providers need to obtain in real-time the ordering information for the predictive purchase orders booked by merchants participating in the supply-chain management system 100. Preferably, the large majority of participating merchants will be equipped with computer systems configured to communicate with the supply-chain management sub-system 106 to provide order booking data in real-time. Based on this configuration, the supply-chain management sub-system can automatically collect predictive ordering data from the participating merchants equipped with these computer systems. The collected data can be periodically compiled and summary reports can be generated.

Regular consumption data not associated with predictive purchase orders can also be compiled and summarized in real-time. The predictive and the non-predictive purchase orders can then be combined to provide source manufacturers, producers and service providers real-time statistical data on real consumption and reliable consumption forecasts. Initially, the periodicity may be in the order of hours but over time it may be reduced to less than one minute, whereby a manufacturer may be able to see on a computer display a steaming plot showing the rate of sales for a given item, including an extension into the future (preview) based upon predictive purchase orders booked.

Figure 13:
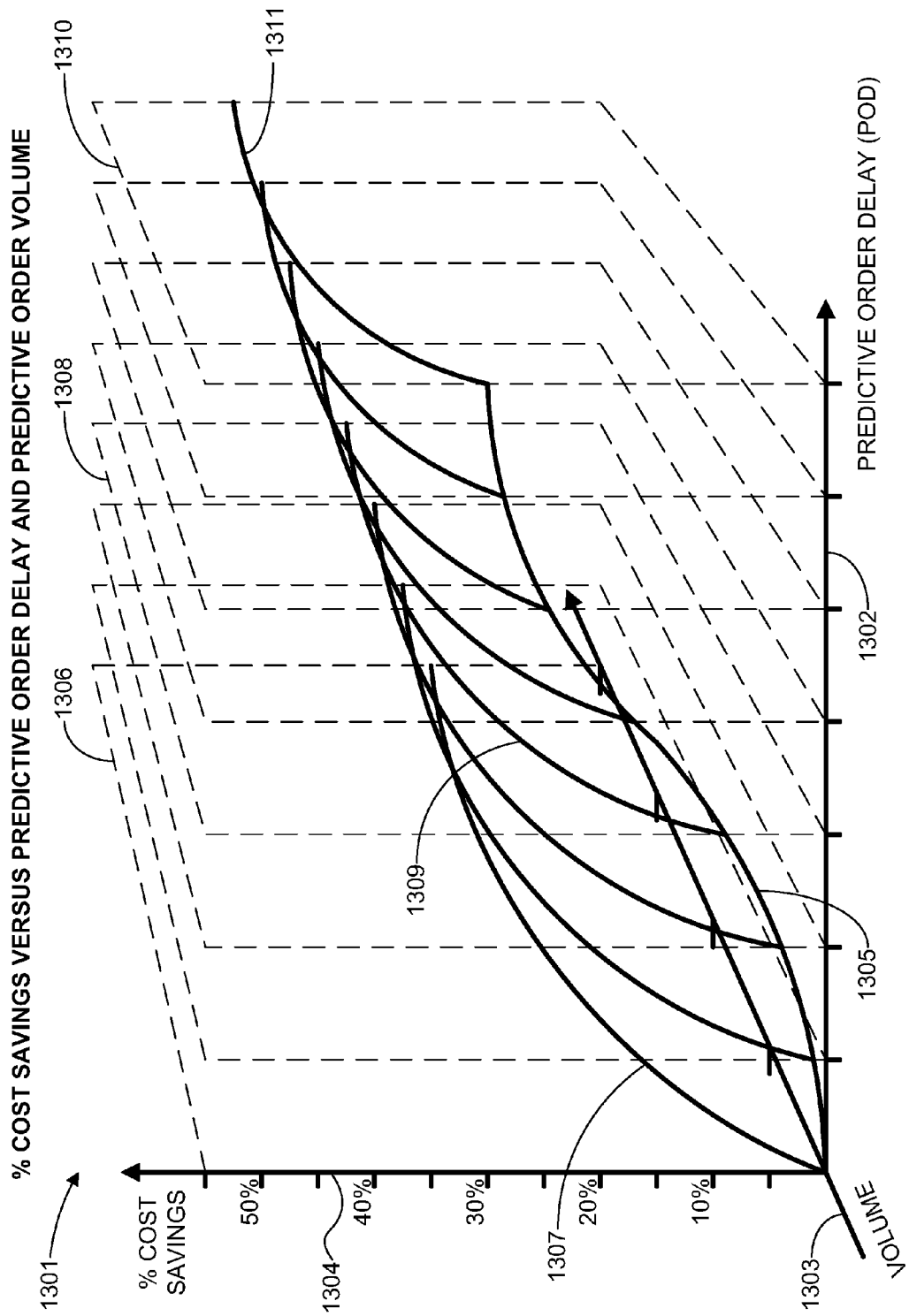
FIG. 13 illustrates a hypothetical three dimensional plot of % cost savings versus predictive order delay and predictive order volume.

The operation of the predictive ordering sub-system 103 depends in part on the capability to estimate cost savings realized by the supply-chain as a result of accurate forecasts of future consumption. FIG. 13 illustrates a hypothetical three dimensional plot 1301 of estimated % cost savings versus predictive order delay and predictive order volume for a hypothetical item.

In this diagram, the horizontal plane consists of the predictive order delay (POD) axis 1302 and the predictive order volume axis 1303. The vertical axis represents the % cost savings 1304. For a very small predictive order volume, the % cost savings versus the predictive order delay (POD) is illustrated by the "S" shaped the curve 1305, which should be interpreted as a curve drawn on the plane defined by the predictive order delay (POD) axis 1302 and the % cost savings axis 1304.

As indicated by the "S" shaped curve 1305, for a very small POD, the % cost savings should be insignificant. As the POD increases, the % cost savings should first increase to a maximum slope and then progressively level off at a value representing the maximum achievable % cost savings for large POD values. In most cases, the % cost savings should have a strong correlation to a manufacturing or production cycle time. For example, a future demand visibility extending over two manufacturing cycles allows a certain manufacturer to optimize productivity by manufacturing quantities that closely match demand.

In the plane 1306 where the POD is zero, defined by the volume axis 1303 and the % cost savings axis 1304, the curve 1307 represents the typical quantity volume discounts offered by manufactures and producers for volume orders. This curve indicates that manufactures and producers can afford to give discounts for volume orders because increased volume results in cost savings. FIG. 13 illustrates a sequence of planes parallel to plane 1306, including plane 1308 and plane 1310. Each of the planes in this sequence corresponds to an increasing value of the POD along the predictive order delay (POD) axis 1302 and displays a curve reflecting the increase in the % cost savings with increasing volume. For example, plane 1308 shows curve 1309 with the small volume % cost savings starting at 8.75% and climbing to 42.5% for large volume and plane 1310 shows curve 1311 with the small volume % cost savings starting at 30% and climbing to 52.5% for large volume.

Although the major portion of the total supply-chain cost savings is experienced by the manufacturers and producers, other segments of the supply-chain can also experience cost savings. Carrier services can operate more efficiently by receiving in advance reliable information on the transportation services they are asked to provide because they can better plan the use of resources to maximize productivity. Distribution centers at all levels can operate with minimum service space and personnel because they can plan in advance. Retailers can operate with minimum inventory, space, and personnel because quantities received closely match quantities delivered to consumers on a daily basis. The cost savings experienced by the other segments of the supply-chain may be difficult to theoretically predict due to the diversity of potential factors affecting cost savings. However, once the supply-chain management system is deployed it should be relatively easy to establish these cost savings empirically.

After the supply-chain cost savings are established, the predictive price discounts offered to consumers as an incentive for the consumers to use the predictive ordering sub-system need to be identified and optimized to produce the desired results. This aspect involves a component associated with consumer behavior and a component associated with consumer response to the benefits provided by the predictive ordering sub-system.

Figure 14:
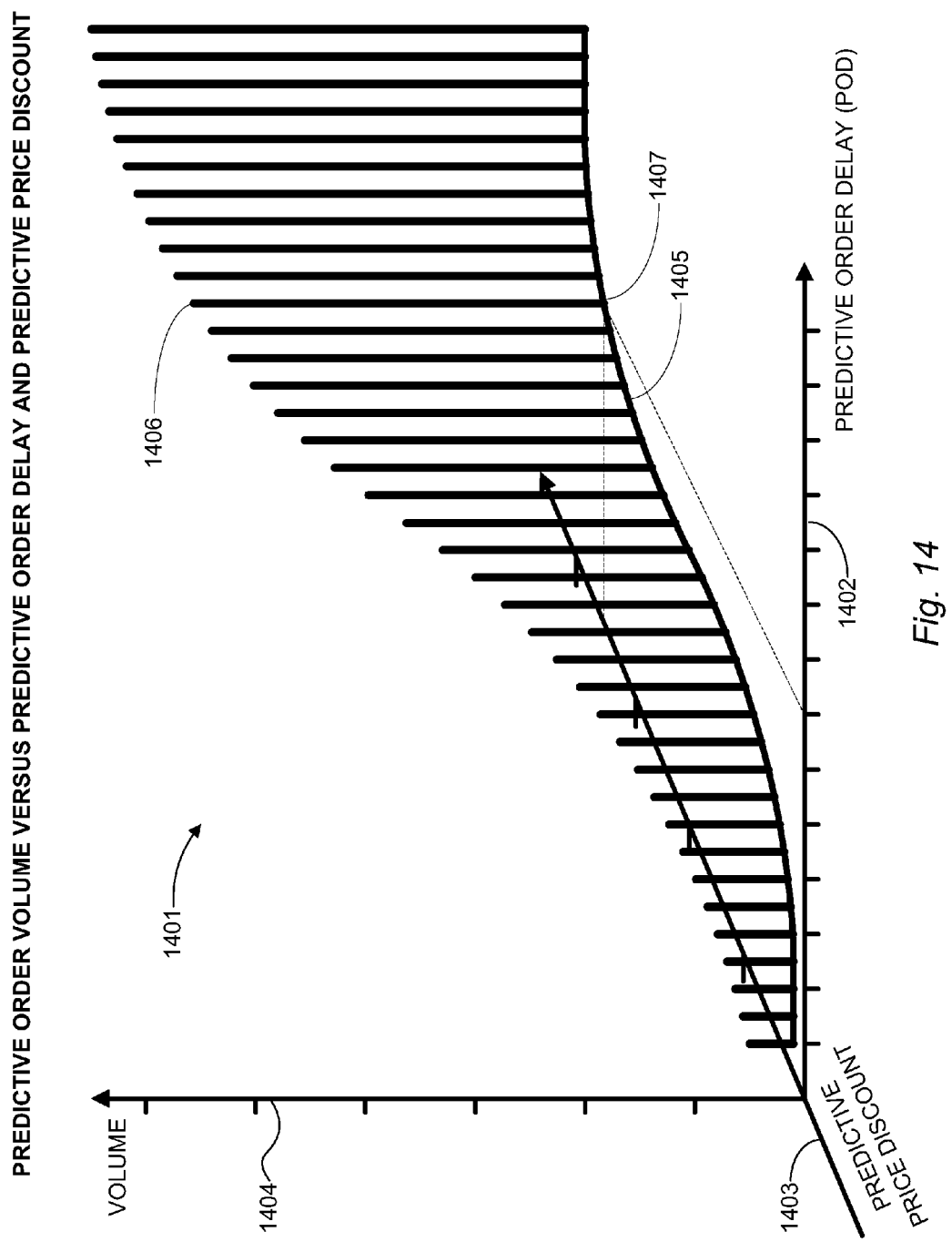
FIG. 14 illustrates a hypothetical three dimensional correlation of predictive order volume versus predictive order delay and predictive price discount.

FIG. 14 illustrates a hypothetical three dimensional correlation 1401 of predictive order volume versus predictive order delay (POD) and predictive price discount. The horizontal plane is defined by the predictive order delay axis 1402 and the predictive price discount axis 1403. The vertical axis represents the predictive order volume 1404. In the horizontal plane the "S" curve 1405 represents a specific schedule of predictive price discounts versus predictive order delays. For this specific schedule, the predictive order volume is represented by a set of the vertical bars. Bar 1406 is an example of one of these bars that originates at a point 1407 along the "S" curve 1405 drawn on the two dimensional space of the variables predictive price discount and predictive order delay. The "S" curve 1405 can be adjusted within reasonable boundaries reflecting external limitations. For example, the predictive price discount versus predictive order delay (POD) for very small volumes (near curve 1405) should not exceed the % cost savings versus predictive order delay (POD) for very small volumes indicated by curve 1305 in FIG. 13. Another limitation reveals no need to consider values for the POD in excess of a several times the manufacturing or production cycle since the % costs savings tend to reach a plateau after this range. When the "S" curve 1405 is adjusted, the tops of the bars 1406 generate a surface defining an implicit function of the variables predictive order volume, predictive order delay (POD), and predictive price discount. This surface provides the foundation for empirically optimizing price discounts as described next with reference to FIG. 15.

Figure 15:
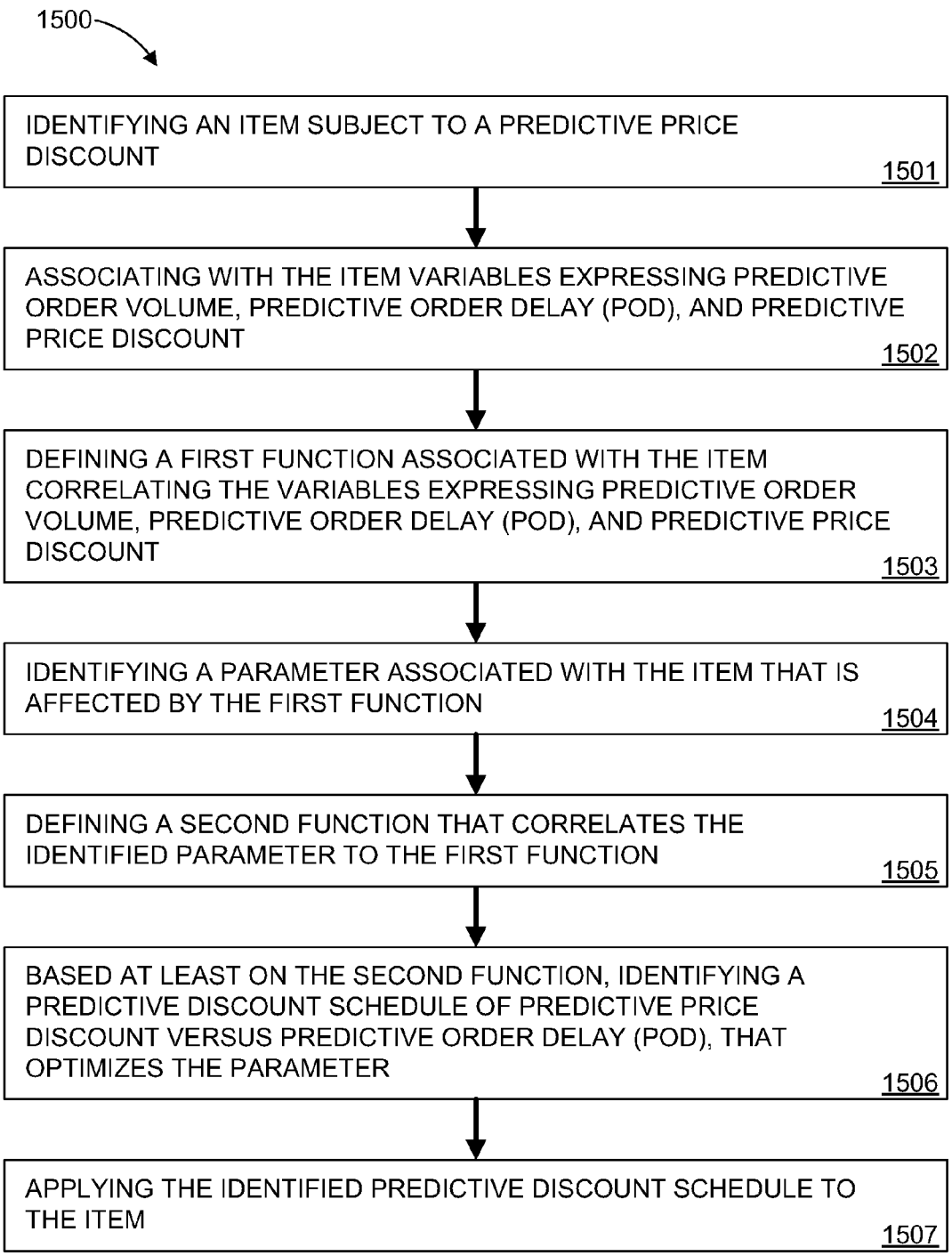
FIG. 15 illustrates a predictive price discount optimization method preferably performed by the predictive ordering sub-system.

FIG. 15 illustrates a predictive price discount optimization method 1500 preferably performed by the predictive ordering sub-system based upon the concepts outlined in connection with FIGS. 13 and 14.

At step 1501, identifying an item subject to a predictive price discount.

At step 1502, associating with the item variables expressing predictive order volume, predictive order delay (POD), and predictive price discount.

At step 1503, defining a first function associated with the item correlating the variables predictive order volume, predictive order delay (POD), and predictive price discount. This first function is the implicit function of the variables predictive order volume, predictive order delay (POD), and predictive price discount described above with reference to FIG. 14.

At step 1504, identifying a parameter associated with the item that is affected by the first function correlating the variables predictive order volume, predictive order delay (POD), and predictive price discount. Manufacturers and producers can make parameter selections based upon considerations that reflect business strategies. For example, a manufacturer wishes to maximize sales volume to phase out an old version of an item from a production line to facilitate the introduction of a new version. In a different example, a manufacturer with a steady production line operation wishes to optimize profitability.

At step 1505, defining a second function that correlates the identified parameter to the first function correlating the variables predictive order volume, predictive order delay (POD), and predictive price discount.

At step 1506, based at least on the second function, identifying a predictive discount schedule of predictive price discount versus predictive order delay (POD) that optimizes the parameter associated with the item.

At step 1507, applying the identified predictive discount schedule to the item. Preferably, a price discount schedule remains in effect until a new price discount schedule is identified and made effective. Typically, the source provider of the item determines the time when a new predictive discount schedule becomes effective based mostly upon business considerations.

Preferably, the supply-chain management system adopts a strategy whereby the source provider of the item is responsible for posting predictive discount schedules on the predictive ordering web server to maintain the predictive ordering database system current. Based on this strategy, a new predictive discount schedule can be implemented concurrently by all the identified merchants. Automatic shopping programs used by consumers can be notified in real-time of new predictive price discounts posted for an item and determine if the consumer should take advantage of the price discounts.

Among the diversity of criteria that can be selected as a basis to optimize a predictive discount schedule, one criterion is associated with consumption stability and could have a significant impact in stable economic growth. This criterion deserves further disclosure.

Free market economies are inherently unstable economic models subject to cyclic fluctuations related to propagation delays in the market forces that are supposed to provide stabilizing effects. This inherent instability could be attenuated by the use of a fast reaction auto-regulation mechanism. A potential auto-regulation mechanism is the predictive ordering sub-system 103, which can provide the basis for a consumption cruise control system and method with the potential of significantly attenuating or even eliminating undesirable fluctuations in consumption.

Figure 16:
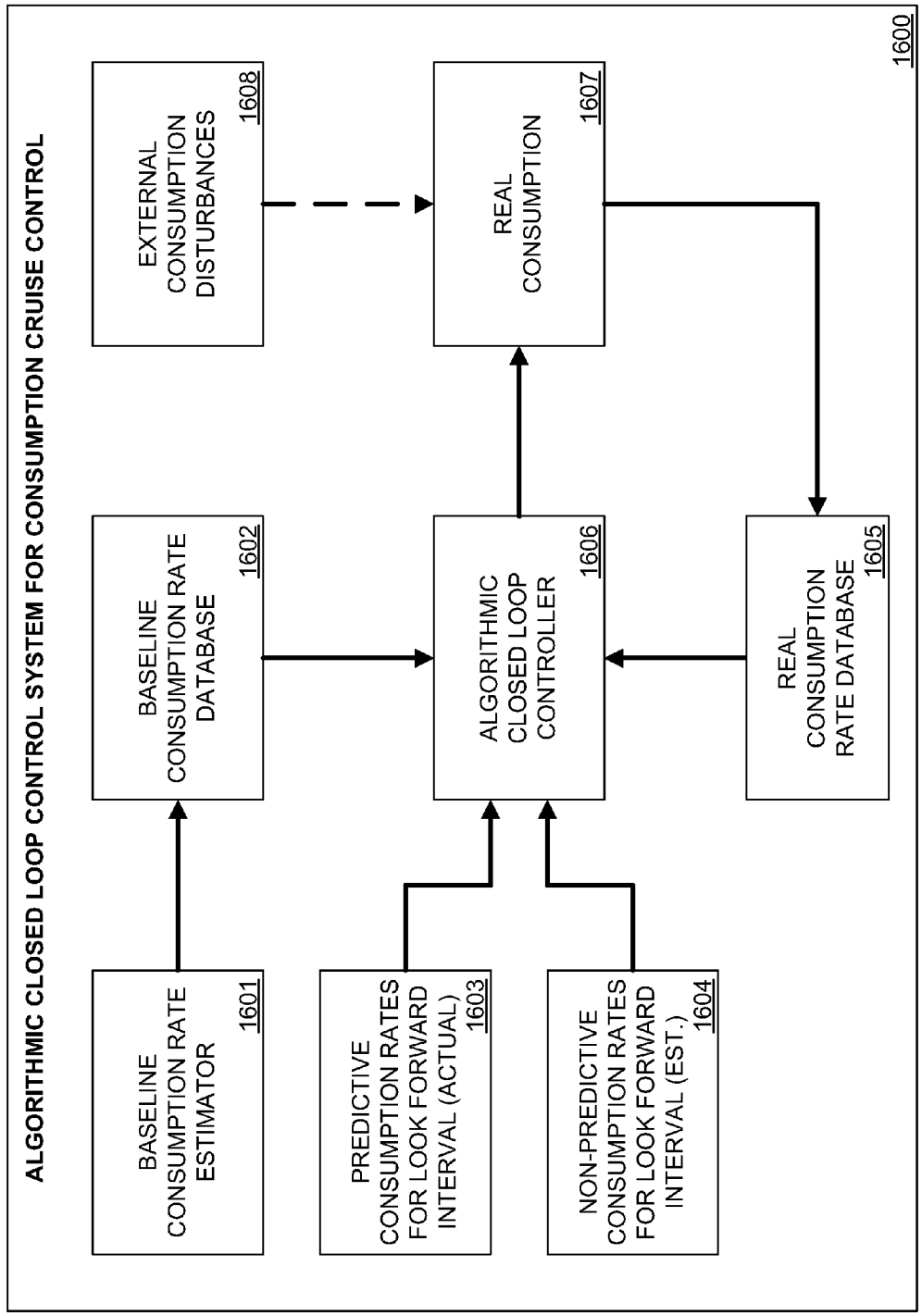
FIG. 16 illustrates a block diagram of a preferred embodiment of an algorithmic closed loop control system for consumption cruise control.
Figure 17A:
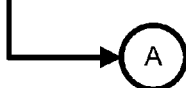
FIGS. 17A-B illustrate a preferred consumption cruise control process performed by the algorithmic closed loop control system.
Figure 17B:
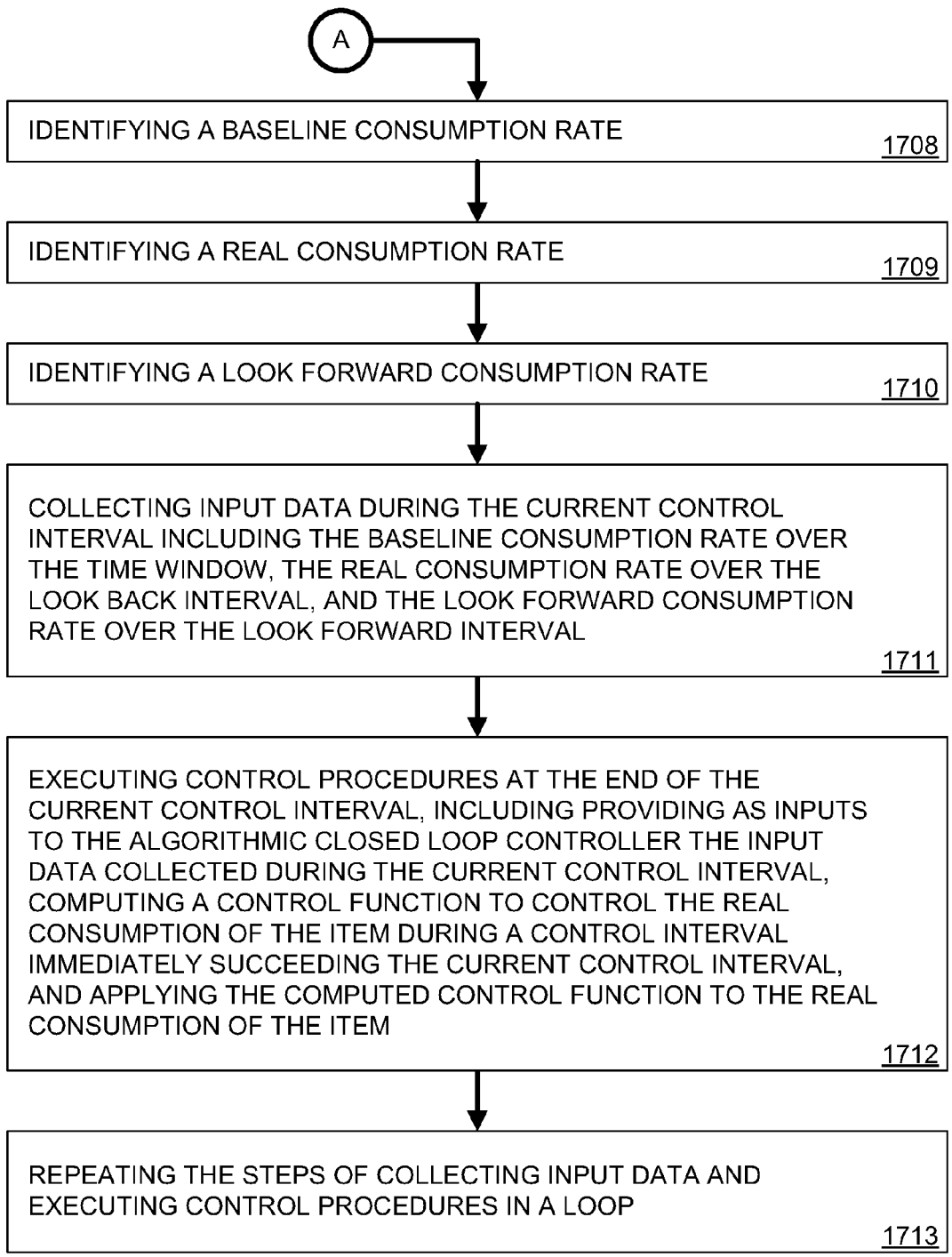

FIG. 16 provides a block diagram of a preferred embodiment of an algorithmic closed loop control system 1600 for consumption cruise control and FIGS. 17A-B illustrate a preferred consumption cruise control process 1700 for using the algorithmic closed loop control system 1600 to stabilize the consumption of an item. FIGS. 16 and 17 refer to several parameters and variables which include the following:

1. A "time unit" defined as the unit selected to express a time variable. For the purpose of this illustration, a time unit of one week is selected.
2. A "look back interval" defined as a time interval expressed in time units extending in time back from the end of a current time unit. For example, the look back interval can be set at 20 weeks back from the end of the current week.
3. A "look forward interval" defined as a time interval expressed in time units, extending in time forward from the end of a current time unit. For example, the look forward interval can be set at 6 weeks forward from the end of the current week.
4. A "time window" defined as a time interval obtained by appending the look forward interval to the look back interval. For example, if the look back interval is 20 weeks and the look forward interval is 6 weeks, the time window is 26 weeks.
5. A "control interval" defined as a time interval between two consecutive cycles of the algorithmic closed loop control algorithm. For the purpose of this illustration, a control interval of one week, corresponding to one time unit, is selected.
6. A "current control interval" defined as the control interval associated with a cycle of the algorithmic closed loop control algorithm being executed.
7. A "baseline consumption rate" of an item defined as a variable representing a disturbance free ideal consumption of the item per time unit.
8. A "real consumption rate" of an item defined as the total quantity of the item acquired by consumers per time unit. The real consumption rate may experience fluctuations from one time unit to the next (week to week).
9. A "look forward consumption rate" of the item defined as a variable representing a projected consumption rate of the item versus time over the look forward interval. The look forward consumption includes two components. The first is a predictive consumption rate computed from booked predictive purchase orders scheduled for delivery during the look forward interval. The second is a non-predictive consumption rate computed from non-predictive purchase orders estimated to occur during the look forward interval.
10. A "control function" defined as a function that expresses the appropriate level of control action necessary to maintain the real consumption of the item close to the baseline consumption.

FIG. 16 starts with a baseline consumption rate estimator 1601 that estimates what the consumption rate should be over the time window under ideal conditions free from consumption disturbances. The baseline consumption rate estimator estimates an ideal consumption rate from the perspective of the manufacturer or producer of the item under consideration. In one embodiment, the estimate is based upon historical consumption rates, consumption rates observed during the look back interval, observed growth in consumption rate, applicable seasonal factors, manufacturing and production resources, use of natural resources, long-term price stability, inflation, general economic stability and growth, preservation of the environment and any other factors identified by the manufacturer or producer that may impact the baseline consumption rate. The estimated baseline consumption rate can be stored in a baseline consumption rate database 1602 that stores baseline consumption rate versus time and can be kept current with the most recent baseline consumption rate estimate.

During the look forward interval the two components of the consumption rate are:

a) The "predictive consumption rate" for each time unit of the look forward interval 1603, which is computed from booked predictive purchase orders. To obtain accurate projections, adjustments for cancellations can be made to the booked predictive purchase orders based on historical records of cancellations and then an adjusted predictive consumption rate can be computed for each time unit.

b) The "non-predictive consumption rate" for each time unit of the look forward interval 1604, which is an estimated consumption rate. It is anticipated that there will be a strong correlation between predictive purchase orders and non-predictive purchase orders since the correlation involves a personal preference which tends to be stable. Based on this correlation and historical data of non-predictive purchase orders, the volume of non-predictive purchase orders can be estimated with good accuracy during the look forward interval.

The real consumption rate database 1605, stores in real-time the real consumption rate that takes place over time. For each item, the real consumption rate can be expressed in real consumption per time unit.

The algorithmic closed loop controller 1606 is the active component of the algorithmic closed loop control system 1600. The algorithmic closed loop controller receives as inputs:

1) The baseline consumption rates, from the baseline consumption rate database 1602. Although the baseline consumption rate database preferably keeps records of baseline consumption estimates made over time, the most relevant data is related to the baseline consumption estimates for the current control interval.

2) The real consumption rates from the real consumption rate database 1605. Although the real consumption rate database 1605 keeps records of the real consumption rate from the first time unit to the current time unit, the most relevant data is related to the real consumption rates for the current control interval.

3) The predictive consumption rate for each time unit of the look forward interval 1603, preferably adjusted for cancellations.

4) The non-predictive consumption rate for each time unit of the look forward interval 1604, estimated from historical non-predictive consumption rate data and correlations with predictive consumption rate data.

Based upon these four inputs, the algorithmic closed loop controller 1606 preferably generates a control function to be applied to the real consumption. Most closed loop control system designs can only rely on the deviation between the current value and the desired value of a process parameter because they do not benefit from a look forward monitoring capability. As a result, these systems are always subject to a theoretical residual control error. In contrast, the algorithmic closed loop controller 1606 has the capability of looking into the future and take corrective action before potential deviations from the desired baseline consumption occur.

In a preferred embodiment, the control function is the predictive price discount versus predictive order delay (POD) offered to consumers, described earlier in this section. As discussed in connection with FIG. 14, the volume of predictive purchase orders for a given item depends upon the function that defines the predictive price discount versus predictive order delay (POD). Therefore adjusting this function will impact the volume of predictive purchase orders booked, which in turn affects the consumption rate. When the control function is applied to the real consumption, it induces a consumption corrective action that compensates for the consumption disturbance foreseen by the predictive consumption rates for the look forward interval. The expected result will be that the disturbance is significantly attenuated or possibly eliminated and consumption progresses close to the desired baseline consumption. The external consumption disturbances 1608 are illustrated in FIG. 16 by a broken line input to the real consumption 1607 to indicate that they represent unpredictable disturbances that are not an integral part of the algorithmic closed loop control system 1600.

The ideal consumption from the perspective of manufacturers and producers would be a consumption that increases gradually to reflect consumption needs that can be fulfilled. However free market systems are susceptible to consumption disturbances, often from uncontrollable factors, which tend to trigger cyclic fluctuations.

To endure such fluctuations, manufacturers and producers have used various strategies. One strategy is to maintain minimum inventory buffers and gauge manufacturing resources for maximum consumption. During periods of high consumption, the manufacturer operates near full capacity at higher efficiency and generates higher earnings. However, during the periods of low consumption that typically follow, the manufacturer operates at low efficiency due to underutilized resources and generates lower earnings. Another strategy is to maintain large inventory buffers and gauge manufacturing resources for average consumption. The large inventory buffers absorb the consumption fluctuations but the cost of inventory results in reduced efficiency and earnings. Still another strategy is to maintain minimum inventory buffers and gauge manufacturing resources for minimum consumption. In this case the manufacturer operates all the time at maximum efficiency irrespectively of consumption fluctuations, but systematically loses business to competitors because of the inability to met peak demand, thereby limiting growth opportunities, revenues, and earnings. For many years manufacturers and producers have tried a variety of strategies, but none has succeeded in overcoming the problems associated with cyclic fluctuations in consumption. To survive the effects of cyclic reductions in consumption, sometimes manufacturers are forced to resort to drastic measures involving the reduction of valuable resources including facilities and personnel. Such measures tend to further aggravate the problem and are typically the root cause of the deep economic fluctuations and recessions observed over the years.

FIGS. 17A-17B illustrate a consumption cruise control process 1700 preferably performed by the algorithmic closed loop control system to stabilize consumption of an item based at least on consumption rate forecasts derived from predictive purchase orders booked for the item.

At step 1701, identifying the item to which the algorithmic closed loop control process 1700 is applied.

At step 1702, identifying a time unit to express a time variable.

At step 1703, identifying a look back interval consisting of an identified number of time units extending in time back from the end of a current time unit.

At step 1704, identifying a look forward interval consisting of an identified number of time units extending in time forward from the end of the current time unit.

At step 1705, identifying a time window as a time interval obtained by appending the look forward interval to the look back interval.

At step 1706, identifying a control interval, wherein the control interval represents a time interval between two consecutive cycles of the algorithmic closed loop control process.

At step 1707, identifying a current control interval representing a cycle of the algorithmic closed loop control process under execution.

At step 1708, identifying a baseline consumption rate of the item over the time window, wherein the baseline consumption rate of the item represents a disturbance free ideal consumption of the item per time unit.

At step 1709, identifying a real consumption rate of the item over the look back interval, wherein the real consumption rate of the item represents the total quantity of the item acquired by consumers per time unit.

At step 17010, identifying a look forward consumption rate of the item over the look forward interval, wherein the look forward consumption rate of the item represents a forecasted consumption rate of the item derived from at least predictive purchase orders booked for the item.

At step 1711, collecting input data during a current control interval, wherein the input data includes:
  (a) The baseline consumption rate over the time window.
  (b) The real consumption rate over the look back interval.
  (c) The look forward consumption rate over the look forward interval.

At step 1712, executing control procedures at the end of the current control interval, wherein the control procedures include:
  (a) Providing as inputs to the algorithmic closed loop controller 1606 the input data collected during the current control interval.
  (b) Computing a control function to control the real consumption 1607 of the item during a control interval immediately succeeding the current control interval, based at least on the inputs provided to the algorithmic closed loop controller. Preferably, the control function is computed by a software program running in the algorithmic closed loop controller 1606. The software program can be refined over time to take advantage of the parametric inputs provided to the algorithmic closed loop controller to try to maintain the real consumption rate as close to the baseline consumption rate as possible. For example, the software program can be configured with a parameter to reflect consumer reaction time upon any changes in predictive price discounts versus predictive order delay (POD), which can be easily established empirically after the consumption cruise control system is deployed. Consumer reaction time data can be an important factor in optimizing the performance of the algorithmic closed loop control system.
  (c) Applying the computed control function to the real consumption of the item.

At step 1713, repeating the steps of collecting input data and executing control procedures in a loop.

The exemplary value previously suggested for the control interval was one week based upon the traditional schedule used by grocery retailers whereby promotional prices are typically adjusted on a given day each week. However, once consumers get used to programs that generate suggested shopping lists and automatically execute online shopping, it may be possible to shorten the control interval to a shorter value such as one day resulting in improved response of the consumption cruise control system.

D. Operation of the Consumer Preference Code Sub-System

The consumer preference code sub-system 104 was described in Section II.D as a key system component of the supply-chain management system 100. This section describes, with reference to FIGS. 18-20 the operational features and methods associated with the consumer preference code sub-system 104.

Figure 18:
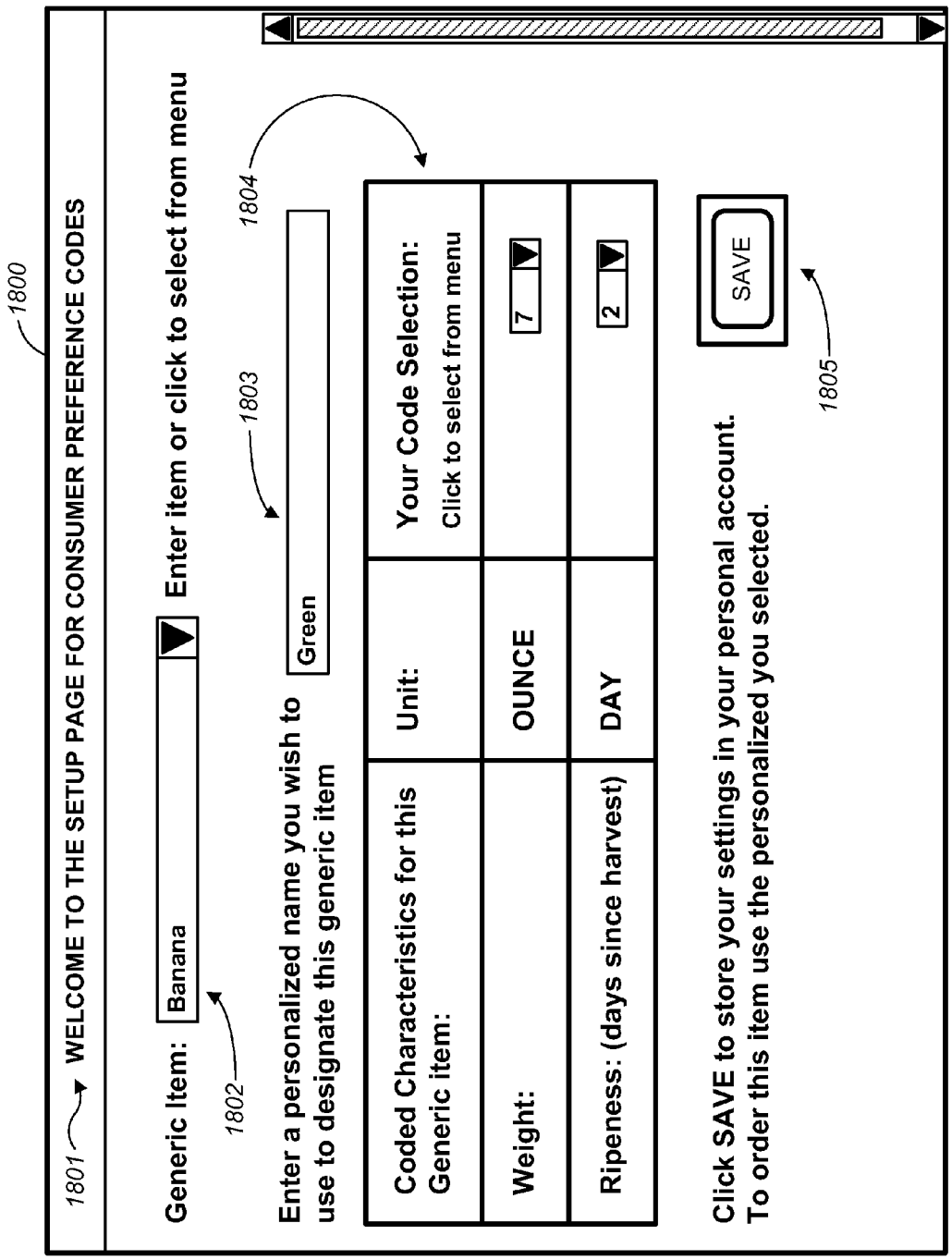
FIG. 18 depicts an exemplary illustration of a web page that can be used by a consumer to set up preference codes for a non-uniform generic item.

FIG. 18 depicts an exemplary illustration of a web page 1800 that can be used by a consumer to set up preference codes for a non-uniform generic item. The exemplary page displays the following:

a) A greeting field 1801 to welcome the consumer.
b) A generic item field 1802 for the consumer to enter the name of a generic item for which the consumer wishes to set up preference codes. For convenience, this field also provides a pull down menu that allows the consumer to select the desired generic item.
c) A personalized name field 1803 for the consumer to enter a personalized name the consumer wishes to use to designate the desired sub-class of the selected non-uniform generic item.
d) A table 1804 for the consumer to select the values for coded characteristics that define the preferences of the consumer. The left column of the table lists the name of each characteristic used to define preference codes, the center column lists the units used for each characteristic, and the right column contains pull down menus from which the consumer can select the desired value of each characteristic.
e) A save button 1805 that the user can click to store the selected preference codes in the preference code database system 510.

Figure 19:
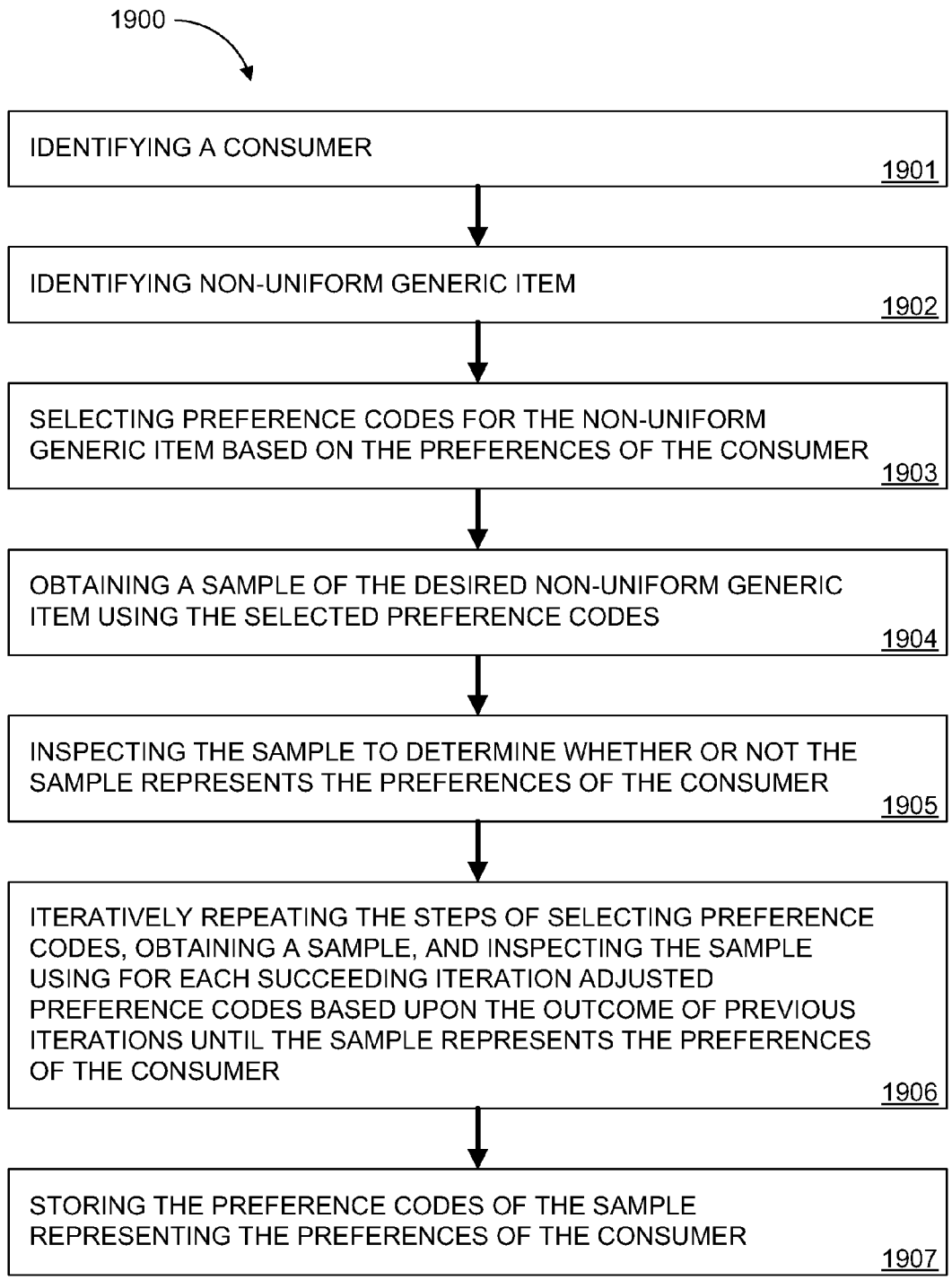
FIG. 19 illustrates a preferred method for registering consumer preference codes.

FIG. 19 illustrates a preferred method 1900 for registering consumer preference codes for a consumer in the consumer preference code sub-system 104.

At step 1901, identifying a consumer.

At step 1902, identifying a non-uniform generic item. The desired non-uniform generic item can be identified by using a search program that helps the user find the desired non-uniform generic item.

At step 1903, selecting preference codes for the identified non-uniform generic item based on the preferences of the consumer. For a first try, the consumer may start with pictures and descriptions that retailers may provide on the web. The consumer may also ask people who use similar codes for a suggestion. Alternatively, the consumer can try to find at a local retailer a sample of the desired item that meets the preferences of the consumer and then ask the retailer for the preference codes of the sample.

At step 1904, obtaining a sample of the desired non-uniform generic item using the selected preference codes. A sample can be obtained by placing an order for small quantity of the desired item or from a merchant that provides samples.

At step 1905, inspecting the sample to determine whether or not the sample represents the preferences of the consumer.

At step 1906, iteratively repeating the steps of selecting preference codes, obtaining a sample, and inspecting the sample using for each succeeding iteration adjusted preference codes based upon the outcome of previous iterations until the sample represents the preferences of the consumer. If the initially selected preference codes do not satisfy the preferences of the consumer, adjusted preference codes can be iteratively selected that better reflect the preferences of the consumer, based at least on the preference codes used in the previous iteration to the degree that such codes relate to the item received. Typically, the desired codes should be identifiable within a couple of iterations.

At step 1907, storing the preference codes of the sample representing the preferences of the consumer. Preferably the codes are stored in the consumer data section 513 of the preference code database system 510, where they can be easily accessed by the consumer and by merchants.

Figure 20:
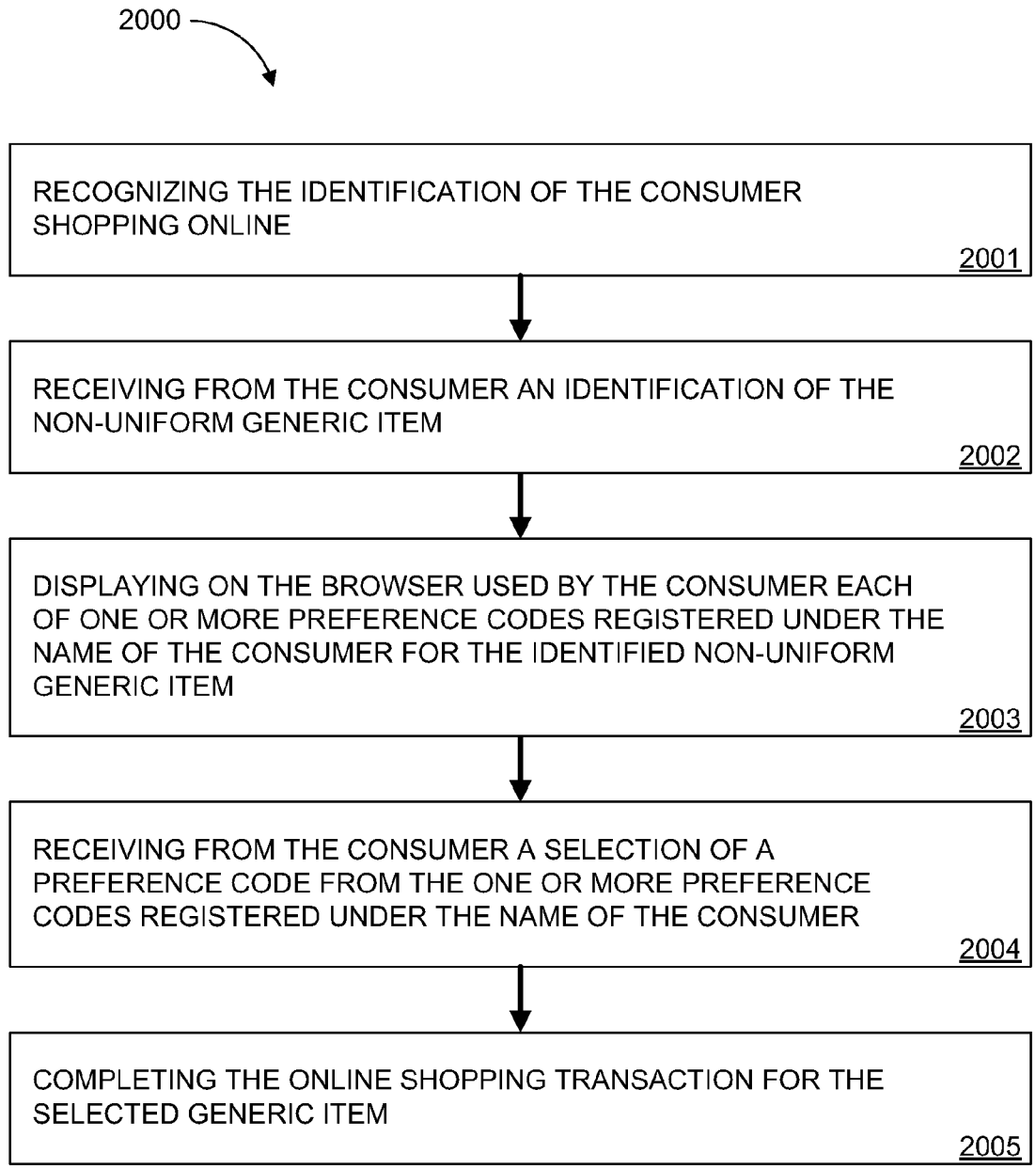
FIG. 20 illustrates a preferred method for using consumer preferences codes.

FIG. 20 illustrates a preferred method 2000, for using the consumer preference codes, whereby a consumer uses personalized references registered under the name of the consumer to execute an online shopping transaction for a non-uniform generic item. For the purpose of this method it is assumed that the consumer is using a web browser to shop online, even if the consumer is in a retail establishment. It is further assumed that the consumer is logged-on to a shopping platform configured to support the use of the consumer preference code sub-system 104. As described in Section II.D in connection with the preference code web server 520, a personalized reference program 522 is configured to receive the identification of a consumer and the identification of a generic name of a non-uniform generic item and return each of the personalized references associated with the generic name stored in the preference code database system 510 under the name of the consumer.

At step 2001, recognizing the identification of the consumer shopping online. Once the consumer logs-in to a shopping platform configured to support the consumer preference code sub-system, the identification of the consumer is know to the preference code sub-system 104.

At step 2002, receiving from the consumer an identification of the non-uniform generic item. The procedures by which consumers select items they wish to purchase are part of the shopping platform operation and need not be further described for the purpose of the present method.

At step 2003, displaying on the browser used by the consumer each of one or more personalized references registered under the name of the consumer for the identified non-uniform generic item. The personalized references associated with the consumer for a given non-uniform generic item are preferably stored in the consumer data section of the preference code database system and should be readily available for display on a web browser.

At step 2004, receiving from the consumer a selection of a personalized reference from the one or more personalized references registered under the name of the consumer.

At step 2005, completing the online shopping transaction for the selected generic item. Once the selected preference codes are received by the shopping platform the remaining portion of the shopping transaction is identical to that of any other item that does not involve the selection of preference codes.

E. Operation of the Window Shop Management Sub-System

Figure 21A:
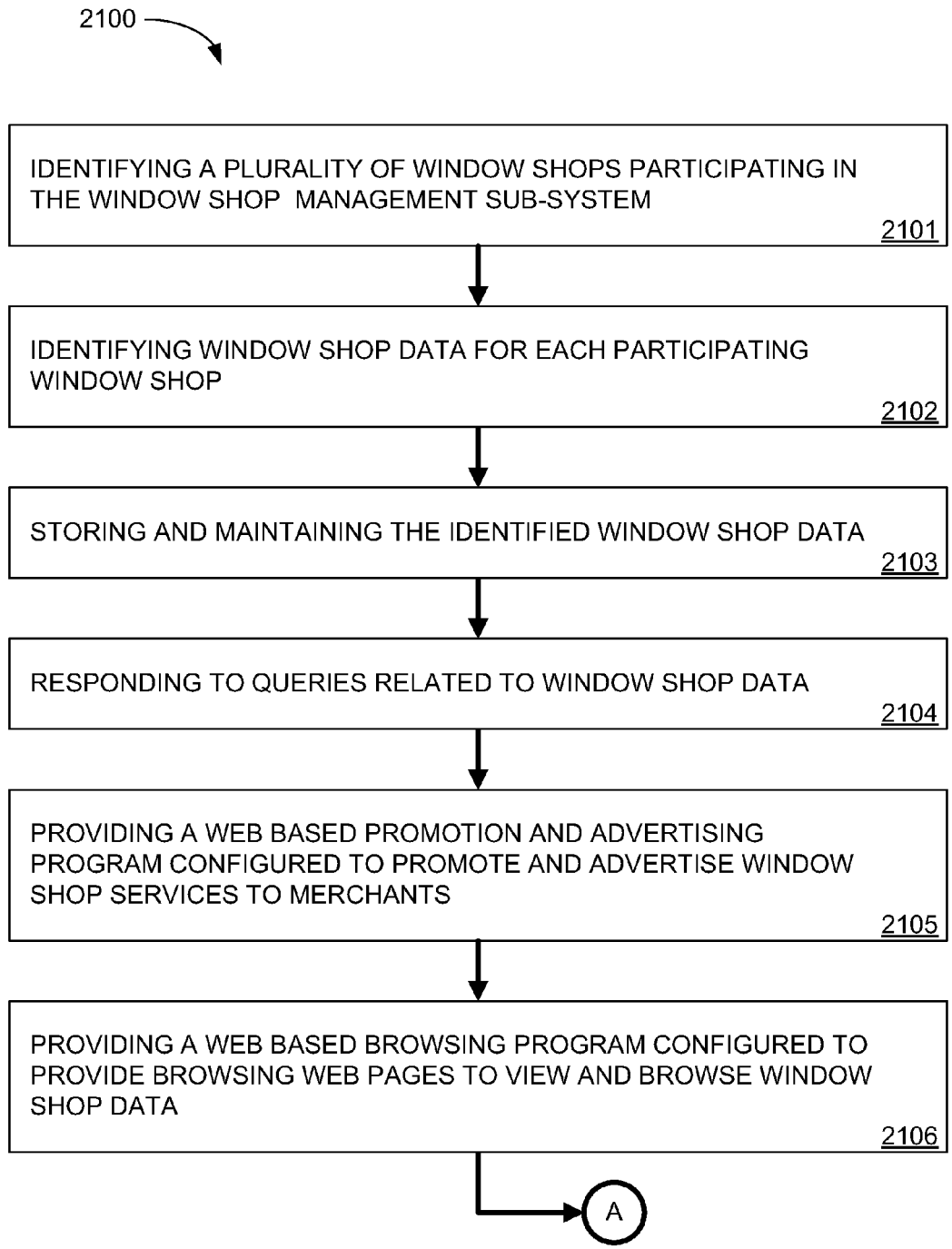
FIGS. 21A-21C illustrate a preferred method for the operation of the window shop management sub-system and the window shops.
Figure 21B:
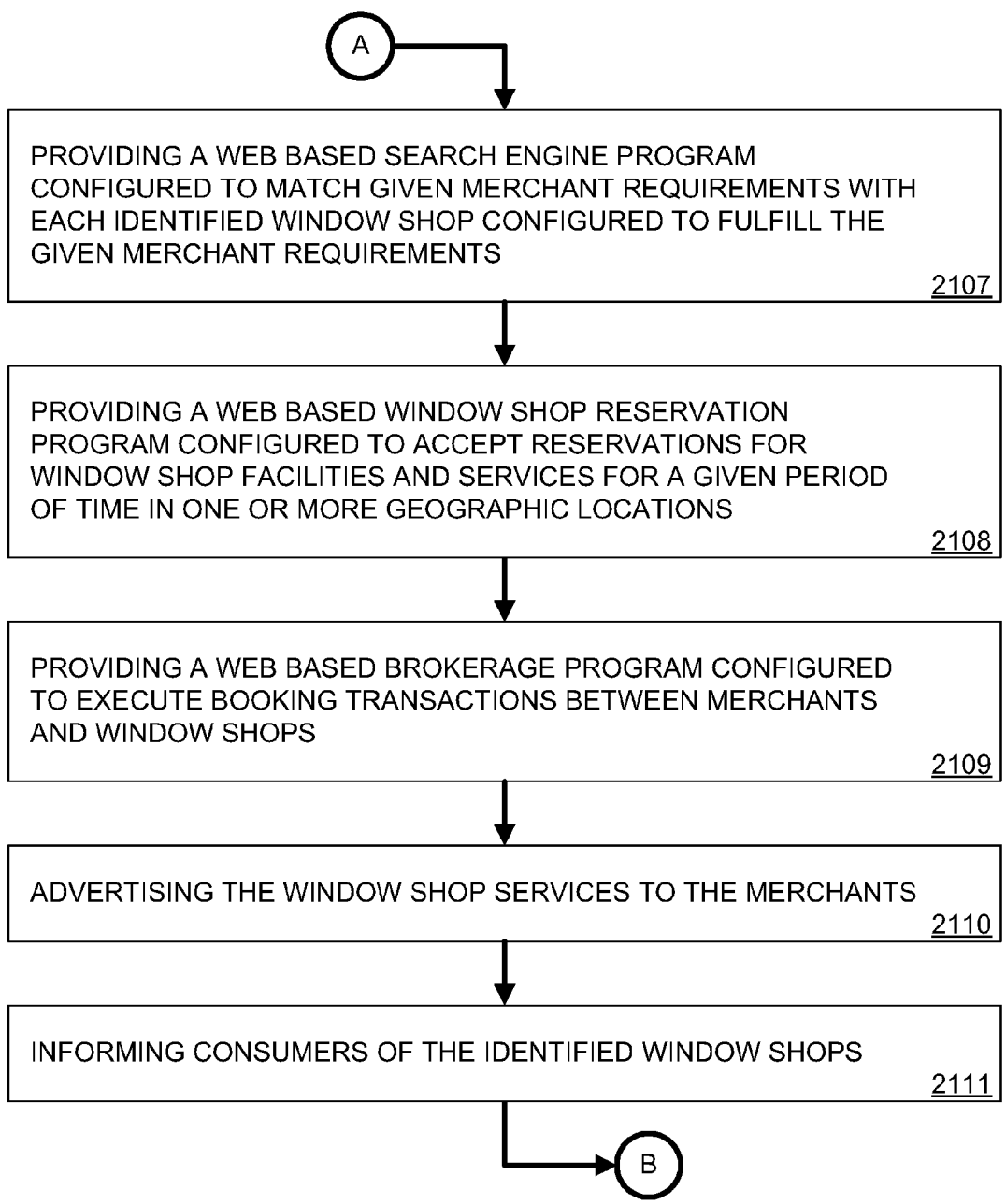
Figure 21C:
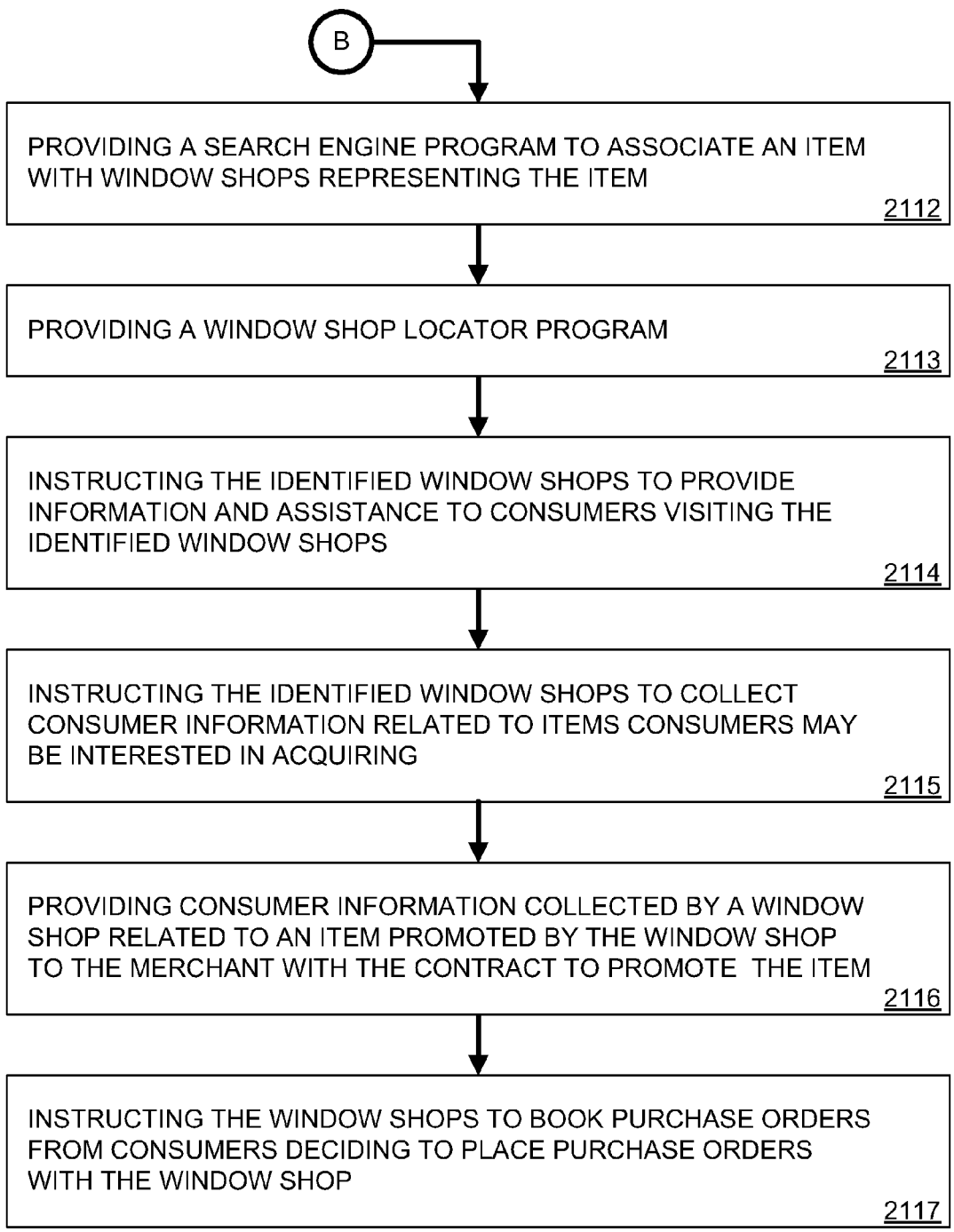

The window shop management sub-system 105 was described in Section II.E as a key sub-system component of the supply-chain management system 100. This section describes, with reference to FIGS. 21A-C a preferred method for the operation of the window shop management sub-system 105 and the window shops 806 managed by the window shop management sub-system. The operational method addresses functions performed for the benefit of both merchants 801 and consumers 805. Manufacturers, producers, and service providers are the primary merchants deriving benefits from the window shop management sub-system because of the advantages offered by the window shop model for the promotion of products and services.

At step 2101, identifying a plurality of window shops 806 participating in the window shop management sub-system 105. It is expected that every commercial establishment interested in operating a window shop will be a participant and preferably the window shop management sub-system 105 will provide a service to assist commercial establishments in becoming participants.

At step 2102, identifying window shop data for each participating window shop.

At step 2103, storing and maintaining the identified window shop data for each participating window shop. Each window shop can assume responsibility for entering and maintaining the window shop data, related to the window shop, in the window shop database system 611. Alternatively, any other method to enter the window shop data in the window shop database system 611 can be used provided the window shop database system 611 is maintained current.

At step 2104, responding to queries related to window shop data.

At step 2105, providing a web based promotion and advertising program configured to promote and advertise window shop services to merchants. Preferably, the promotion and advertising program is configured for window shops to target merchants that may have an interest in the areas of specialization of the window shop.

At step 2106, providing a web based browsing program configured to provide browsing web pages to view and browse window shop data. This program can be used by a merchant to evaluate and compare window shops and facilitate the selection of window shops best suited to provide services to the merchant.

At step 2107, providing a web based search engine program configured to match given merchant requirements for window shop facilities and services with each identified window shop configured to fulfill the given merchant requirements. In a preferred embodiment, a search engine can accept as inputs a set of merchant requirements expressed in a standardized form through menu selections and based on the inputs the search engine can scan the window shop database system 611 to identify the window shops that match the merchant requirements.

At step 2108, providing a web based window shop reservation program configured to accept reservations for window shop facilities and services from merchants for a given period of time in one or more geographic locations. In a preferred embodiment, the window shop web server 621 is configured to provide a window shop and decentralized exhibition reservation program to reserve window shop services for the benefit of merchants.

At step 2109, providing a web based brokerage program configured to execute booking transactions between merchants and window shops. In a preferred embodiment, the window shop web server 621 is configured to provide a window shop brokerage program to execute booking transactions between merchants and window shops for facilities and services provided by window shops. The procedures of booking transactions can typically be addressed by the brokerage program, but human assistance may be required to address specific details that may not be anticipated by the brokerage program.

At step 2110, advertising the window shop services to the merchants. In a preferred embodiment, the major methods of advertising include Internet and direct email. Alternatively, the window shop management sub-system can take advantage of the universal directory of merchants that participate in the supply-chain management system and the universal directory of original manufacturers, producers, and service providers, introduced earlier at the end of Section II.F to implement target advertising programs.

At step 2111, informing consumers of the identified plurality of window shops. Methods for informing consumers of the window shops in their region can include the following:
 (a) Internet advertising.
 (b) Direct email.
 (c) Local media advertising.
 (d) Promotional incentives for consumers to visit the window shops, such as promotional gifts and price discounts.
 (e) Promotional amenities such as coffee bar, Internet access, light entertainment, etc.

At step 2112, providing a search engine program configured to associate an item with window shops representing the item. Preferably, the search engine program is based upon the universal catalog of items (products and services), introduced earlier at the end of Section II.F.

At step 2113, providing a window shop locator program. In a preferred embodiment, the locator program is the window shop locator application program executable on the window shop web server 621 as indicated in Section II.E. The locator utility can be of use to both consumers and merchants for locating window shops of interest.

At step 2114, instructing the identified window shops to provide information and assistance to consumers visiting the identified window shops. Preferably, the window shops are staffed with personnel qualified to explain item features, give demonstrations, answer consumer inquiries, provide technical support, provide consumer training, and assist consumers with the selection of items and order placement.

At step 2115, instructing the identified window shops to collect consumer information related to items consumers may be interested in acquiring. The primary function of the window shop personnel is to properly inform consumers about items represented by the window shop. In the exercise of this function, the window shop personnel have a unique opportunity to obtain from consumers extremely valuable information related to items consumers may be interested in acquiring, as previously indicated in Section I.D.

At step 2116, providing the consumer information collected by the window shop, related to an item promoted by the window shop, to the merchant holding a contract with the window shop to promote the item. As indicated in Section II.E, the window shop management sub-system can compile and summarize the consumer information collected by each window shop and for each item promoted by the window shop communicate the compiled and summarized consumer information to the merchant that retained the window shop to promote the item.

At step 2117, instructing the window shops to book purchase orders from consumers who decide to place purchase orders with the window shop. As described in Section II.E, purchase orders from consumers that visit a window shop can be booked with the web server running the online order booking platform 632.

F. Operation of the Supply-Chain Management Sub-System

The supply-chain management sub-system 105, described earlier in Section II.F, is the basic integrating and coordinating component of the supply-chain management system 100. It integrates and coordinates the operations of the sub-systems described earlier in sections II.A through II.E and provides additional resources that support the operation of the supply-chain management system 100.

Figure 22B:
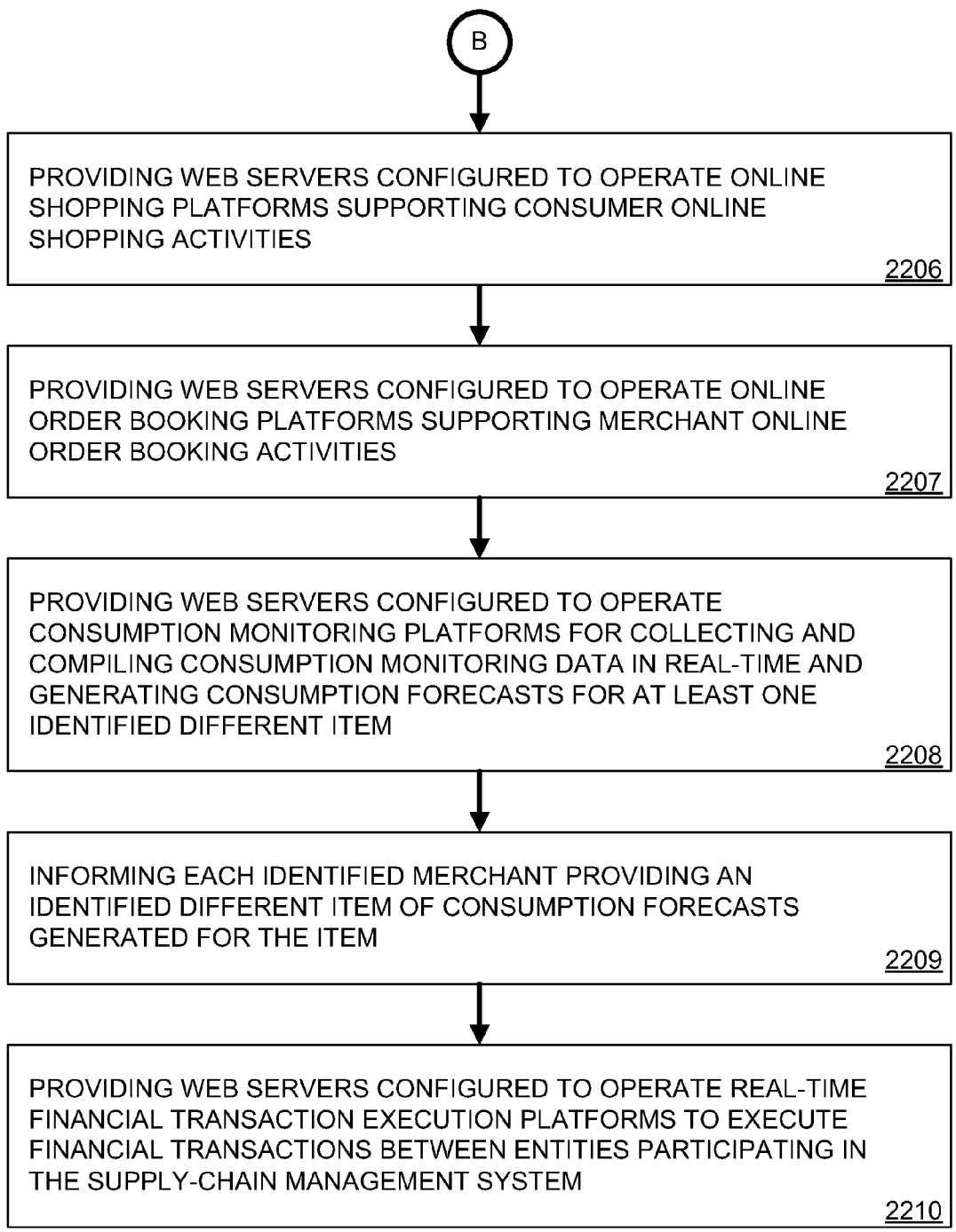

This section describes, with reference to FIGS. 22A-B a method 2200 preferably performed by the supply-chain management sub-system.

At step 2201, identifying a plurality of merchants participating in the supply-chain management sub-system. The identification of the plurality of merchants can de derived from the universal directory of merchants that participate in the supply-chain management sub-system described earlier in Section II.F.

At step 2202, identifying a plurality of different items, whereby each different item is provided by at least one of the identified merchants. The identification of the items can de derived from the universal catalog of items (products and services) described earlier in Section II.F.

At step 2203, for each identified different item, storing item data characterizing the item. Preferably the item data for each item is stored in the item information database system 703 and includes the information normally used by merchants to promote and sell the item to consumers.

At step 2204, for each identified merchant collecting and storing in real-time inventory data. Preferably, the inventory data for each of the merchants includes the data described earlier in Section II.F in connection with the inventory management database systems 701.

At step 2205, for each identified merchant collecting and storing, booked order data for each predictive and non-predictive purchase order booked by the merchant. Preferably, orders are entered in the order history database systems 702 in real-time upon completion of the booking process.

At step 2206, providing web servers configured to operate online shopping platforms supporting online consumer shopping activities. As indicated earlier, these web servers are provided as a convenience for merchants that are not equipped to offer consumers online shopping services and will facilitate the transition of these merchants into the supply-chain management sub-system.

At step 2207 providing web servers configured to operate online order booking platforms supporting online order booking activities. As indicated earlier, these web servers are provided as a convenience for merchants that are not equipped to operate online order booking services and will facilitate the transition of these merchants into the supply-chain management sub-system.

At step 2208, providing web servers configured to operate consumption monitoring platforms for collecting and compiling consumption monitoring data in real-time and generating consumption forecasts for at least one identified different item. Preferably, consumption data will be available to all participants of the supply-chain management system as an information service.

At step 2209, informing each identified merchant providing an identified different item of consumption forecasts generated for the item. The consumption forecasts can be derived from the booked order data by the consumption forecasting programs operated by the predictive ordering sub-system as described earlier in Section II.C.

At step 2210, providing web servers configured to operate real-time financial transaction execution platforms to execute financial transactions between entities participating in the supply-chain management sub-system. The supply-chain management sub-system 105 can provide cost effective financial transaction execution platforms to facilitate and encourage the participation of all entities involved in the supply-chain from source manufacturers, producers, and service providers at the beginning link of the supply-chain to the consumers at the ending link of the supply-chain.

This section completes the description of the operation of the supply-chain management system 100. The description attempted to emphasize the functional aspects of the supply-chain management system in connection with logical integration of the various functions, each of which plays an important role in the efficient operation of the supply-chain management system. Actual implementations may deviate significantly from the various illustrations and examples used in this specification, mostly as a consequence of cost saving benefits and other practical considerations. All such implementations are within the scope of the invention disclosed in this specification.

IV. Conclusion

While certain preferred embodiments have been described and shown in the accompanying drawings, it is to be understood that such embodiments are merely illustrative of, and not restrictive on, the broad invention. Other embodiments that are apparent to those of ordinary skill in the art, including embodiments that do not provide all of the features and advantages set forth herein, are also within the scope of this invention. Further, it is to be understood that this invention is not limited to the specific construction and arrangements shown and described since various modifications or changes may occur to those of ordinary skill in the art without departing from the spirit and scope of the invention. Accordingly, the scope of the invention is defined by the claims that follow. In the claims, a portion shall include greater than none and up to the whole of a thing. In the method claims, reference characters are used for convenience of description only, and do not indicate a particular order for performing the method.

What is claimed is:

1. An Internet-based order aggregation method executing on a computer system, the Internet-based order aggregation method comprising:

identifying a plurality of merchants participating in a supply-chain management system configured to manage activities associated with transfers of items from a plurality of merchants to a plurality of consumers and to support order aggregation, wherein each of the plurality of consumers purchases at least one item designated for physical aggregation from a different one of the plurality of merchants, wherein purchase orders placed by consumers are fulfilled from virtual inventory pools of participating merchants coordinated by an integrated collaborative inventory sharing system and wherein items designated for physical aggregation, purchased by each consumer, are sent to an identified order aggregation facility proximate the consumer to be physically aggregated in one or more batches in accordance with provided aggregation instructions, wherein each batch of physically aggregated items is transferred from the identified order aggregation facility to the consumer who purchased the items at an identified date and time;

identifying a plurality of inventory sites wherein each inventory site is associated with at least one merchant;

identifying a plurality of consumers, wherein each consumer uses the supply-chain management system for shopping and wishes to have orders aggregated;

identifying a plurality of order aggregation facilities participating in the supply-chain management system, wherein each of the order aggregation facilities is configured to receive, temporarily store in a suitable environment, aggregate, and transfer to consumers items purchased by consumers from different merchants;

identifying for each consumer of the identified consumers items purchased by the consumer from the identified merchants, wherein the items are designated for physical aggregation in a batch;

identifying for each consumer of the identified consumers an order aggregation facility where the items in the batch will be physically aggregated;

identifying for each consumer of the identified consumers order aggregation instructions for the items in the batch to be physically aggregated;

identifying for each consumer of the identified consumers a date and time for transferring the batch of physically aggregated items to the consumer;

identifying for each order aggregation facility of the identified order aggregation facilities aggregation schedules, compliant with the order aggregation instructions, for the batches of items to be physically aggregated by the order aggregation facility;

transmitting to each inventory site, providing at least one items purchased by the consumers, pick-and-pack lists and transport instructions and schedules for the items purchased by consumers;

instructing transportation services to transport the items purchased by the consumers, from the identified inventory sites to the designated order aggregation facilities in accordance with optimized transport instructions, schedules and itineraries;

providing to each of the identified order aggregation facilities the identified order aggregation instructions for each consumer scheduled to receive a physically aggregated batch from the order aggregation facility;

instructing each of the identified order aggregation facilities to aggregate the items received from the inventory sites in accordance with the provided aggregation instructions for each consumer;

instructing each of the identified order aggregation facilities to transfer to each of the consumers scheduled to receive a batch of physically aggregated items designated for pick up the batch of physically aggregated items at the identified date and time; and instructing each of the identified order aggregation facilities to deliver to each of the consumers scheduled to receive a batch of physically aggregated items designated for delivery the batch of physically aggregated items at the identified date and time to an address designated by the consumer.

* * * * *